US012675072B2

(12) United States Patent
Ishizuka et al.

(10) Patent No.: US 12,675,072 B2
(45) Date of Patent: Jul. 7, 2026

(54) IMAGE FORMING APPARATUS

(71) Applicant: BROTHER KOGYO KABUSHIKI KAISHA, Nagoya (JP)

(72) Inventors: Daisuke Ishizuka, Nagoya (JP); Takuya Tsuji, Chiryu (JP); Yasuhiro Suzuki, Nagoya (JP); Kazuma Hinoue, Nagoya (JP); Hotaka Kakutani, Kiyosu (JP); Masafumi Inoue, Tajimi (JP); Haruka Kizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 18/451,299

(22) Filed: Aug. 17, 2023

(65) Prior Publication Data

US 2024/0061374 A1 Feb. 22, 2024

(30) Foreign Application Priority Data

Aug. 19, 2022 (JP) ................................ 2022-131357
Jan. 30, 2023 (JP) ................................ 2023-012370
Mar. 16, 2023 (JP) ................................ 2023-042223
May 11, 2023 (JP) ................................ 2023-078809

(51) Int. Cl.
*G03G 21/20* (2006.01)
*G03G 21/18* (2006.01)

(52) U.S. Cl.
CPC ....... *G03G 21/206* (2013.01); *G03G 21/1814* (2013.01); *G03G 2221/1648* (2013.01)

(58) Field of Classification Search
None
See application file for complete search history.

(56) References Cited

U.S. PATENT DOCUMENTS 4,200,609 A * 4/1980 Byrd .................. B01D 53/8675 422/177
4,302,490 A * 11/1981 Byrd ........................ B01J 23/34 427/327
(Continued)

FOREIGN PATENT DOCUMENTS

EP 3835874 A1 * 6/2021 .............. B41J 29/02
JP H04305664 A * 10/1992
(Continued)

OTHER PUBLICATIONS

Machine translation of Hiroshi (1995).*

*Primary Examiner* — Sevan A Aydin
(74) *Attorney, Agent, or Firm* — Merchant & Gould P.Cl

(57) ABSTRACT

An image forming apparatus includes a housing in which an exhaust port is formed, a fan, a duct extending in an exhausting direction and configured to accommodate the fan, the duct including a downstream end in the exhausting direction, and an exhaust filter disposed between the duct and the exhaust port in the exhausting direction, the exhaust filter including a first surface facing the exhaust port and a second surface facing the duct. Dimensions of the duct each orthogonal to the exhausting direction are smaller than dimensions of the exhaust filter each orthogonal to the exhausting directions. A perimeter of the downstream end of the duct in the exhausting direction is in contact with the second surface of the exhaust filter.

20 Claims, 37 Drawing Sheets

(56) References Cited

U.S. PATENT DOCUMENTS 5,561,496 A * 10/1996 Sugiura ................ G03G 21/206
29/469
6,112,040 A * 8/2000 Saito .................... G03G 21/206
399/93
7,811,346 B1 * 10/2010 Henson .................. B01D 46/10
55/DIG. 35
2004/0074214 A1 * 4/2004 Henson .................. B01D 46/88
55/501
2006/0116065 A1 6/2006 Ishii
2007/0002290 A1 * 1/2007 Muraki .................. B41J 29/023
353/119
2007/0207640 A1 * 9/2007 Kawasaki ................ B41J 29/02
439/76.2
2008/0012803 A1 * 1/2008 Nakano ............ G03G 15/04054
345/82
2008/0013115 A1 * 1/2008 Nakano .............. G03G 21/1619
358/1.9
2008/0056761 A1 * 3/2008 Kawahara .......... G03G 21/1633
399/110
2008/0145092 A1 6/2008 Tomatsu et al.
2011/0305491 A1 * 12/2011 Hasegawa .......... G03G 15/6511
399/323
2012/0014725 A1 * 1/2012 Seto ................... G03G 15/2028
399/323
2012/0152114 A1 * 6/2012 Griffiths .................... F24F 7/08
95/70
2012/0181414 A1 * 7/2012 Yuasa .................. G03G 21/206
399/92
2012/0251201 A1 * 10/2012 Ukai .................. G03G 15/6552
399/322
2014/0153977 A1 * 6/2014 Ozawa ............... G03G 21/1638
399/322
2014/0153978 A1 * 6/2014 Ozawa ............... G03G 15/2028
399/322
2014/0319984 A1 * 10/2014 Younts ............... H05K 7/20172
312/236
2015/0132020 A1 * 5/2015 Saito .................. G03G 15/2017
399/92
2025/0306531 A1 * 10/2025 Tsuji .................... G03G 21/206

FOREIGN PATENT DOCUMENTS

JP H07134522 A * 5/1995
JP 8-171317 A 7/1996
JP 2003-131532 A 5/2003
JP 2006-154137 A 6/2006
JP 2007310216 A * 11/2007
JP 2008-139703 A 6/2008
JP 2010-079047 A 4/2010
JP 2015132425 A * 7/2015
JP 2017227693 A * 12/2017 ........... G03G 21/206

* cited by examiner

IMAGE FORMING APPARATUS

REFERENCE TO RELATED APPLICATIONS

This application claims priority from Japanese Patent Application No. 2022-131357 filed on Aug. 19, 2022, Japanese Patent Application No. 2023-012370 filed on Jan. 30, 2023, Japanese Patent Application No. 2023-042223 filed on Mar. 16, 2023, and Japanese Patent Application No. 2023-078809 filed on May 11, 2023. The entire contents of the priority applications are incorporated herein by reference.

BACKGROUND ART

Aspects of the present disclosure relates to image forming apparatuses.

In recent years, in image forming apparatuses, it has been required to suppress discharge of dust such as toner to outside of a housing in accordance with the tightening of environmental regulations. Therefore, in a conventional image forming apparatus, a filter is disposed upstream in an exhausting direction of a fan for exhausting air inside the housing, and the dust is removed from the exhaust by the filter.

When the filter is disposed upstream of the fan in the exhausting direction, a gap between a louver provided at an exhaust port of the housing and the filter becomes large. Therefore, not only the air passing through the filter but also air not passing through the filter may be exhausted to the outside of the housing by the fan.

Accordingly, it has been known that it is preferable to reduce the gap between the louver and the filter by, for instance, disposing the filter between the louver and the fan.

DESCRIPTION

However, even when the filter is disposed between the louver and the fan, if there is a gap between the fan and the filter, air sent by the fan may leak from the gap and may be exhausted without being caused to pass through the filter.

At least one aspect of the present disclosure is advantageous to provide an image forming apparatus capable of reliably causing the air sent by the fan to pass through the filter even when the filter is disposed between the louver and the fan.

According to aspects of the present disclosure, there is provided an image forming apparatus including a housing in which an exhaust port is formed, a fan, a duct extending in an exhausting direction and configured to accommodate the fan, the duct including a downstream end in the exhausting direction, and an exhaust filter disposed between the duct and the exhaust port in the exhausting direction. The exhaust filter includes a first surface facing the exhaust port and a second surface facing the duct. Dimensions of the duct each orthogonal to the exhausting direction are smaller than dimensions of the exhaust filter each orthogonal to the exhausting directions. A perimeter of the downstream end of the duct in the exhausting direction is in contact with the second surface of the exhaust filter.

According to aspects of the present disclosure, there is further provided an image forming apparatus including a fan, a duct extending in an exhausting direction and configured to accommodate the fan, a sidewall disposed downstream of the fan in the exhausting direction, the sidewall including an exhaust port extending through the sidewall, and a filter disposed between the duct and the sidewall. The duct has a downstream end entirely in contact with the filter.

The filter has an area greater than a cross-sectional area of the downstream end of the duct. The duct, the filter, and the exhaust port fluidly communicate with each other.

Hereinafter, embodiments according to aspects of the present disclosure will be described with reference to the accompanying drawings.

FIRST EMBODIMENT

Image Forming Apparatus

Figure 1:
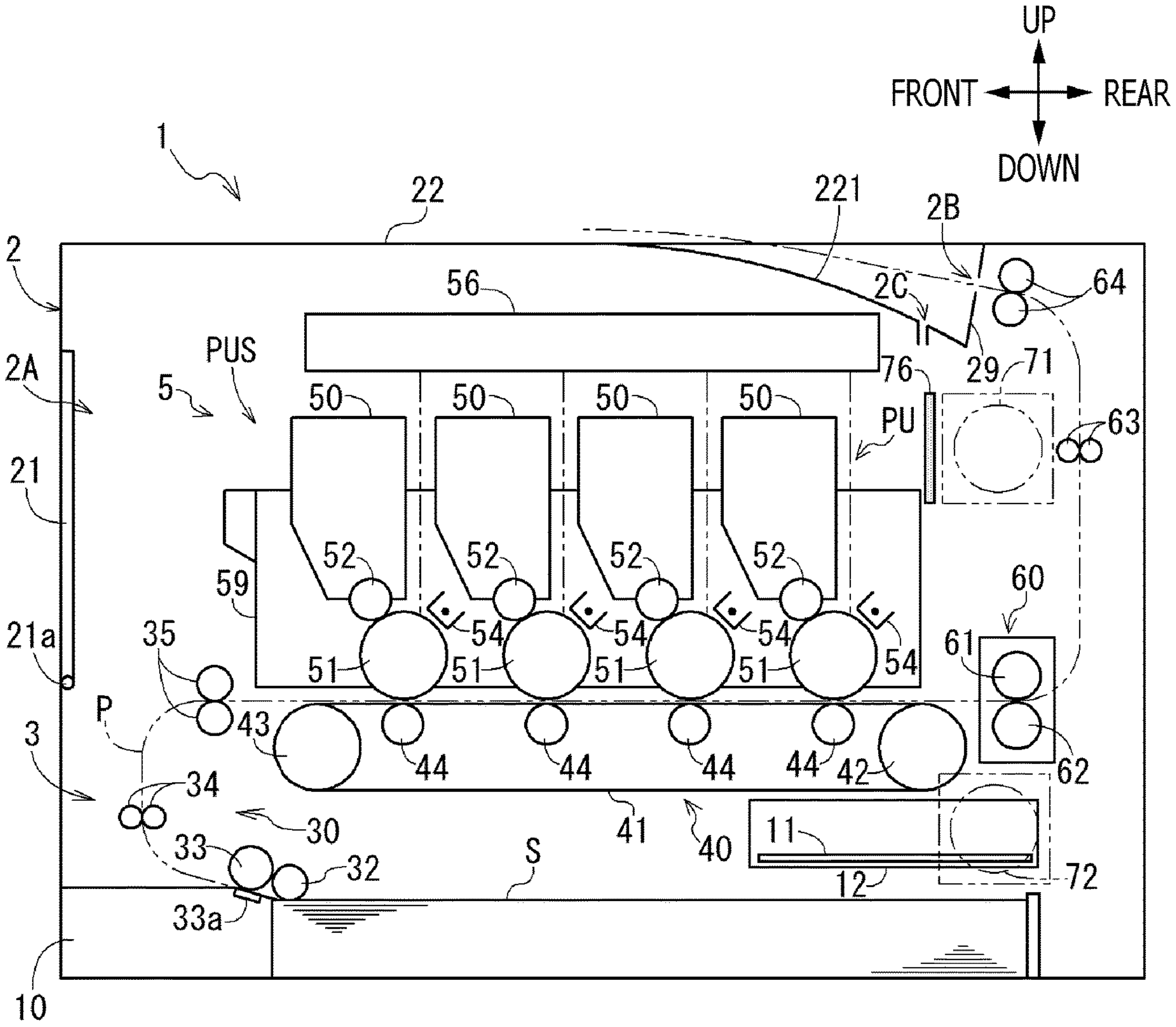
FIG. 1 is a central cross-sectional view of an image forming apparatus.
Figure 2:
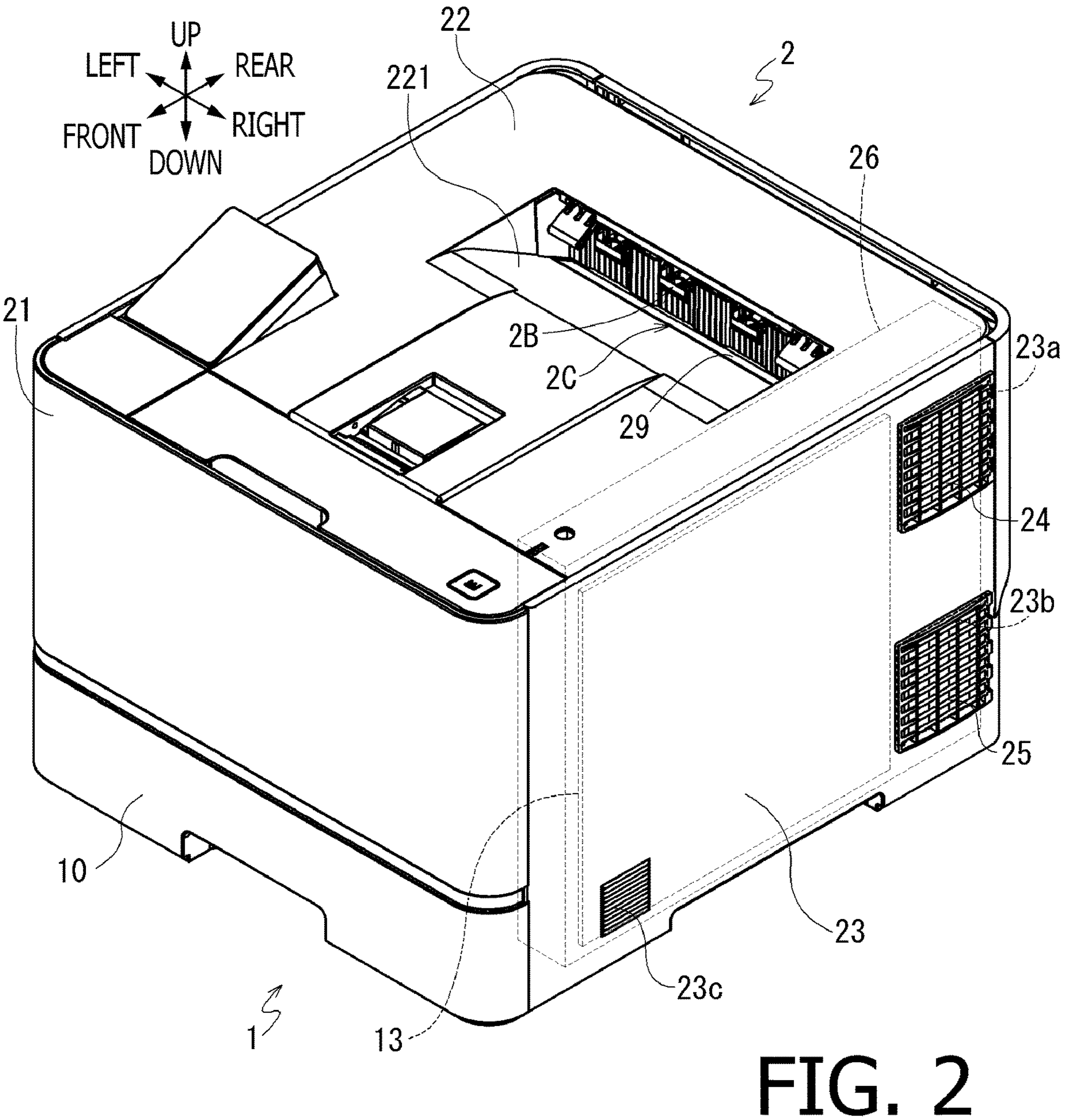
FIG. 2 is a perspective view of the image forming apparatus.
Figure 3:
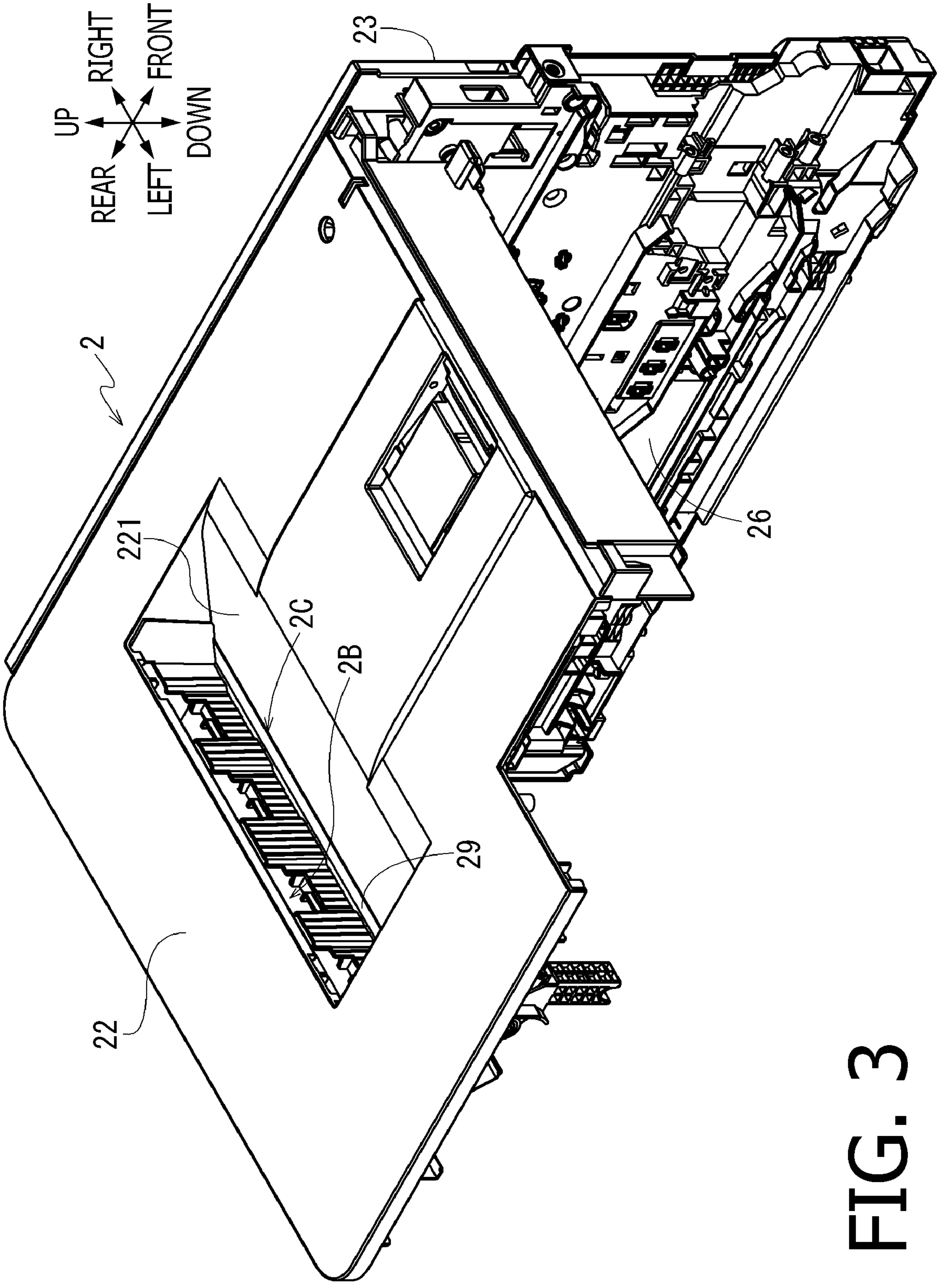
FIG. 3 is a perspective view of a top cover of a housing.
Figure 4:
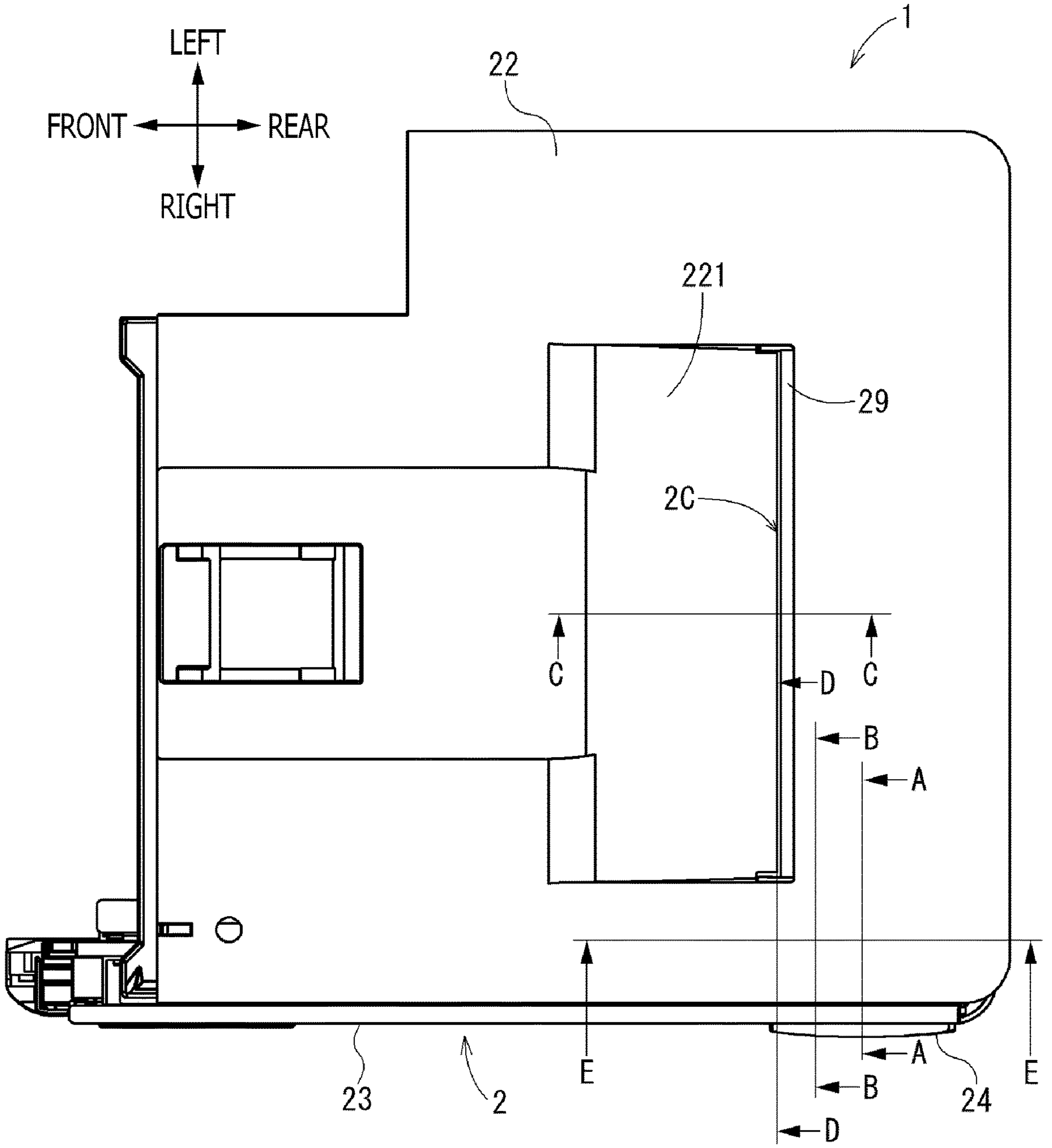
FIG. 4 is a plan view of the top cover of the housing.

An image forming apparatus 1 shown in FIGS. 1 and 2 is an embodiment of an image forming apparatus according to aspects of the present disclosure, and is a color laser printer that forms images of a plurality of colors on a sheet S by an electrophotographic system.

In the following description, the left side in FIG. 1 is defined as a front side of the image forming apparatus 1, the right side in FIG. 1 is defined as a rear side of the image forming apparatus 1, the near side in FIG. 1 is defined as a right side of the image forming apparatus 1, the far side in FIG. 1 is defined as a left side of the image forming apparatus 1, and the upper and lower sides in FIG. 1 are defined as upper and lower sides of the image forming apparatus 1, respectively. In the present embodiment, a left-right direction and a front-rear direction are horizontal directions, and an up-down direction is a vertical direction.

The image forming apparatus 1 includes a housing 2, a sheet feeder 3 including a sheet feed tray 10 configured to support one or more sheets S and a sheet conveyer 30 configured to convey the sheets S, and an image forming engine 5 configured to form an image on the sheet S conveyed by the sheet feeder 3.

The housing 2 is formed in a substantially rectangular parallelepiped shape, and accommodates the sheet feeder 3 and the image forming engine 5. A front opening 2A is formed on a front surface of the housing 2, and the housing 2 includes a front cover 21 configured to close the front opening 2A.

The front cover 21 is configured to swing about a swing shaft 21*a* at a lower end portion thereof, and is configured to move between a closed position for closing the front opening 2A and an open position for opening the front opening 2A by swinging about the swing shaft 21*a*.

As shown in FIGS. 1 to 4, a top cover 22 is disposed on an upper surface of the housing 2. The top cover 22 includes a sheet discharge tray 221 that is inclined downward from the front side toward the rear side.

The sheet feeder 3 is disposed in a lower portion of the housing 2, and is configured to convey the sheets S supported by the sheet feed tray 10 to the image forming engine 5 by the sheet conveyer 30. The sheet feed tray 10 is configured to slide in the front-rear direction to move between an accommodated position where the sheet feed tray 10 is accommodated in the housing 2 and a separated position where the sheet feed tray 10 is drawn forward from the accommodated position.

The sheet conveyer 30 includes a sheet feed roller 32, a separation roller 33, a separation pad 33*a*, a conveyance roller pair 34, and a registration roller pair 35. Inside the housing 2, a conveyance path P of the sheet S from the sheet feed tray 10 to the sheet discharge tray 221 via the image forming engine 5 is formed.

The sheets S supported by the sheet feed tray 10 are separated one by one and sent out to the conveyance path P by the sheet feed roller 32, the separation roller 33, and the separation pad 33*a*. The sheet feed roller 32 is a roller that conveys the sheets S from the sheet feed tray 10 toward the image forming engine 5. The separation roller 33 and the separation pad 33*a* constitute a separator that separates the sheets S supported by the sheet feed tray 10 one by one.

The sheet S fed to the conveyance path P is conveyed toward the image forming engine 5 by the conveyance roller pair 34 and the registration roller pair 35. The registration roller pair 35 regulates movement of a leading edge of the conveyed sheet S to temporarily stop the sheet S, and then conveys the sheet S toward the image forming engine 5 at a predetermined timing.

The image forming engine 5 is disposed above the sheet feeder 3. The image forming engine 5 includes four toner cartridges 50 arranged side by side in the front-rear direction, and photosensitive drums 51 corresponding to the toner cartridges 50, respectively. The toner cartridges 50 are provided for black, yellow, magenta, and cyan. Each toner cartridge 50 includes a developing roller 52.

The toner cartridges 50 are detachably supported by a drawer 59. The drawer 59 is detachable from the housing 2 through the front opening 2A of the housing 2 by opening the front cover 21. The drawer 59 is configured to move between a first position where the drawer 59 is disposed inside the housing 2 and a second position where at least a portion of the drawer 59 is disposed outside the housing 2.

Each photosensitive drum 51 has a substantially cylindrical shape whose axial direction extends in the left-right direction, and is rotatably supported by the drawer 59. Each developing roller 52 extends in the left-right direction and is rotatably supported by the toner cartridge 50. The developing roller 52 supplies toner to the photosensitive drum 51.

The housing 2 includes an exposure device 56 configured to expose surfaces of the photosensitive drums 51. The exposure device 56 includes conventionally-known laser diodes, polarizers, lenses, and mirrors. The exposure device 56 is configured to emit light beams to the photosensitive drums 51, respectively, to expose the surfaces of the photosensitive drums 51.

A transfer belt 41 is disposed below the photosensitive drums 51 to face the photosensitive drums 51 across the conveyance path P. The transfer belt 41 is in contact with the photosensitive drums 51. The transfer belt is stretched between a drive roller 42 and a driven roller 43 disposed in front of the drive roller 42. Transfer rollers 44 are disposed at positions opposing the respective photosensitive drums 51 across the transfer belt 41. In the image forming engine 5, a belt device 40 is configured by the transfer belt 41, the drive roller 42, the driven roller 43, the transfer rollers 44, and the like.

The image forming engine 5 includes chargers 54 configured to charge the photosensitive drums 51, respectively. The chargers 54 are supported by the drawer 59. The photosensitive drums 51 uniformly charged by the chargers 54 are selectively exposed by the exposure device 56. By this exposure, electric charges are selectively removed from the surfaces of the photosensitive drums 51 and electrostatic latent images are formed on the surfaces of the photosensitive drums 51.

Toner accommodated in the toner cartridge 50 is positively charged and carried on a surface of the developing roller 52. A developing bias is applied to the developing roller 52, and when the electrostatic latent image formed on the photosensitive drum 51 faces the developing roller 52, the toner is supplied from the developing roller 52 to the electrostatic latent image due to a potential difference between the electrostatic latent image and the developing roller 52. A toner image is thereby formed on the surface of the photosensitive drum 51.

When the sheet S conveyed toward the image forming engine 5 reaches the transfer belt 41, the sheet S is conveyed by the transfer belt 41 and passes between the transfer belt 41 and the photosensitive drums 51. Then, when the toner image carried on the surface of the photosensitive drum 51 faces the sheet S, the toner image is transferred to the sheet S by a transfer bias applied to the transfer roller 44.

Although the transfer belt 41 in the present embodiment is configured as a conveyance belt that conveys the sheet S onto which the toner image is to be transferred, the transfer belt 41 may be configured as an intermediate transfer belt onto which the toner image is to be transferred and from which the toner image transferred thereon is further transferred onto the sheet S.

The sheet S onto which the toner image has been transferred is conveyed to a fuser 60. The fuser 60 includes a heating roller 61 and a pressure roller 62 that is in pressure contact with the heating roller 61. The toner image is thermally fixed to the sheet S conveyed to the fuser 60 while the sheet S passes between the heating roller 61 and the pressure roller 62. That is, the fuser 60 is configured to fix the toner image on the sheet S.

The sheet S on which the toner image has been thermally fixed is conveyed from the fuser 60 to the downstream side in a conveyance direction, further conveyed by an intermediate discharge roller pair 63 and a discharge roller pair 64 disposed downstream of the intermediate discharge roller pair 63 in the conveyance direction, and discharged to the sheet discharge tray 221.

As shown in FIGS. 1 to 4, a discharge frame 29 is disposed on the top cover 22 of the housing 2 behind the sheet discharge tray 221. The discharge frame 29 is formed with a discharge port 2B that is open in the front-rear direction and extends in the left-right direction, and the sheet S conveyed by the discharge roller pair 64 is discharged to the sheet discharge tray 221 through the discharge port 2B.

In the image forming apparatus 1, the drawer 59 and the toner cartridges 50, the photosensitive drums 51, the chargers 54, and the like supported by the drawer 59 constitute a process unit PU configured to form a toner image on the sheet S. The housing 2 includes a process unit accommodating part PUS that accommodates the image forming engine 5 including the process unit PU and the sheet conveyer 30.

The process unit PU may only include the photosensitive drum 51 and the charger 54, or may further include the transfer belt 41 and/or the fuser 60. In the process unit PU, the drawer 59 may support the photosensitive drums 51 as in the present embodiment, or the toner cartridges 50 may support the photosensitive drums 51.

The image forming apparatus 1 includes a power supply board 11 on which a power supply circuit is formed, and a board cover 12 that covers the power supply board 11. The board cover 12 is a board accommodating part that accommodates the power supply board. The board cover 12 is disposed between the sheet feed tray 10 and the belt device 40 in a rear portion inside the housing 2, and is disposed below the fuser 60 in the up-down direction. The housing 2 accommodates the process unit PU and the board cover 12.

The image forming apparatus 1 includes a first fan 71 and a second fan 72 that exhaust air inside the housing 2 to outside of the housing 2. The first fan 71 is disposed inside the housing 2 on the right side and on a rear side of the process unit PU, and is configured to exhaust air inside the housing 2 that has passed through the process unit PU to the outside of the housing 2. Thus, the air having passed through the process unit PU can be effectively exhausted by the first fan 71.

The second fan 72 is disposed inside the housing 2 on a right side of the board cover 12 and at a position where, when viewed in the left-right direction, the second fan 72 overlaps with a rear portion of the board cover 12. The second fan 72 is configured to discharge air inside the board cover 12 to the outside of the housing 2. The second fan 72 is disposed below the first fan 71.

As shown in FIG. 2, a right frame 26 is accommodated in a right end portion inside the housing 2, and the housing 2 includes a right sidewall 23 that covers a right side of the right frame 26. The right sidewall 23 is disposed downstream of the first fan 71 in a first exhausting direction which will be described later. The right sidewall 23 includes a first exhaust port 23*a* and a second exhaust port 23*b* that penetrate the right sidewall 23 in the left-right direction. The first exhaust port 23*a* and the second exhaust port 23*b* are at a rear portion of the right sidewall 23, and the first exhaust port 23*a* is disposed above the second exhaust port 23*b*.

The first fan 71 is supported by the right frame 26, and is disposed at a position where, when viewed in the left-right direction, the first fan 71 overlaps with the first exhaust port 23*a*. By driving the first fan 71, an air flow in a direction from the left to the right is generated, and by the air flow generated by the first fan 71, the air inside the process unit PU is exhausted to the outside of the housing 2 through the first exhaust port 23*a*.

The first fan 71 exhausts the air inside the housing 2 to the outside of the housing 2. The exhausting direction of air exhausted by the first fan 71 is a first exhausting direction. In the present embodiment, the first exhausting direction being the exhausting direction of the first fan 71 is along the left-right direction.

The second fan 72 is supported by the right frame 26, and is disposed at a position where, when viewed in the left-right direction, the second fan 72 overlaps with the second exhaust port 23*b*. By driving the second fan 72, an air flow in a direction from the left to the right is generated, and the air inside the board cover 12 is discharged to the outside of the housing 2 through the second exhaust port 23*b* by the air flow generated by the second fan 72. The exhausting direction of air exhausted by the second fan 72 is a second exhausting direction. In the present embodiment, the second air exhausting direction being the exhausting direction of the second fan 72 is the left-right direction.

Figure 5:
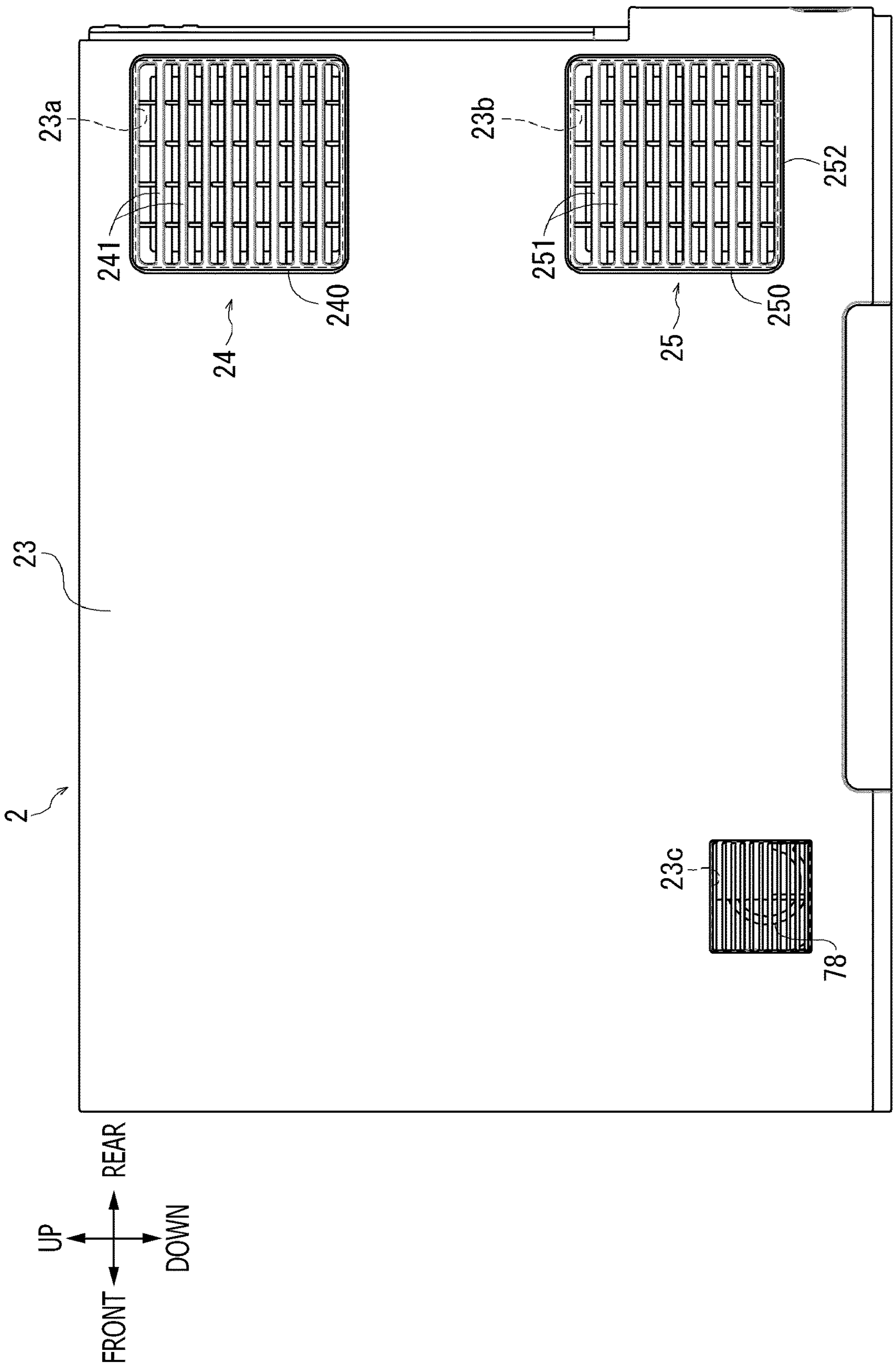
FIG. 5 is a side view showing a right sidewall of the housing.
Figure 6:
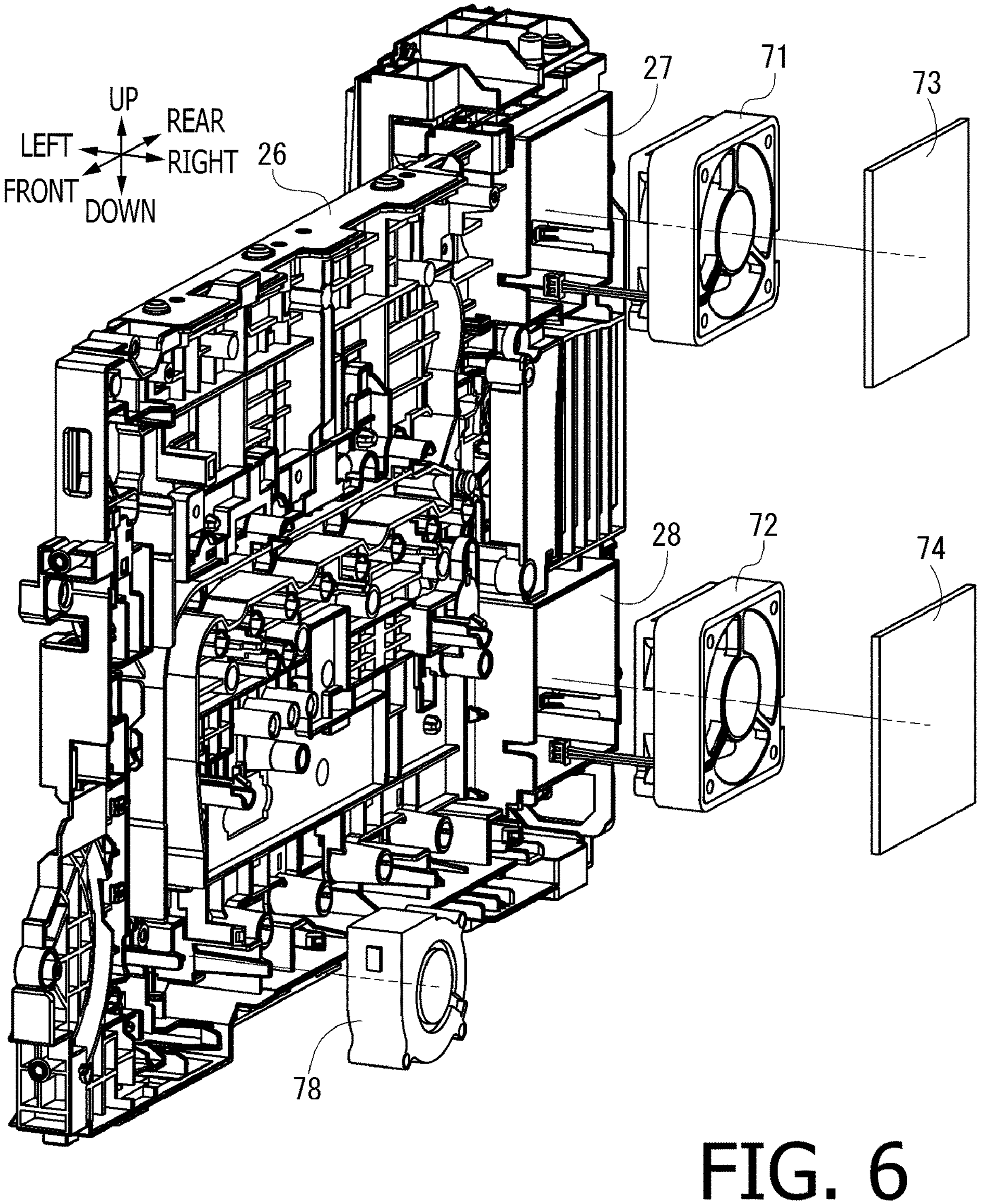
FIG. 6 is an exploded perspective view showing fans and exhaust filters fitted to a right frame.

As shown in FIGS. 2, 5, and 6, the right sidewall 23 includes an intake port 23*c* that penetrates the right sidewall 23 in the left-right direction. The intake port 23*c* is an opening through which air outside the housing 2 can flow into the process unit accommodating part PUS. A third fan 78 that is disposed in the intake port 23*c* and configured to intake air outside the housing 2 into the housing 2 is disposed on an inner side of the right sidewall 23. The third fan 78 is supported by the right frame 26. The third fan 78 is, for example, an axial fan through which air passes in a rotation axis direction, and generates an airflow in which cooling air flows from the outside of the housing 2 to inside of the housing 2. As a result, by driving the third fan 78, it is possible to suppress an increase in temperature inside the housing 2.

A control board 13 configured to control operation of the image forming apparatus 1 is supported on a right side face of the right frame 26. The control board 13 is disposed between the right frame 26 and the right sidewall 23 in the left-right direction and in front of the first fan 71 and the second fan 72 in the front-rear direction.

First Fan, First Exhaust Filter, and First Louver

Figure 7:
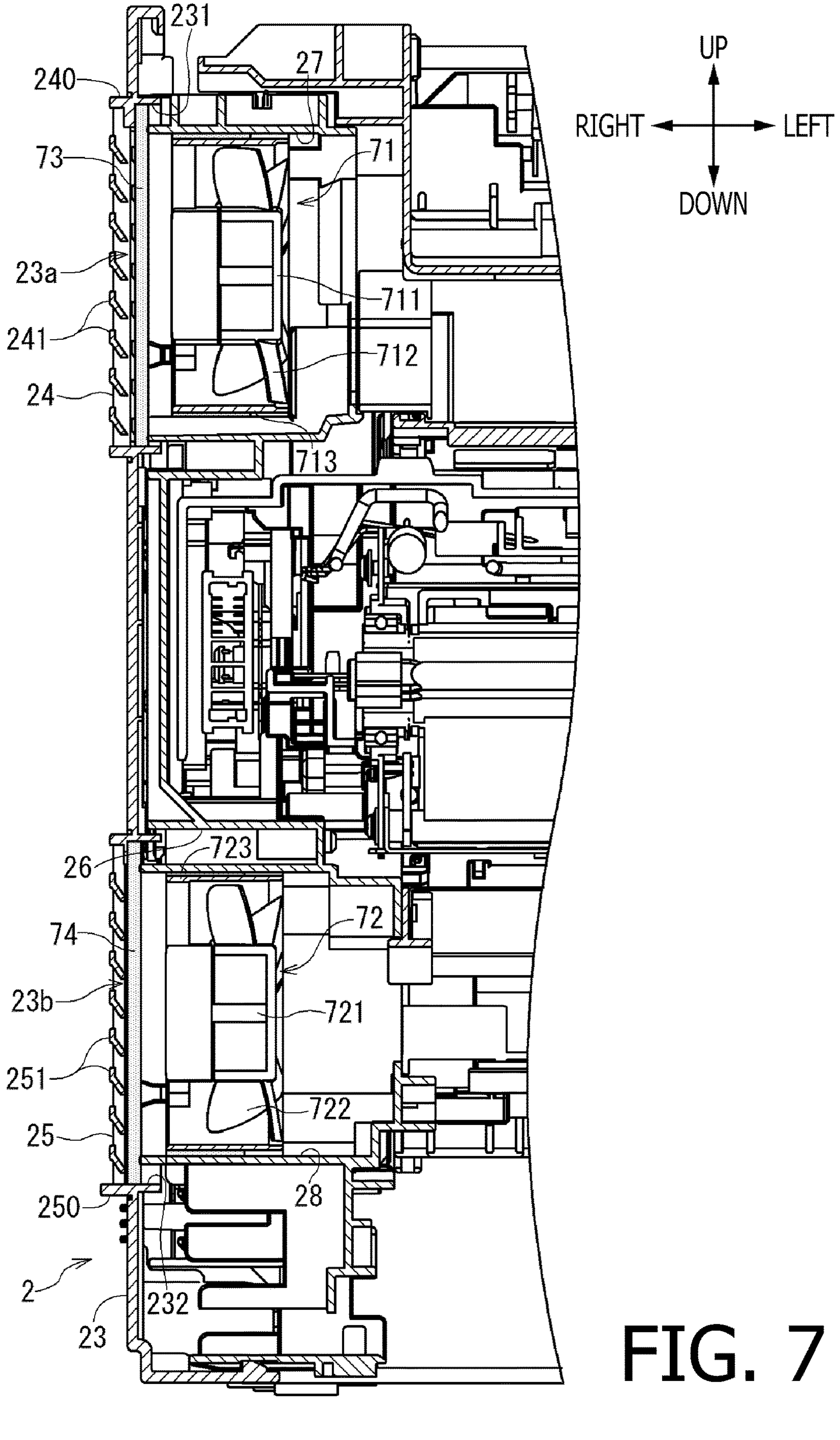
FIG. 7 is a rear cross-sectional view showing first and second fans, first and second exhaust filters, and first and second louvers.
Figure 8:
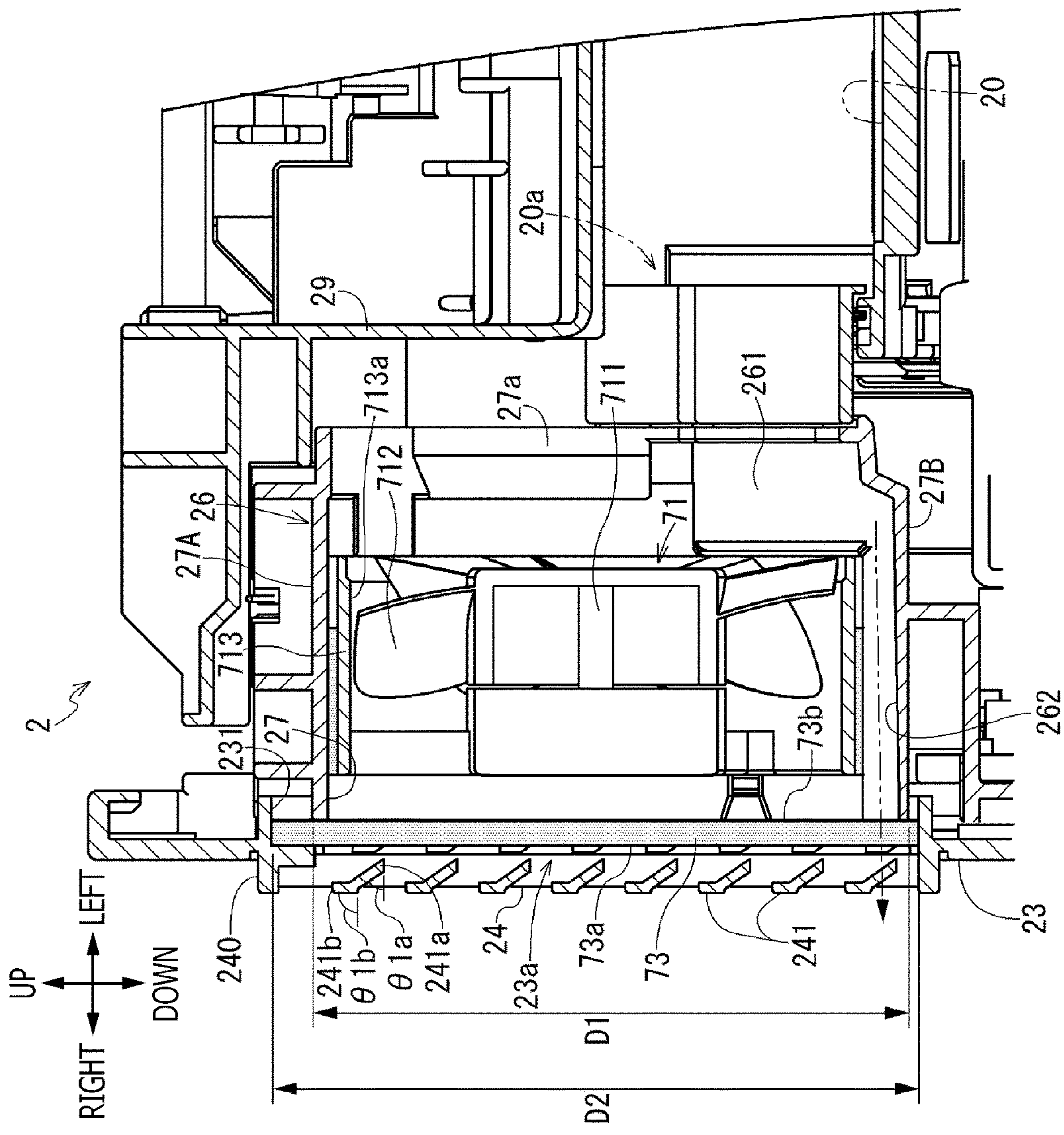
FIG. 8 is a rear cross-sectional view taken along a line A-A in FIG. 4, showing the first fan, the first exhaust filter, and the first louver.

As shown in FIGS. 6 to 8, the right frame 26 disposed inside the housing 2 includes a first duct 27 that penetrates the right frame 26 in the left-right direction. The first fan 71 is fitted in the first duct 27. The first duct 27 extends in the left-right direction and is configured such that air can flow in the first exhausting direction. The first duct 27 accommodates the first fan 71.

The right sidewall 23 of the housing 2 includes a first louver 24 that covers the first exhaust port 23*a*. The first louver 24 communicates the inside and the outside of the housing 2. In the present embodiment, the first louver 24 is formed by being integrally molded with the right sidewall 23. However, the first louver 24 may be detachably attached to the right sidewall 23.

The first louver 24 is disposed on a right side of the first fan 71. That is, the first louver 24 is disposed downstream of the first fan 71 in the first exhausting direction. The first louver 24 protrudes rightward from the right sidewall 23.

The image forming apparatus 1 includes a first exhaust filter 73 disposed between the first fan 71 and the first louver 24 in the left-right direction. The first exhaust filter 73 is disposed downstream of the first fan 71 in the first exhausting direction. The first exhaust filter 73 is an ozone filter through which air exhausted by the first fan 71 passes and which collects ozone contained in the air inside the housing 2. The first exhaust filter 73 can also remove dust such as toner from the exhausted air.

The first exhaust filter 73 is formed of, for example, a honeycomb filter obtained by forming a filter material into a honeycomb shape. The honeycomb filter forming the first exhaust filter 73 has many cells partitioned by partition walls extending along the first exhausting direction.

As the filter material of the first exhaust filter 73, for example, paper carrying an ozone decomposition catalyst such as manganese dioxide or activated carbon, a metal having conductivity such as aluminum, or ceramics can be used.

The first exhaust filter 73 is formed in a rectangular sheet shape. The first exhaust filter 73 includes a first surface 73*a* facing to the right and a second surface 73*b* facing to the left. The first surface 73*a* and the second surface 73*b* are orthogonal to the first exhausting direction.

Inside the housing 2, ozone is generated by a member that generates discharge in the atmosphere, such as the charger 54 included in the process unit PU. In addition, inside the housing 2, toner accommodated in the toner cartridges 50 may float.

The air inside the process unit PU is sucked by the first fan 71 to flow toward a rear side of the process unit PU and then flow rightward, passes through the first exhaust filter 73 so that ozone and dust such as toner are removed, and then is exhausted to the outside of the housing 2 through the first louver 24. Therefore, it is possible to reduce the amount of ozone and dust included in the air that has passed through the process unit and is exhausted by the first fan 71.

The first exhaust filter 73 may be a filter capable of removing at least dust such as toner from the air. The first exhaust filter 73 may also be a filter capable of removing ozone from the air in addition to dust such as toner. By forming the first exhaust filter 73 with a filter capable of removing ozone from the air exhausted by the first fan 71, it is possible to reduce the amount of ozone contained in the air exhausted by the first fan 71.

Figure 9:
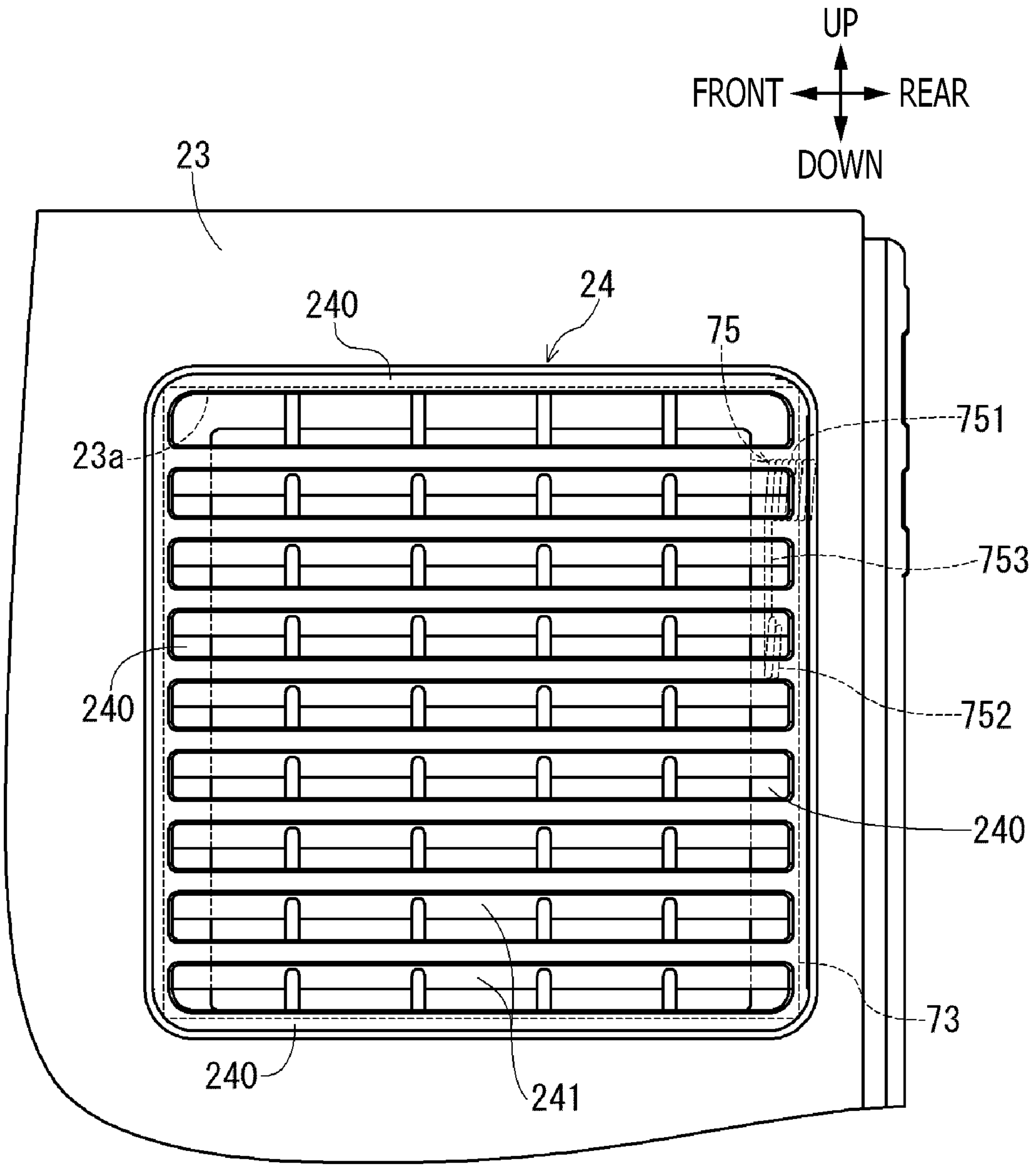
FIG. 9 is a side view showing the first louver.

As shown in FIGS. 8 and 9, the first louver 24 formed to the right sidewall 23 is formed in a rectangular shape along a peripheral edge of the first exhaust port 23*a*. The first louver 24 includes a frame 240 projecting rightward from an outer surface of the right sidewall 23, and a plurality of first crosspieces 241 extending in the front-rear direction within an area surrounded by the frame 240. The plurality of first crosspieces 241 are arranged in the up-down direction with intervals therebetween. The frame 240 is disposed around the first crosspieces 241.

The first louver 24 is disposed downstream of the first exhaust filter 73 in the first exhausting direction, and the frame 240 of the first louver 24 is in contact with the first surface 73*a* of the first exhaust filter 73.

Each first crosspiece 241 is inclined upward from the left to the right. Air flowing from the left to the right passes through the first louver 24, so that flow direction of the air flowing from the left to the right is changed to an obliquely upward direction. Each first crosspiece 241 includes a first portion 241*a* having an inclination angle $\theta 1a$ with respect to a horizontal plane (i.e., a plane parallel to the left-right direction and the front-rear direction), and a second portion 241*b* formed continuously with a right end of the first portion 241*a* and having an inclination angle $\theta 1b$ with respect to the horizontal plane that is larger than the inclination angle $\theta 1a$. Therefore, the flow direction of the air flowing through the first louver 24 from the left to the right can be smoothly changed to the obliquely upward direction.

Figure 24:
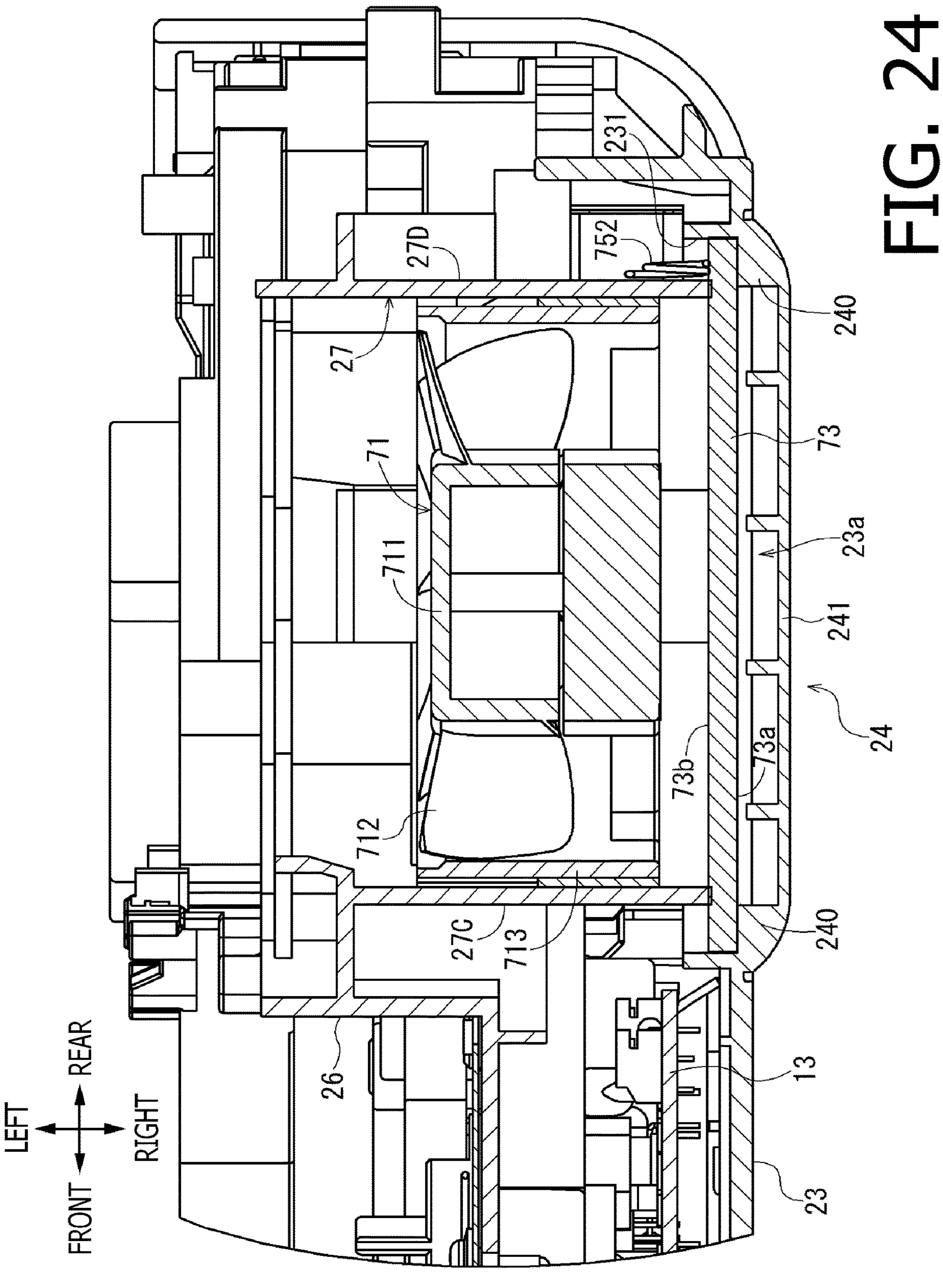
FIG. 24 is a plan cross-sectional view showing a positional relationship between the grounding spring and a control board.
Figure 25:
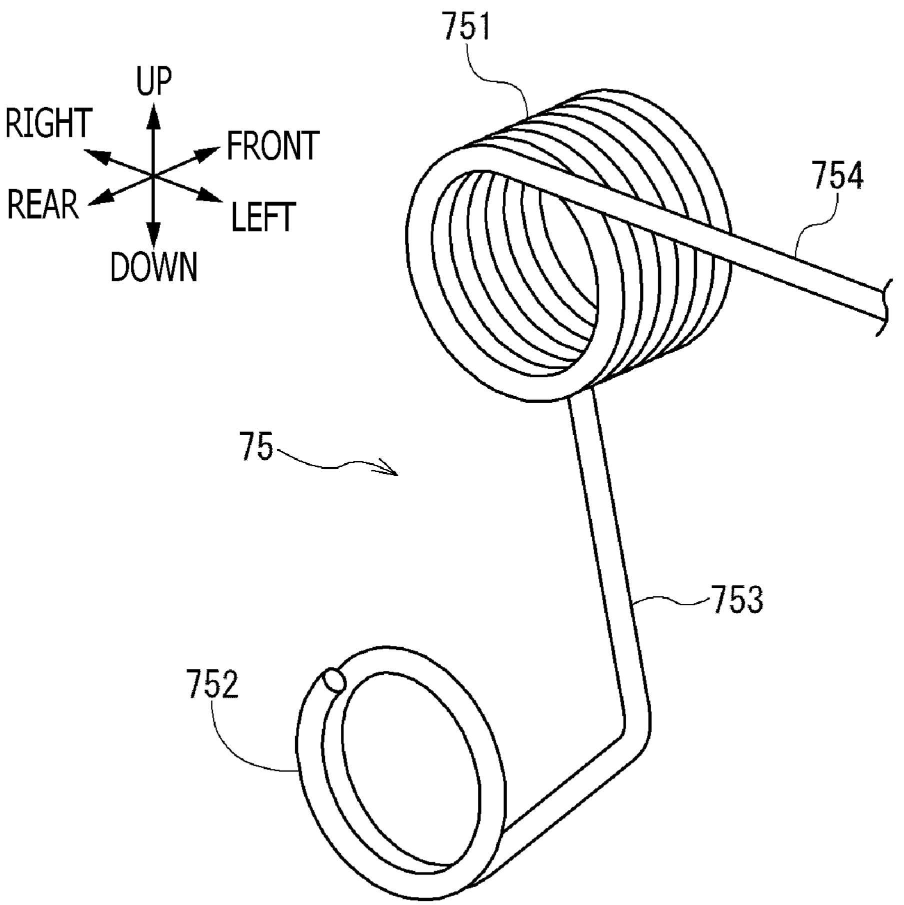
FIG. 25 is a perspective view of the grounding spring.

As shown in FIGS. 9 and 24, front and rear end portions of portions of the frame 240 at upper and lower ends of the first louver 24 extending in the front-rear direction and front and rear end portions of the first crosspieces 241 are round chamfered. That is, the front end portions of the portions of the frame 240 at the upper and lower ends of the first louver 24 and the front end portions of the first crosspieces 241 are formed in an arc shape in which the amount of protrusion from the outer surface of the right sidewall 23 decreases toward the front when viewed in the up-down direction. Similarly, the rear end portions of the portions of the frame 240 at the upper and lower ends of the first louver 24 and the rear end portions of the first crosspieces 241 are formed in an arc shape in which the amount of protrusion from the outer surface of the right sidewall 23 decreases toward the rear when viewed in the up-down direction.

The right sidewall 23 includes a recess 231 that is recessed toward the right which is the downstream side in the first exhausting direction. The recess 231 has a rectangular shape when viewed in the left-right direction. The recess 231 is formed by a peripheral wall that is formed in a rectangular shape along a peripheral edge of the first exhaust port 23*a*. The first louver 24 is disposed on a right side of the recess 231, and the first louver 24 and the recess 231 communicate with each other via the first exhaust port 23*a*. The first exhaust filter 73 is fitted inside the recess 231, and is disposed in a state in which an inner peripheral surface of the recess 231 and an outer peripheral surface of the first exhaust filter 73 are in contact with each other. The first exhaust filter 73 is supported by the right sidewall 23 of the housing 2.

The recess 231 covers an outer peripheral surface of the first exhaust filter 73. The first exhaust filter 73 is disposed with a gap between the first fan 71 in the left-right direction. Dimensions D1 of the first duct 27 each orthogonal to the left-right direction are smaller than dimensions D2 of the recess 231 each orthogonal to the left-right direction. In other words, the dimensions D1 of the first duct 27 each orthogonal to the left-right direction are smaller than dimensions of the first exhaust filter 73 each orthogonal to the left-right direction because the inner peripheral surface of the recess 231 and the outer peripheral surface of the first exhaust filter 73 are in contact with each other. It should be noted that FIG. 8 shows the dimension D1 and the dimension D2 in the up-down direction which are ones of the dimensions orthogonal to the left-right direction.

The first duct 27 projects farther than the first fan 71 to the right, and a right end of the first duct 27 is in contact with the second surface 73*b* of the first exhaust filter 73. The right end of the first duct 27 is in contact with the second surface 73*b* of the first exhaust filter 73 over the entire perimeter of the right end of the first duct 27. The right end of the first duct 27 and the inner peripheral surface of the recess 231 overlap each other when viewed in the up-down direction and the front-rear direction.

Since the entire perimeter of the right end of the first duct 27 is in contact with the second surface 73*b* of the first exhaust filter 73, the air sent by the first fan 71 can be caused to pass through the first exhaust filter 73 without leakage. Therefore, the amount of dust such as toner contained in the air exhausted to the outside of the housing 2 can be sufficiently reduced.

An outer shape of the first exhaust filter 73 is formed to be larger than an outer shape of the first fan 71 and, when viewed in the left-right direction, the entire first fan 71 overlaps with the first exhaust filter 73. The first surface 73*a* of the first exhaust filter 73 is in contact with a left end of the first louver 24.

Since the first surface 73*a* of the first exhaust filter 73 is in contact with the left end of the first louver 24, it is possible to suppress air that has not passed through the first exhaust filter 73 from being exhausted from between the first exhaust filter 73 and the first louver 24. In addition, it is possible to reduce the size of the image forming apparatus 1 in the left-right direction.

Figure 10:
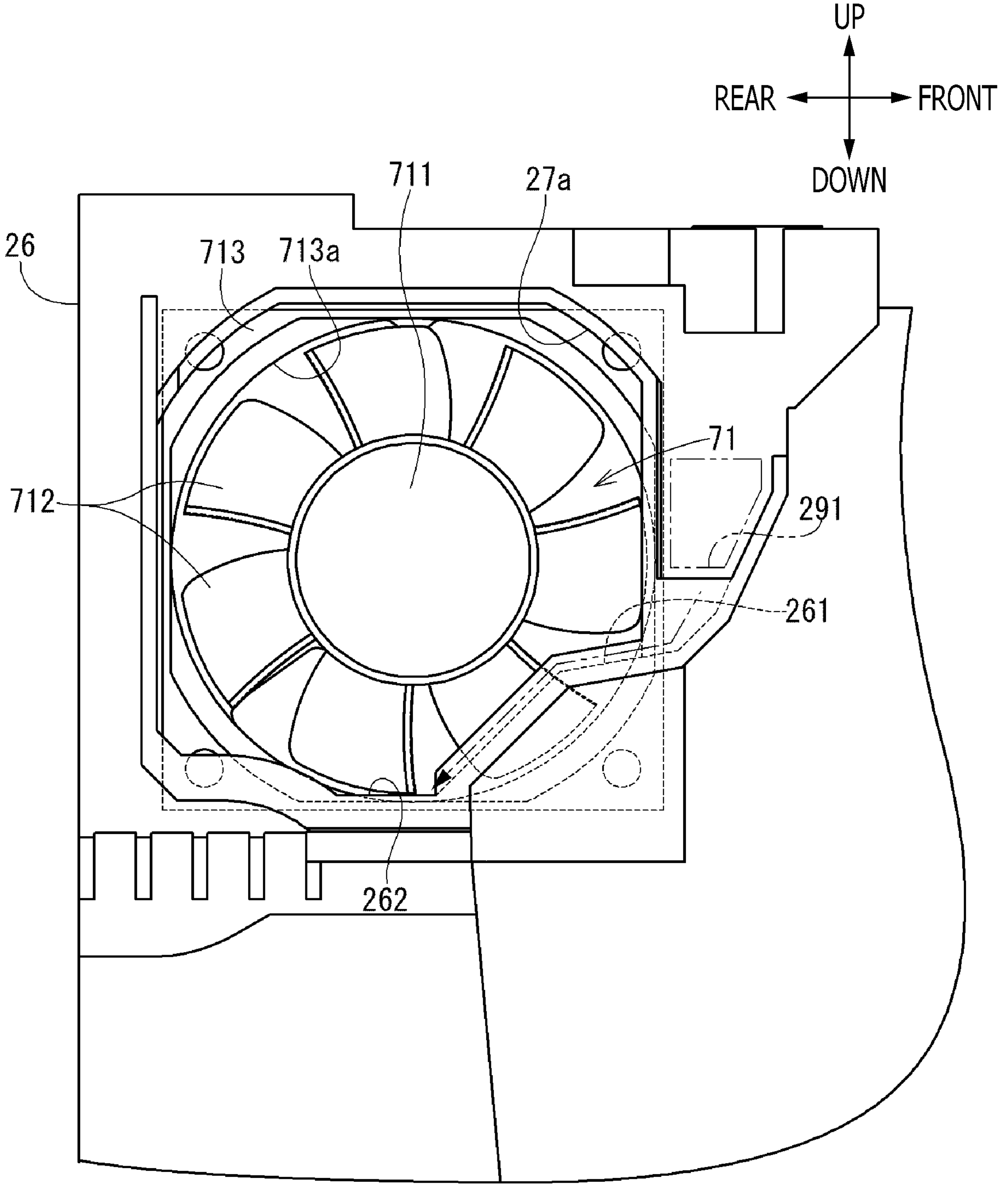
FIG. 10 is a side view showing a fan fitted to the right frame as viewed from the left.

As shown in FIGS. 8 and 10, the first fan 71 is an axial flow fan that includes a rotating shaft 711 extending in the left-right direction, blades 712 fixed to the rotating shaft 711, and a case 713 that rotatably supports the rotating shaft 711, and is configured to send air along an axial direction of the rotating shaft 711. An outer shape of the case 713 of the first fan 71 is formed in a rectangular shape. The outer shape of the case 713 forms an outer shape of the first fan 71. The case 713 includes a circular inner peripheral surface 713*a*, and the blades 712 are disposed within an area surrounded by the inner peripheral surface 713*a*.

The right frame 26 includes an opening 27*a* at a left end portion of the first duct 27. The air inside the housing 2 to be discharged by the first fan 71 is introduced into the first duct 27 through the opening 27*a*.

Hook for Positioning First Fan

Figure 11:
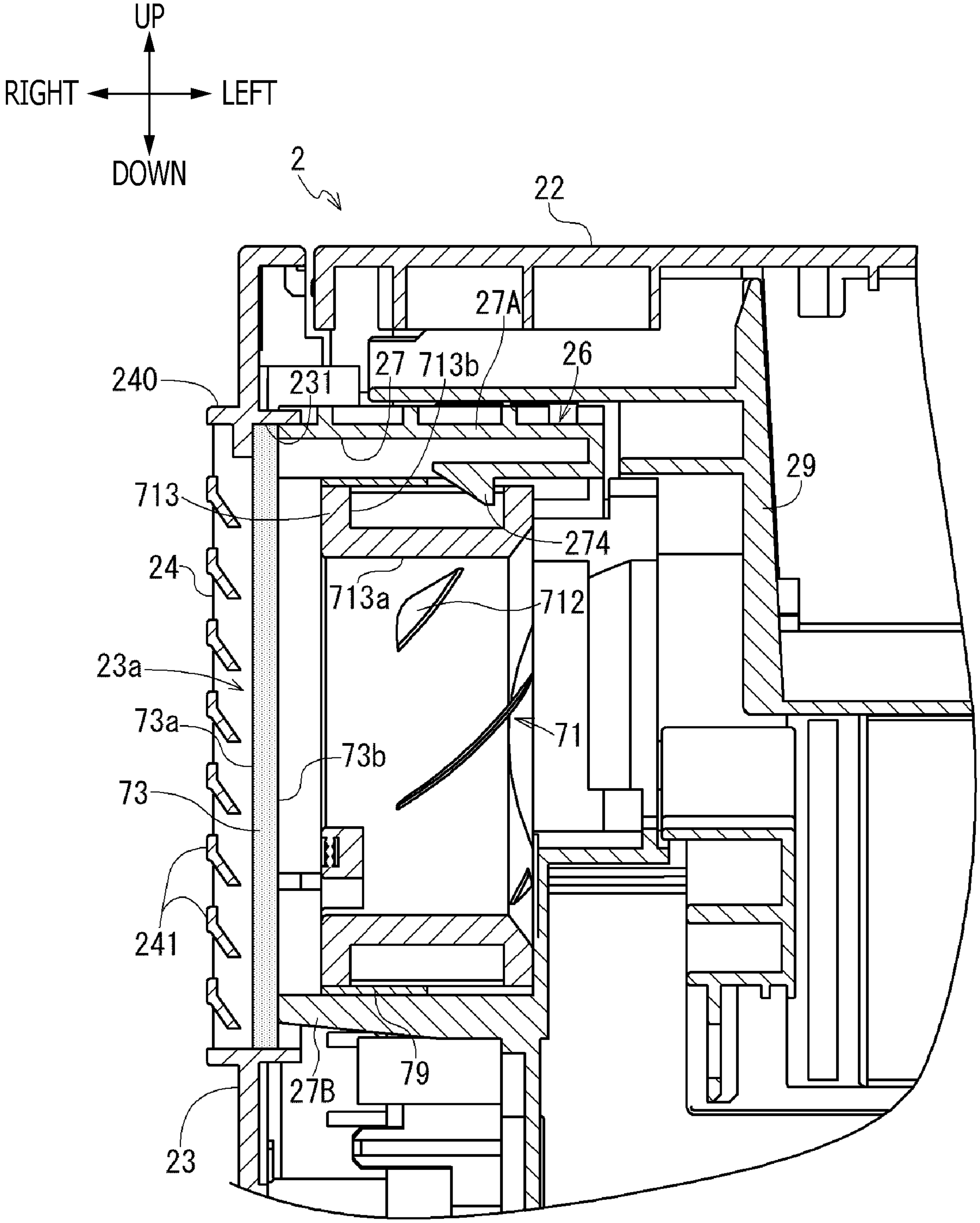
FIG. 11 is a cross-sectional view taken along a line B-B in FIG. 4.

As shown in FIG. 11, a locking groove 713*b* that is recessed toward the inner peripheral surface 713*a* is formed on an outer peripheral surface of the case 713 of the first fan 71. The first duct 27 includes a hook 274 that projects toward the first fan 71 and that locks to the locking groove 713*b* of the first fan 71. When the hook 274 is locked to the locking groove 713*b*, the first fan 71 is positioned with respect to the first duct 27 in the left-right direction.

By positioning the first fan 71 with respect to the first duct 27 by the hook 274 and the locking groove 713*b*, it is possible to keep a distance between the first fan 71 and the first exhaust filter 73 constant in the left-right direction.

Seal Between First Fan and First Duct

A seal 79 is disposed between the outer peripheral surface of the case 713 of the first fan 71 and an inner peripheral surface of the first duct 27. The seal 79 closes a gap between the case 713 of the first fan 71 and the first duct 27.

By disposing the seal 79 between an outer peripheral surface of the first fan 71 and the inner peripheral surface of the first duct 27 to fill the gap between the first fan 71 and the first duct 27, it is possible to suppress the air sent by the first fan 71 from leaking from between the first fan 71 and the first duct 27.

The seal 79 is disposed on a right side of the hook 274. Therefore, the seal 79 and the hook 274 do not interfere with each other, and thus it is possible to further suppress leakage of air from between the first fan 71 and the first duct 27.

Figure 12B:
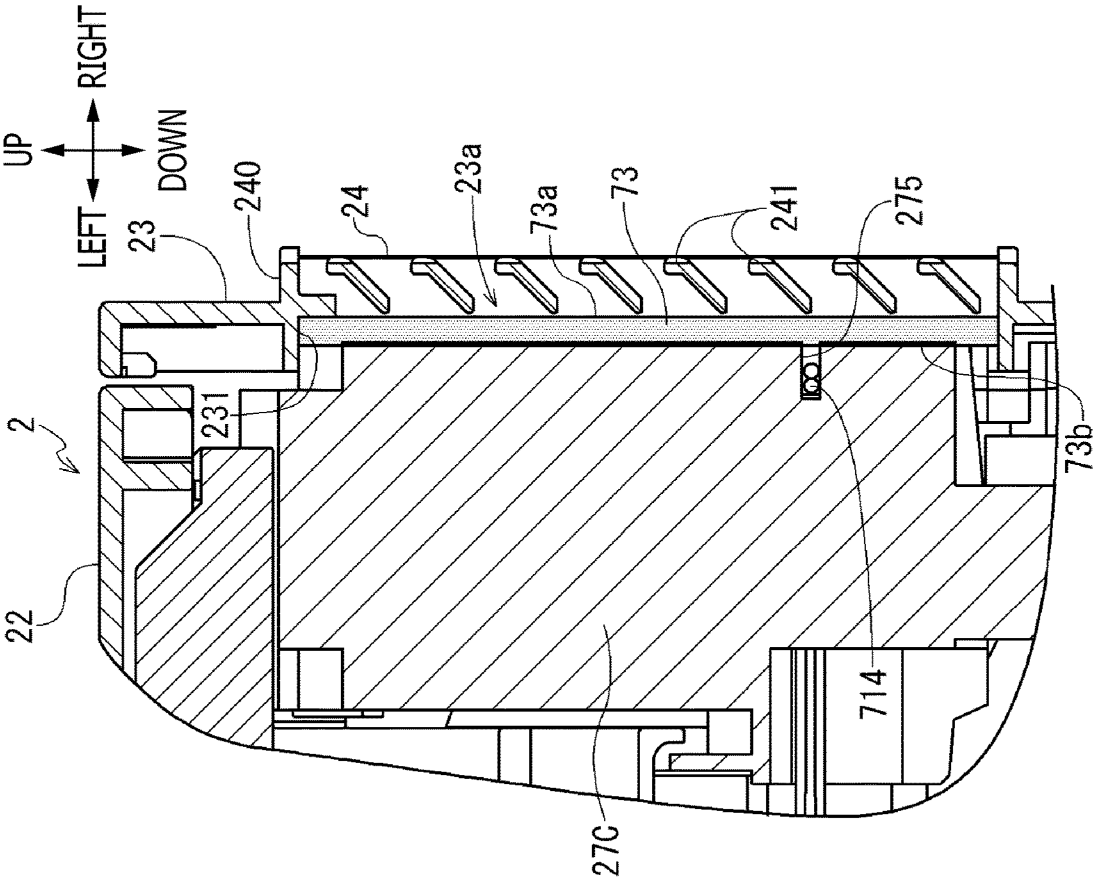
FIG. 12B is a front cross-sectional view showing the cutout formed to the first duct.
Figure 12A:
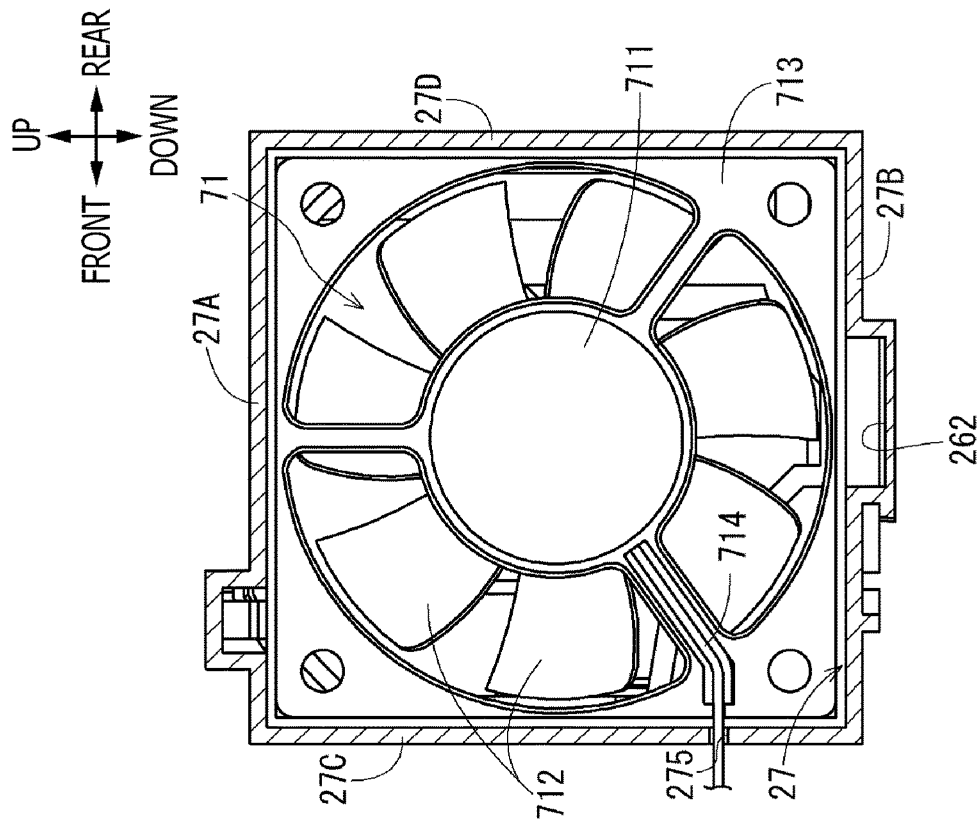
FIG. 12A is a side cross-sectional view showing a cutout formed to a first duct.

As shown in FIG. 12, the first duct 27 includes an upper wall 27A located above the first fan 71, a lower wall 27B located below the first fan 71, a front wall 27C located in front of the first fan 71, and a rear wall 27D located behind the first fan 71. The upper wall 27A, the lower wall 27B, the front wall 27C, and the rear wall 27D constitute a peripheral wall of the first duct 27.

The outer peripheral surface of the first fan 71 is surrounded by the upper wall 27A, the lower wall 27B, the front wall 27C, and the rear wall 27D constituting the peripheral wall of the first duct 27. Right ends of the upper wall 27A, the lower wall 27B, the front wall 27C, and the rear wall 27D are in contact with the second surface 73*b* of the first exhaust filter 73.

A cutout 275 penetrating in the front-rear direction is formed to the front wall 27C of the first duct 27. The first fan 71 includes a harness 714 configured to connect the first fan 71 to a power supply for driving the first fan 71. The cutout 275 is formed such that the harness 714 can pass therethrough. The harness 714 is connected to the first fan 71 and can pass through the cutout 275 from inside to outside of the first duct 27.

Since the first duct 27 has the cutout 275, the harness 714 can be drawn out of the first duct 27 even when the first duct 27 is extended closer to the first exhaust filter 73 side than the first fan 71 and the entire perimeter of the first duct 27 is made to contact the first exhaust filter 73.

In the present embodiment, the cutout 275 is formed to the front wall 27C. However, the cutout 275 may be formed to the upper wall 27A, the lower wall 27B, or the rear wall 27D.

Intermediate Filter

Figure 13:
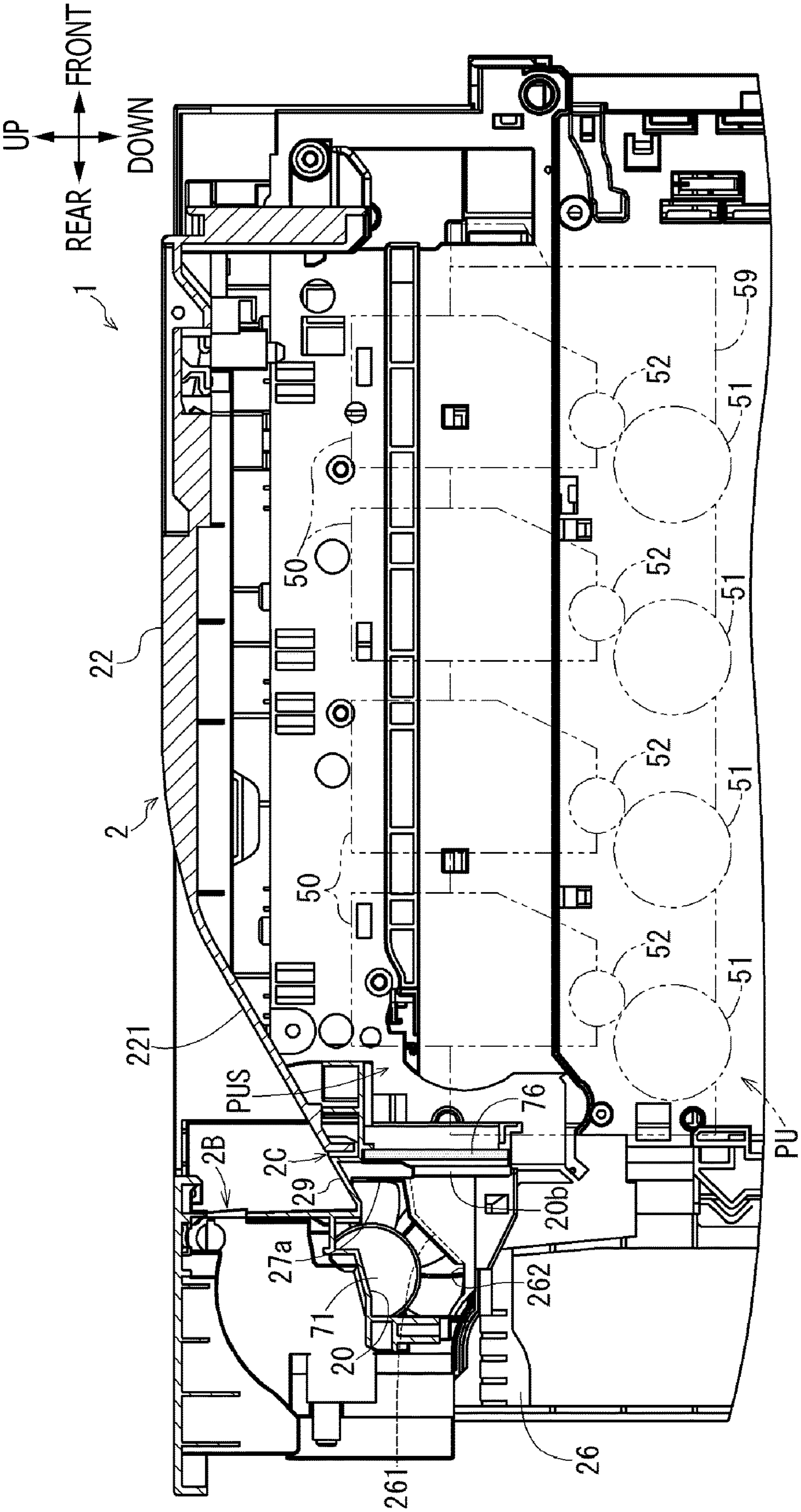
FIG. 13 is a side cross-sectional view showing an intermediate filter provided inside the housing.
Figure 14:
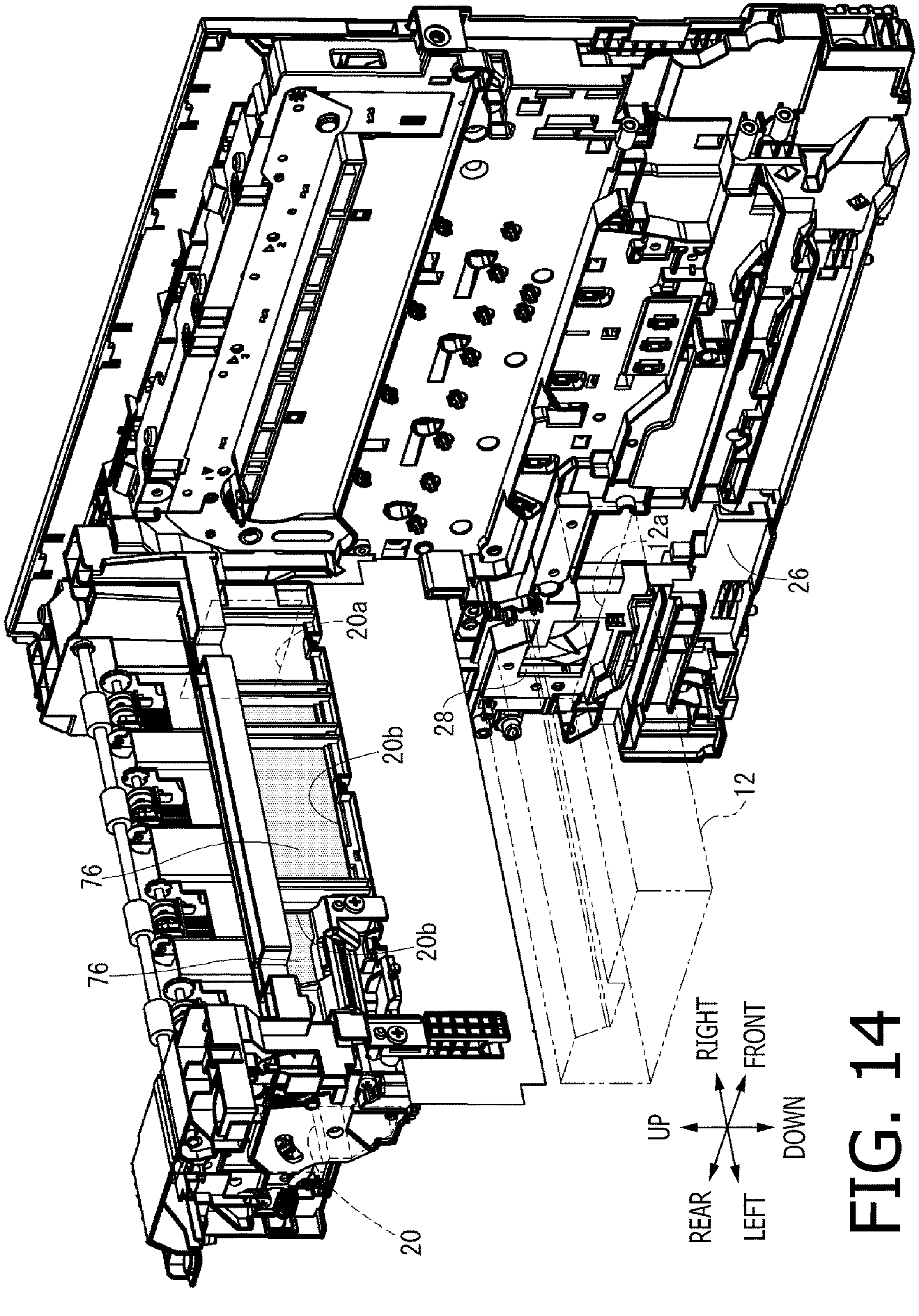
FIG. 14 is a perspective view showing the intermediate filter and a process duct.

As shown in FIGS. 1, 13, and 14, the image forming apparatus 1 includes an intermediate filter 76. The intermediate filter 76 is disposed inside the housing 2 between the process unit PU and the first duct 27 and is located behind the process unit PU.

The intermediate filter 76 is formed of, for example, a honeycomb filter obtained by forming a filter material into a honeycomb shape. The honeycomb filter forming the intermediate filter 76 has many cells partitioned by partition walls extending along the front-rear direction.

As the filter material of the intermediate filter 76, for example, paper carrying an ozone decomposition catalyst such as manganese dioxide or activated carbon, a metal such as aluminum, or ceramics can be used. The intermediate filter 76 is formed in a rectangular sheet shape.

A process duct 20 is disposed between the process unit PU and the first duct 27. The process duct 20 guides the air inside the process unit PU accommodated in the process unit accommodating part PUS to the first exhaust port 23*a* on the right sidewall 23. The process duct 20 extends in the left-right direction behind the process unit PU.

The process duct 20 includes a first opening 20*a* at a right end thereof and second openings 20*b* at a forward-facing front wall. The first opening 20*a* faces the right frame 26 and communicates with the first duct 27 of the right frame 26. The first opening 20*a* faces the first duct 27 in the left-right direction. The first opening 20*a* faces the first exhaust port 23*a* of the right sidewall 23 located on a side opposite to the process duct 20 across the right frame 26 in the left-right direction.

The second openings 20*b* open into the process unit accommodating part PUS and face the process unit PU in the front-rear direction. The intermediate filter 76 is supported by the process duct 20 and covers the second openings 20*b*.

The air inside the process unit PU is sucked by the first fan 71 to flow toward the rear side of the process unit PU, passes through the intermediate filter 76, and enters the process duct 20. The air that has passed through the intermediate filter 76 flows rightward inside the process duct 20, flows through the first duct 27 from the first opening 20*a*, passes through the first exhaust filter 73, and is then exhausted to the outside of the housing 2 through the first louver 24.

Ozone and dust such as toner are removed from the air inside the process unit PU when the air passes through the intermediate filter 76, and ozone and dust such as toner are further removed when the air passes through the first exhaust filter 73.

Since dust and the like can be removed from the air that has passed through the process unit PU with the intermediate filter 76 before the air that has passed through the process unit PU reaches the first exhaust filter 73, it is possible to further reduce dust and the like contained in the air that is exhausted to the outside of the housing 2 through the first exhaust filter 73.

The intermediate filter 76 may be a filter capable of removing at least dust such as toner from the air. The intermediate filter 76 may also be a filter capable of removing ozone from the air in addition to dust such as toner. By forming the intermediate filter 76 with a filter capable of removing ozone from the air exhausted by the first fan 71, it is possible to reduce the amount of ozone contained in the air exhausted by the first fan 71.

Figure 15:
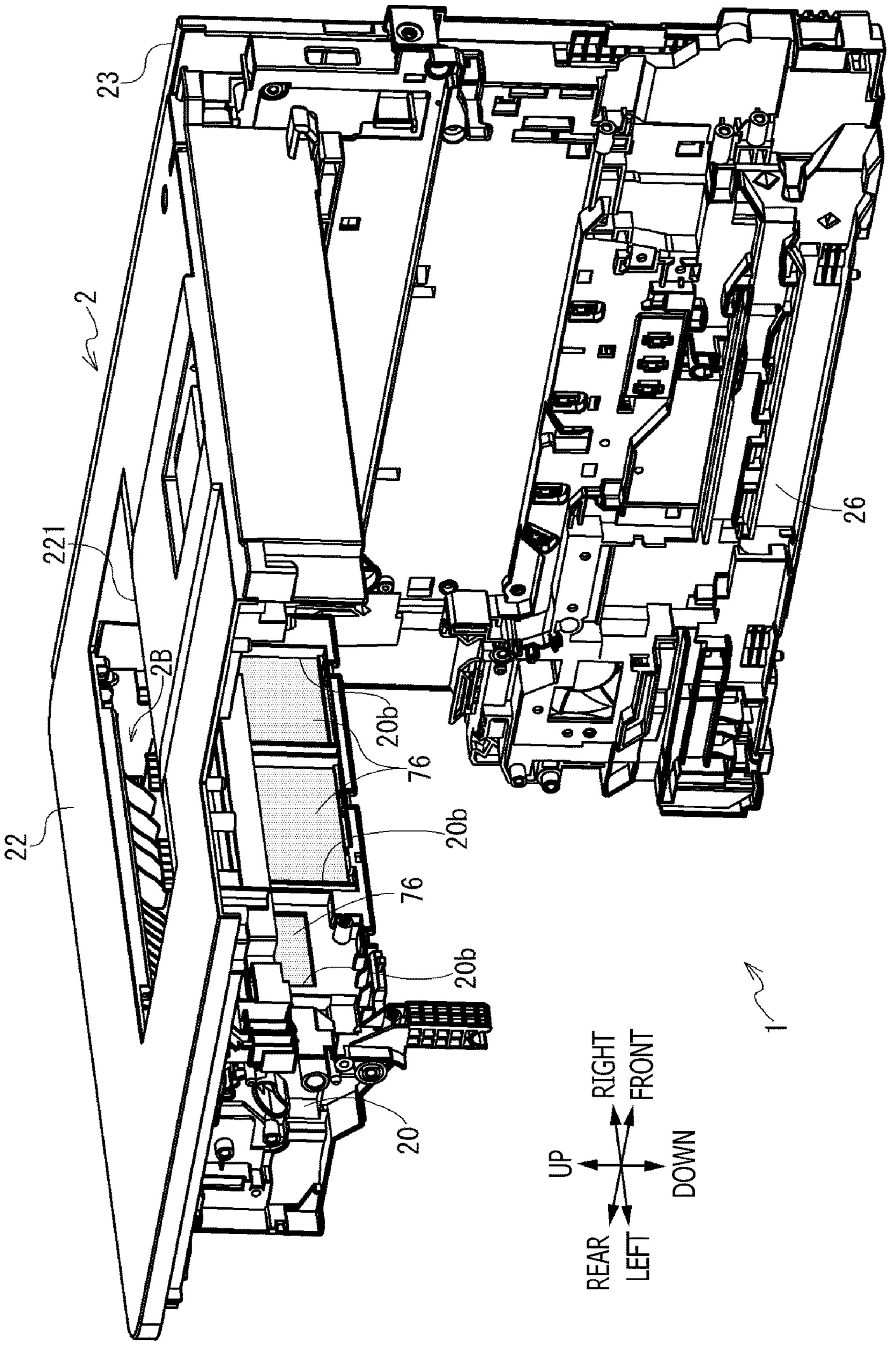
FIG. 15 is a perspective view showing a modification of the intermediate filter.
Figure 16:
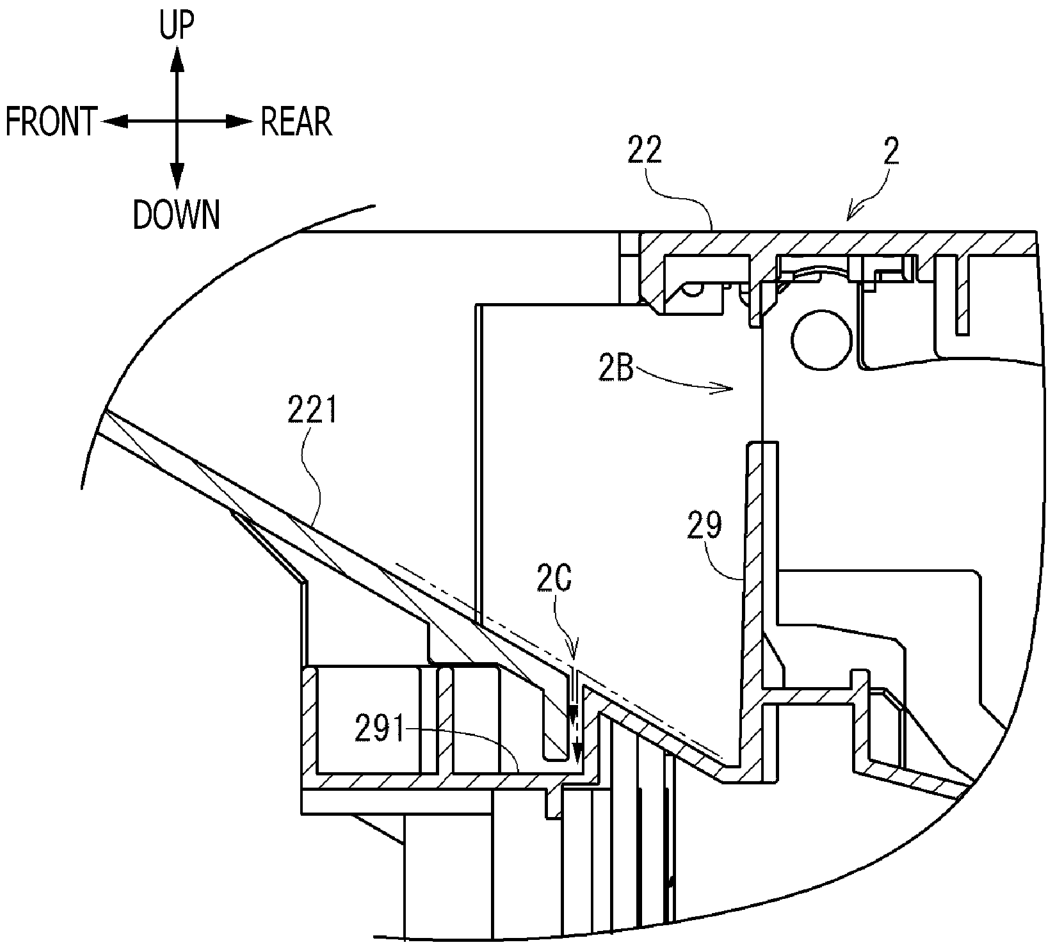
FIG. 16 is a cross-sectional view taken along a line C-C in FIG. 4.
Figure 17:
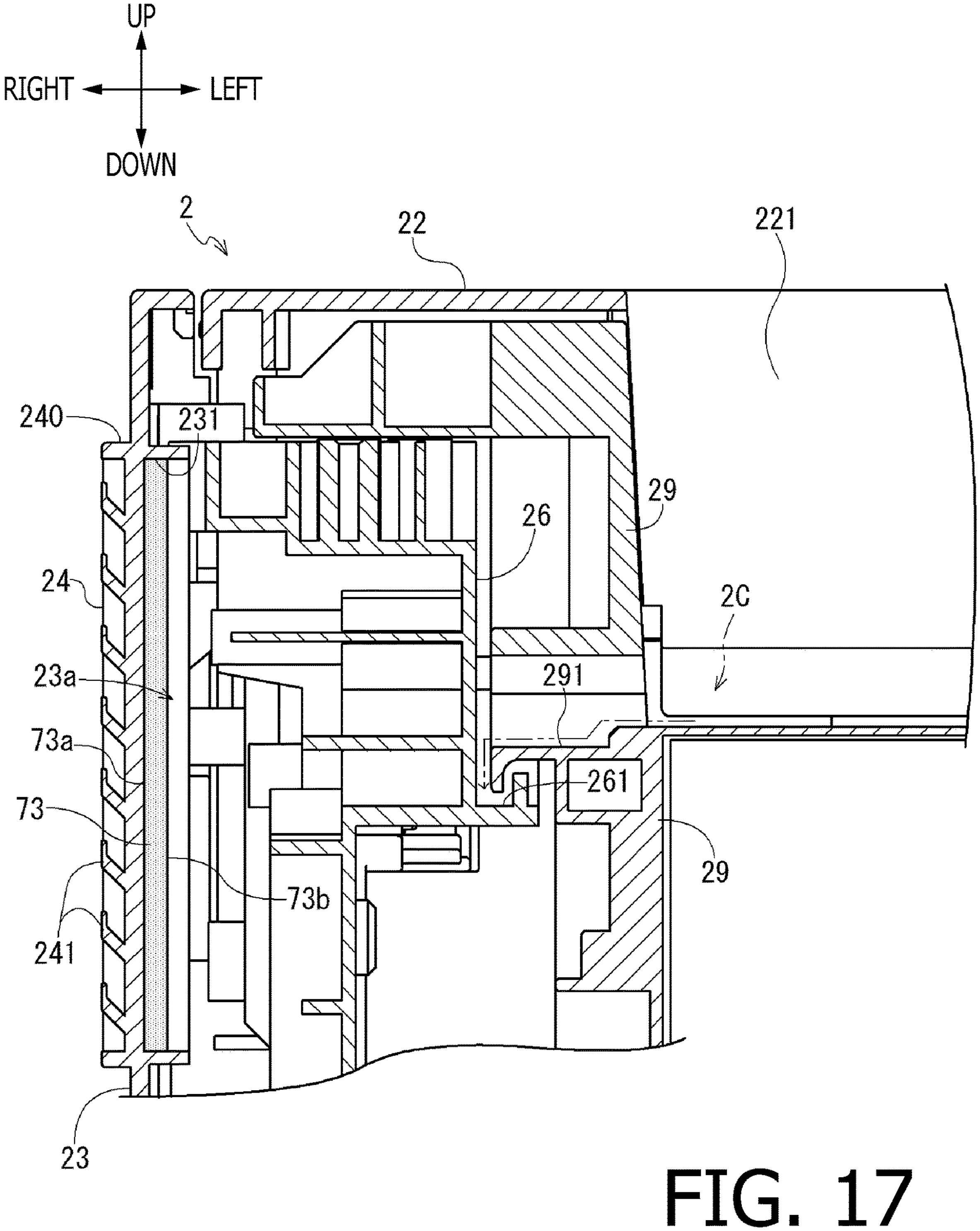
FIG. 17 is a cross-sectional view taken along a line D-D in FIG. 4.
Figure 18:
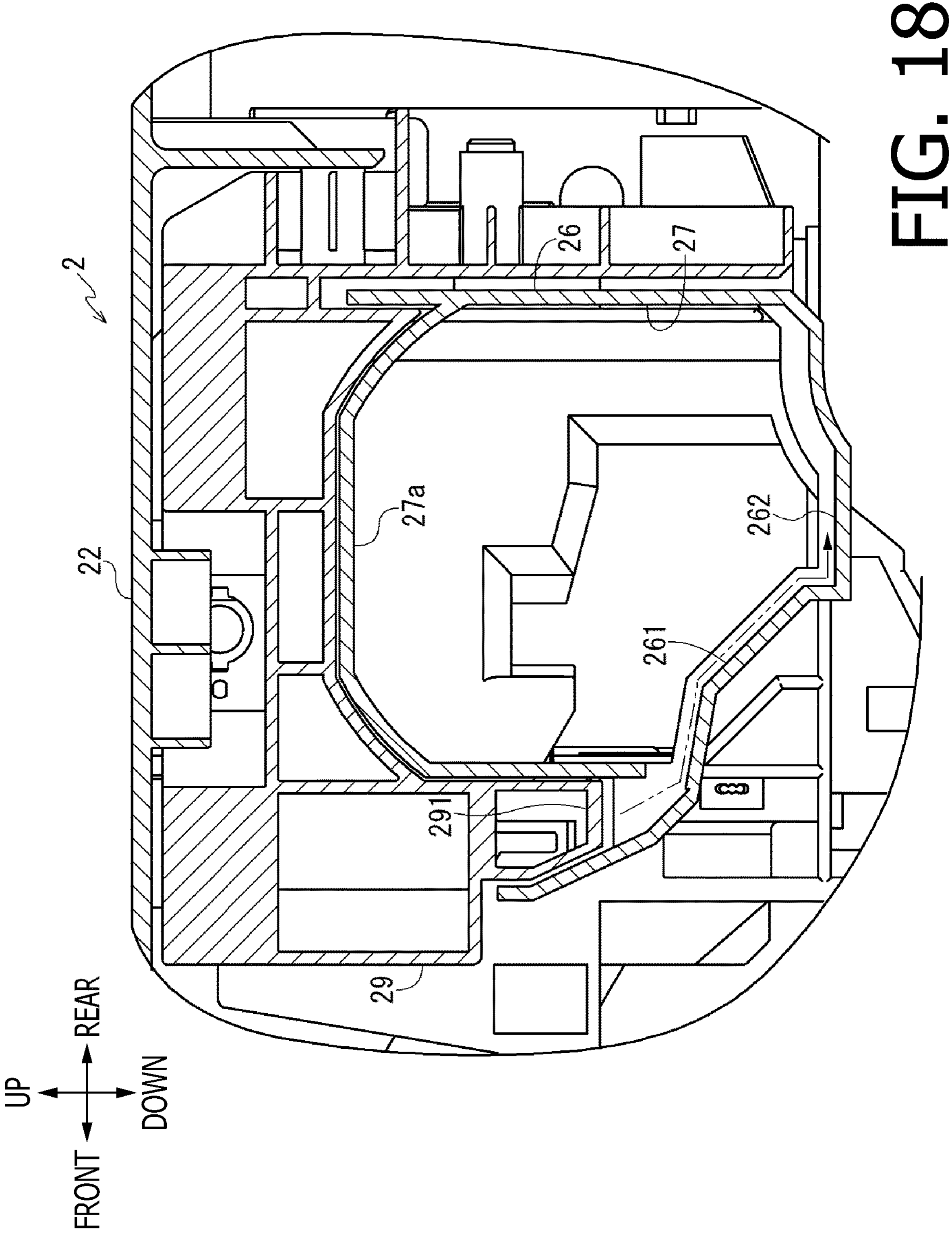
FIG. 18 is a cross-sectional view taken along a line E-E in FIG. 4.

As shown in FIG. 14, in the present embodiment, the intermediate filter 76 is disposed slightly closer to the center in the left-right direction. However, as shown in FIG. 15, another second opening 20*b* may be formed at the right end side of the front wall of the process duct 20, and the intermediate filter 76 may be disposed to extend further to the right end side than in the case shown in FIG. 14.

Liquid Flow Path

As shown in FIGS. 1 to 4, 13, 16, and 17, a slit 2C penetrating in the up-down direction is formed between the sheet discharge tray 221 and the discharge frame 29 of the housing 2. The slit 2C extends in the left-right direction. The discharge frame 29 includes a flow path 291 disposed below the slit 2C. The flow path 291 extends from below the slit 2C toward a right side of the slit 2C.

For example, when liquid such as water is splashed on the sheet discharge tray 221 or the discharge frame 29 of the housing 2, the splashed liquid flows downward through the slit 2C and enters the housing 2. The liquid flowing downward through the slit 2C falls into the flow path 291 and flows rightward along the flow path 291.

As shown in FIGS. 8, 10, 17, and 18, the right frame 26 includes a first flow path 261 and a second flow path 262 through which liquid can flow.

The first flow path 261 is at a front lower portion of a peripheral edge of the opening 27*a* of the first duct 27. The first flow path 261 extends in the up-down direction and is inclined rearward from the upper side toward the lower side. A front end portion of the first flow path 261 is located below a right end of the flow path 291.

The second flow path 262 is formed continuously with a lower end of the first flow path 261 and extends in the left-right direction The second flow path 262 is formed on an upper surface of the lower wall 27B of the first duct 27. The second flow path 262 is located below the first fan 71 and is formed to extend between the first fan 71 and the recess 231 in the left-right direction.

The liquid flowing along the flow path 291 falls from the right end of the flow path 291 to the first flow path 261, and then flows along the first flow path 261 The liquid that has flowed along the first flow path 261 further flows along the second flow path 262, and then is discharged to the outside of the housing 2 through the first exhaust filter 73 and the first louver 24.

Since the right frame 26 is provided with flow paths such as the first flow path 261 and the second flow path 262 through which liquid flows, when liquid splashed on the top cover 22 or the like of the housing 2 flows up to the first duct 27 of the right frame 26, the liquid can be made to flow through the first flow path 261 and the second flow path 262. The liquid that has flowed through the first flow path 261 and the second flow path 262 can be further discharged to the outside of the housing 2 through the first exhaust filter 73 and the first louver 24.

Second Fan, Second Exhaust Filter, and Second Louver

Figure 19:
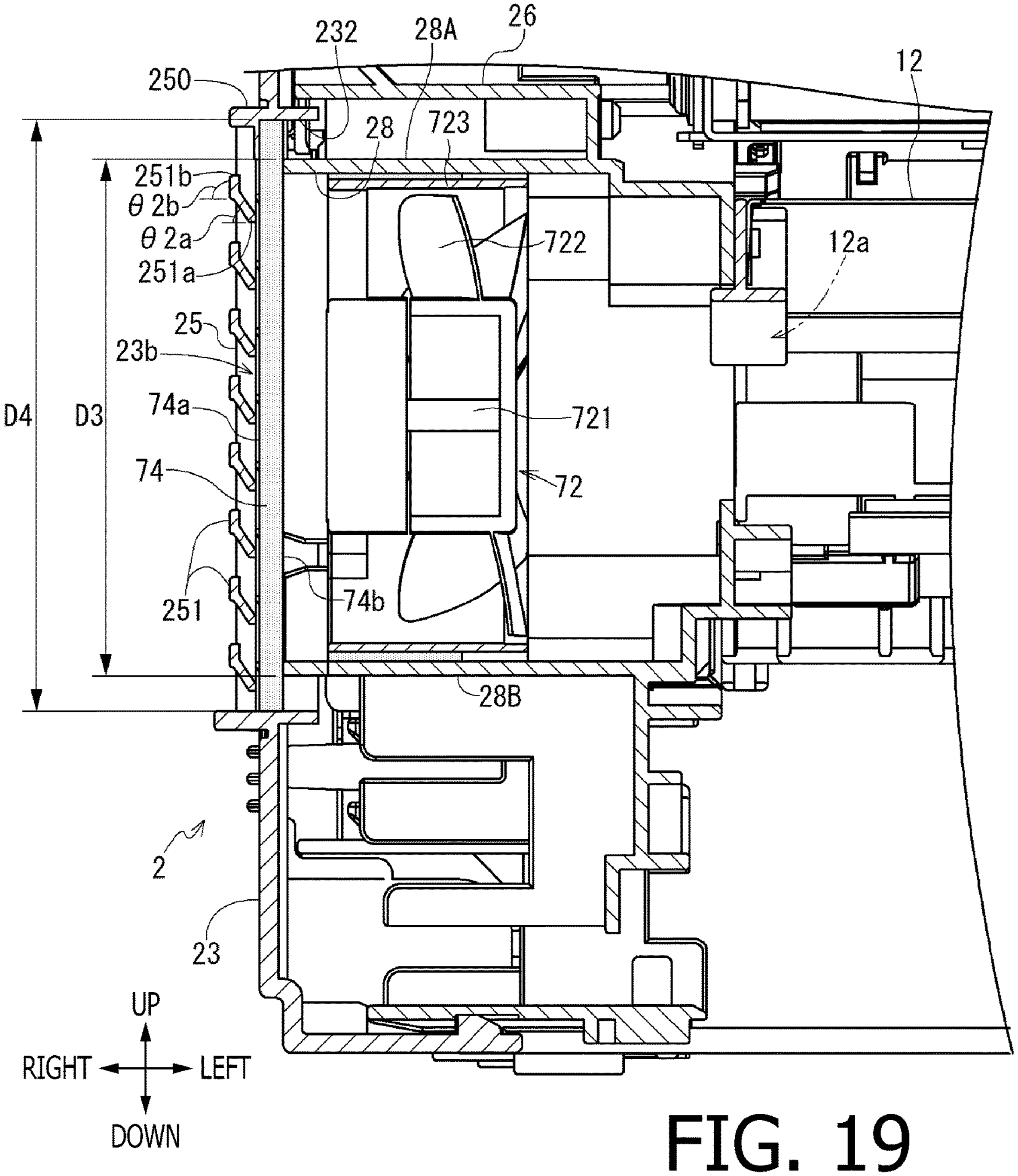
FIG. 19 is a rear cross-sectional view showing a second fan, a second exhaust filter, and a second louver.

As shown in FIGS. 6, 7, and 19, the right frame 26 disposed inside the housing 2 includes a second duct 28 that penetrates the right frame 26 in the left-right direction. The second duct 28 is located below the first duct 27. The second fan 72 is fitted into the second duct 28. The second duct 28 extends in the left-right direction, and is configured to allow air to flow in the second exhausting direction. The second duct 28 accommodates the second fan 72.

The right sidewall 23 of the housing 2 includes a second louver 25 that covers the second exhaust port 23*b*. The second louver 25 communicates the inside and the outside of the housing 2. In the present embodiment, the second louver 25 is formed by being integrally molded with the right sidewall 23. However, the second louver 25 may be detachably attached to the right sidewall 23.

The second louver 25 is disposed on a right side of the second fan 72. That is, the second louver 25 is disposed downstream of the second fan 72 in the second exhausting direction. The second louver 25 protrudes rightward from the right sidewall 23.

The image forming apparatus 1 includes a second exhaust filter 74 disposed between the second fan 72 and the second louver 25 in the left-right direction. The second exhaust filter 74 is disposed downstream of the second fan 72 in the second exhausting direction. The second exhaust filter 74 is an ozone filter through which air exhausted by the second fan 72 passes and which collects ozone contained in the air inside the housing 2. The second exhaust filter 74 can also remove dust such as toner from the exhausted air.

The second exhaust filter 74 is formed of, for example, a honeycomb filter obtained by forming a filter material into a honeycomb shape. The honeycomb filter forming the second exhaust filter 74 has many cells partitioned by partition walls extending along the second exhausting direction.

As the filter material of the second exhaust filter 74, for example, paper carrying an ozone decomposition catalyst such as manganese dioxide or activated carbon, a metal having conductivity such as aluminum, or ceramics can be used.

The second exhaust filter 74 is formed in a rectangular sheet shape. The second exhaust filter 74 includes a first surface 74*a* facing to the right and a second surface 74*b* facing to the left. The first surface 74*a* and the second surface 74*b* are orthogonal to the second exhausting direction.

The air inside the board cover 12 accommodated in the housing 2 is heated by electronic components mounted on the power supply board 11 and thus its temperature easily rises. The air inside the board cover 12 flows from the left to the right by the second fan 72, passes through the second exhaust filter 74 so that ozone, dust, and the like are removed, and is then exhausted to the outside of the housing 2 through the second louver 25. By exhausting the air inside the board cover 12 to the outside of the housing 2 by the second fan 72, the temperature of the air inside the board cover 12 can be lowered.

The second exhaust filter 74 may be a filter capable of removing at least dust such as toner from the air. The second exhaust filter 74 may also be a filter capable of removing ozone from the air in addition to dust such as toner. By forming the second exhaust filter 74 with a filter capable of removing ozone from the air exhausted by the second fan 72, it is possible to reduce the amount of ozone contained in the air exhausted by the second fan 72.

As shown in FIGS. 14 and 19, the board cover 12 includes a third opening 12*a* at a right end portion thereof. The third opening 12*a* faces the right frame 26 and communicates with the second duct 28 of the right frame 26. The third opening 12*a* faces the second duct 28 in the left-right direction. The third opening 12*a* faces the second exhaust port 23*b* of the right sidewall 23 located on a side opposite side to the board cover 12 across the right frame 26 in the left-right direction. The second fan 72 is disposed to face the second exhaust port 23*b* and exhausts the air inside the board cover 12 through the third opening 12*a* to the outside of the housing 2.

Figure 20:
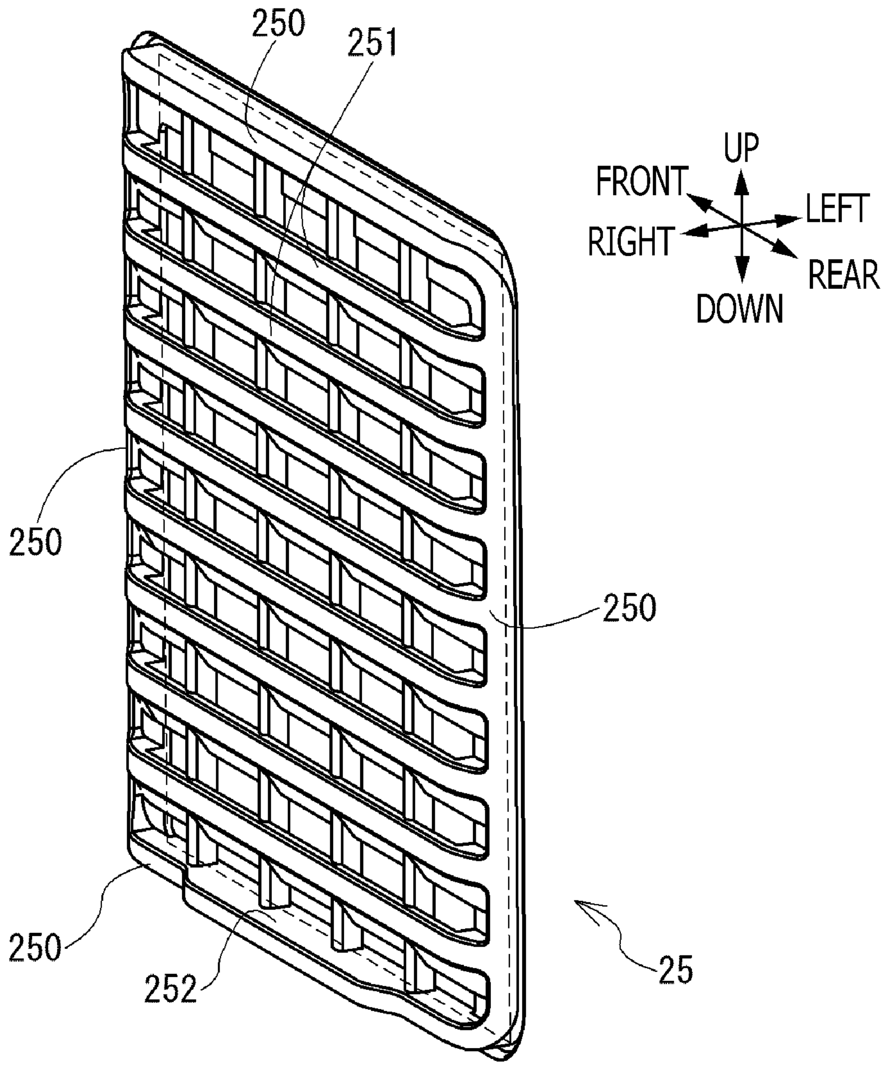
FIG. 20 is a perspective view of the second louver.
Figure 21:
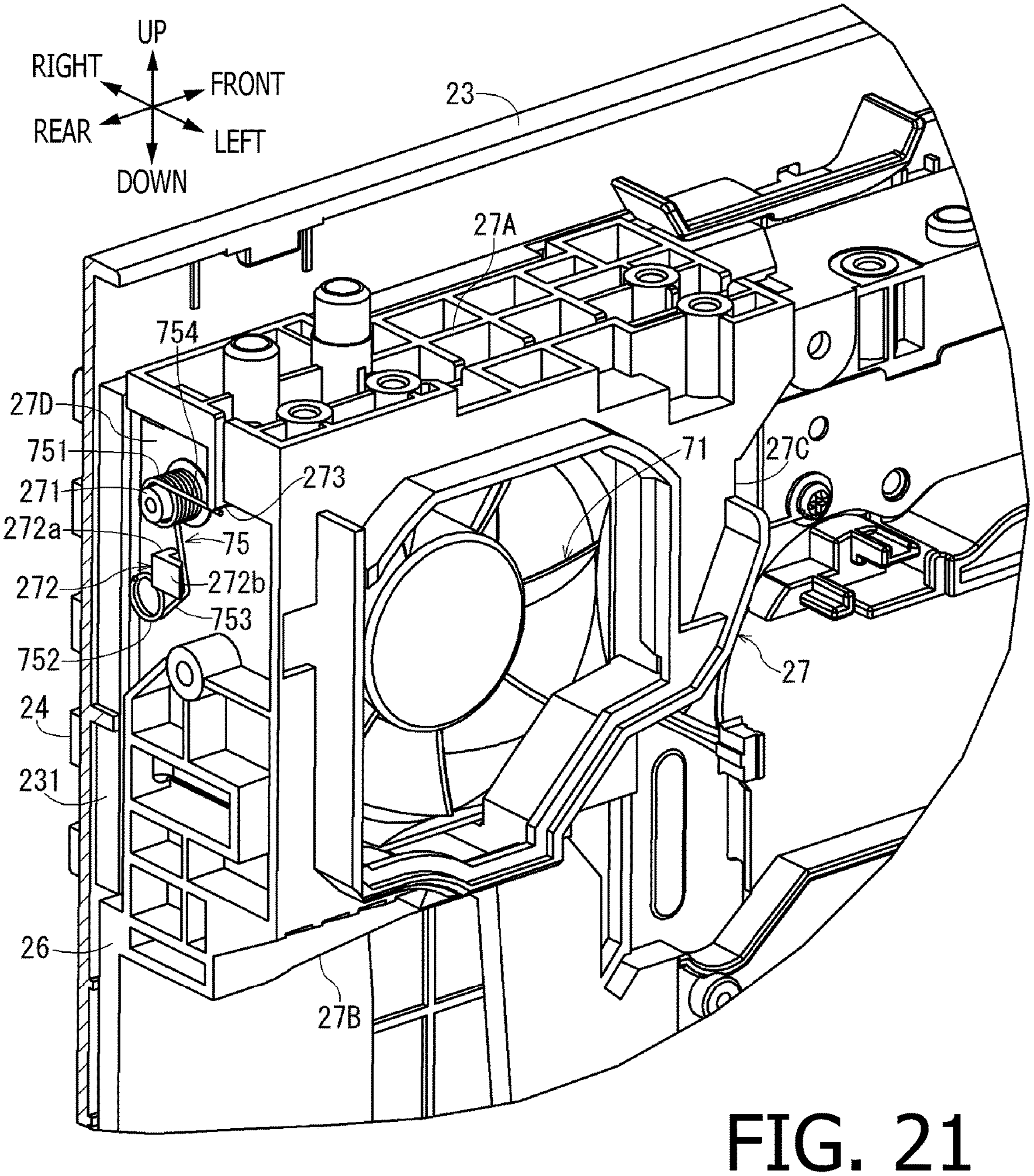
FIG. 21 is a perspective view showing a grounding spring supported by the first duct.

As shown in FIGS. 19 and 20, the second louver 25 formed to the right sidewall 23 is formed in a rectangular shape along a peripheral edge of the second exhaust port 23*b*. The second louver 25 includes a frame 250 projecting rightward from the outer surface of the right sidewall 23, and a plurality of second crosspieces 251 extending in the front-rear direction within an area surrounded by the frame 250. The plurality of second crosspieces 251 are arranged in the up-down direction with intervals therebetween. The frame 250 is disposed around the second crosspieces 251.

The second louver 25 is disposed downstream of the second exhaust filter 74 in the second exhausting direction, and the frame 250 of the second louver 25 is in contact with the first surface 74*a* of the second exhaust filter 74.

Each second crosspiece 251 is inclined upward from the left to the right. Air flowing from the left to the right passes through the second louver 25, so that flow direction of the air flowing from the left to the right is changed to an obliquely upward direction. Each second crosspiece 251 includes a first portion 251*a* having an inclination angle θ2*a* with respect to the horizontal plane, and a second portion 251*b* formed continuously with a right end of the first portion 251*a* and having an inclination angle θ2*b* with respect to the horizontal plane that is larger than the inclination angle θ2*a*. Therefore, the flow direction of the air flowing through the second louver 25 from the left to the right can be smoothly changed to the obliquely upward direction.

Figure 27:
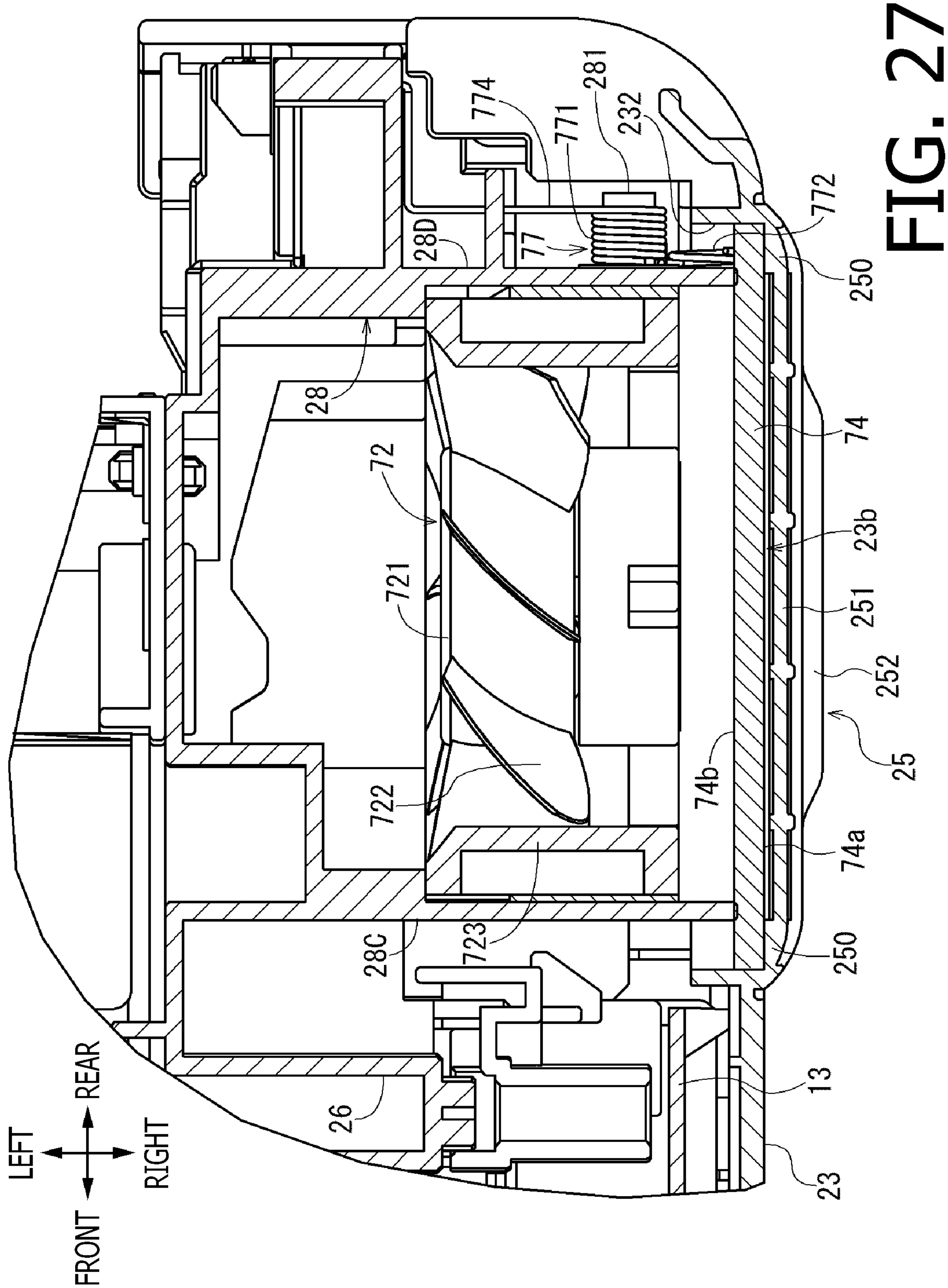
FIG. 27 is a plan cross-sectional view showing the grounding spring supported by the second duct.

As shown in FIGS. 20 and 27, front and rear end portions of portions of the frame 250 at upper and lower ends of the second louver 25 extending in the front-rear direction and front and rear end portions of the second crosspieces 251 are round chamfered. That is, the front end portions of the portions of the frame 250 at the upper and lower ends of the second louver 25 and the front end portions of the second crosspieces 251 are formed in an arc shape in which the amount of protrusion from the outer surface of the right sidewall 23 decreases toward the front when viewed in the up-down direction. Similarly, the rear end portions of the portions of the frame 250 at the upper and lower ends of the second louver 25 and the rear end portions of the second crosspieces 251 are formed in an arc shape in which the amount of protrusion from the outer surface of the right sidewall 23 decreases toward the rear when viewed in the up-down direction.

The second louver 25 includes a rib 252 projecting rightward from the portion of the frame 250 at the lower end of the second louver 25. Since the second louver 25 includes the rib 252 projecting rightward relative to the frame 250, when installing the image forming apparatus 1 while bringing the right sidewall 23 close to a wall, the rib 252 contacts the wall before the frame 250 and the second crosspieces 251 contact the wall. Therefore, gaps are formed between the wall and the frame 250 and second crosspieces 251, and thus the second exhaust port 23*b* is not blocked by the wall. Accordingly, it is possible to suppress obstruction of exhaust from the second exhaust port 23*b*.

Furthermore, since the rib 252 is provided at the lower end of the second louver 25 disposed at the lower side among the first louver 24 and the second louver 25, even when a height of the wall to which the right sidewall 23 is brought close is low, the rib 252 contacts the wall and a gap can be secured between the wall and the frame 250 and second crosspieces 251.

The right sidewall 23 includes a recess 232 that is recessed toward the right which is the downstream side in the second exhausting direction. The recess 232 has a rectangular shape when viewed in the left-right direction. The recess 232 is formed by a peripheral wall that is formed in a rectangular shape along a peripheral edge of the second exhaust port 23*b*. The second louver 25 is disposed on a right side of the recess 232, and the second louver 25 and the recess 232 communicate with each other via the second exhaust port 23*b*. The second exhaust filter 74 is fitted inside the recess 232, and is disposed in a state in which an inner peripheral surface of the recess 232 and an outer peripheral surface of the second exhaust filter 74 are in contact with each other. The second exhaust filter 74 is supported by the right sidewall 23 of the housing 2.

The recess 232 covers an outer peripheral surface of the second exhaust filter 74. The second exhaust filter 74 is disposed with a gap between the second fan 72 in the left-right direction. Dimensions D3 of the second duct 28 each orthogonal to the left-right direction are smaller than dimensions D4 of the recess 232 each orthogonal to the left-right direction. In other words, the dimensions D3 of the second duct 28 each orthogonal to the left-right direction are smaller than dimensions of the second exhaust filter 74 each orthogonal to the left-right direction because the inner peripheral surface of the recess 232 and the outer peripheral surface of the second exhaust filter 74 are in contact with each other. It should be noted that FIG. 19 shows the dimension D3 and the dimension D4 in the up-down direction which are ones of the dimensions orthogonal to the left-right direction.

The second duct 28 projects farther than the second fan 72 to the right, and a right end of the second duct 28 is in contact with the second surface 74*b* of the second exhaust filter 74. The right end of the second duct 28 is in contact with the second surface 74*b* of the second exhaust filter over the entire perimeter of the right end of the second duct 28. The right end of the second duct 28 and the inner peripheral surface of the recess 232 overlap each other when viewed in the up-down direction and the front-rear direction.

Since the entire perimeter of the right end of the second duct 28 is in contact with the second surface 74*b* of the second exhaust filter 74, the air sent by the second fan 72 can be caused to pass through the second exhaust filter 74 without leakage. Therefore, the amount of dust such as toner contained in the air exhausted to the outside of the housing 2 can be sufficiently reduced.

An outer shape of the second exhaust filter 74 is formed to be larger than an outer shape of the second fan 72 and, when viewed in the left-right direction, the entire second fan 72 overlaps with the second exhaust filter 74. The first surface 74*a* of the second exhaust filter 74 is in contact with a left end of the second louver 25.

Since the first surface 74*a* of the second exhaust filter 74 is in contact with the left end of the second louver 25, it is possible to suppress air that has not passed through the second exhaust filter 74 from being exhausted from between the second exhaust filter 74 and the second louver 25. In addition, it is possible to reduce the size of the image forming apparatus 1 in the left-right direction.

The second fan 72 is an axial flow fan that includes a rotating shaft 721 extending in the left-right direction, blades 722 fixed to the rotating shaft 721, and a case 723 that rotatably supports the rotating shaft 721, and is configured to send air along an axial direction of the rotating shaft 721. An outer shape of the case 723 of the second fan 72 is formed in a rectangular shape. The outer shape of the case 723 forms an outer shape of the second fan 72. The second fan 72 is disposed upstream of the second louver 25 in the second exhausting direction.

As shown in FIGS. 19 and 27, the second duct 28 includes an upper wall 28A located above the second fan 72, a lower wall 28B located below the second fan 72, a front wall 28C located in front of the second fan 72, and a rear wall 28D located behind the second fan 72. The upper wall 28A, the lower wall 28B, the front wall 28C, and the rear wall 28D constitute a peripheral wall of the second duct 28.

An outer peripheral surface of the second fan 72 is surrounded by the upper wall 28A, the lower wall 28B, the front wall 28C, and the rear wall 28D constituting the peripheral wall of the second duct 28. Right ends of the upper wall 28A, the lower wall 28B, the front wall 28C, and the rear wall 28D are in contact with the second surface 74*b* of the second exhaust filter 74.

The second fan 72 and the second duct 28 are provided with a locking groove and a hook similar to the locking groove 713*b* of the first fan 71 and the hook 274 of the first duct 27 so that the second fan 72 can be positioned with respect to the second duct 28 in the left-right direction by locking the hook of the second duct 28 to the locking groove of the second fan 72.

Furthermore, a seal similar to the seal 79 provided between the first fan 71 and the first duct 27 may be provided between an outer peripheral surface of the case 723 of the second fan 72 and an inner peripheral surface of the second duct 28 to close a gap between the second fan 72 and the second duct 28. Additionally, by forming a cutout similar to the cutout 275 of the first duct 27 in any one of the upper wall 28A, the lower wall 28B, the front wall 28C, and the rear wall 28D of the second duct 28, a harness connected to the second fan 72 can be passed from inside to outside of the second duct 28 through the cutout.

Grounding Spring

Grounding Spring 75 Supported by First Duct 27

As shown in FIGS. 21 to 25, the image forming apparatus 1 includes a grounded grounding spring 75. The grounding spring 75 is supported by the rear wall 27D of the first duct 27. The grounding spring 75 is a coil spring formed by winding a wire having conductivity and spring property.

The grounding spring 75 includes a first coil portion 751 and a second coil portion 752 each formed in a cylindrical shape by winding a wire material, a first arm portion 753 extending from the first coil portion 751 and connecting the first coil portion 751 and the second coil portion 752, and a second arm portion 754 extending from the first coil portion 751 and different from the first coil portion 751. A direction in which the first arm portion 753 extends from the first coil portion 751 is different from a direction in which the second arm portion 754 extends from the first coil portion 751.

A boss 271 projects rearward from a rear side surface of the rear wall 27D of the first duct 27, and the first coil portion 751 of the grounding spring 75 is rotatably supported by the boss 271. That is, the grounding spring 75 is supported by an outer peripheral surface of the peripheral wall constituting the first duct 27.

The first arm portion 753 extends substantially downward from the first coil portion 751, then bends rightward, and extends obliquely downward to the right. The second coil portion 752 is connected to a distal end of the first arm portion 753.

The second arm portion 754 extends leftward from the first coil portion 751 and is grounded. The second arm portion 754 is grounded by being connected to, for example, a conductive metal frame of the image forming apparatus 1. The grounding spring 75 generates a biasing force acting in a circumferential direction of the first coil portion 751 and that urges the second arm portion 754 to move upward.

The second coil portion 752 is disposed below and to a right side of the first coil portion 751 and is in contact with the second surface 73*b* of the first exhaust filter 73. Since the first exhaust filter 73 is grounded through the grounding spring 75 by the second coil portion 752 being in contact with the first exhaust filter 73, accumulation of static electricity in the first exhaust filter 73 is suppressed, and discharge from the first exhaust filter 73 to other members such as the first fan 71 can be suppressed.

The second coil portion 752 of the grounding spring 75 which is a coil spring is formed in a cylindrical shape, and thus a portion of the second coil portion 752 which comes into contact with the first exhaust filter 73 is formed in an arc shape which is convex toward the first exhaust filter 73.

By making the second coil portion 752 having a portion formed in an arc shape that is convex toward the first exhaust filter 73 contact the first exhaust filter 73, it is possible to improve load stability against the first exhaust filter 73 when the grounding spring 75 comes into contact with the first exhaust filter 73.

The grounding spring 75 generates a biasing force in a direction in which the second coil portion 752 is biased rightward, and thus the second coil portion 752 is pressed against the second surface 73*b* of the first exhaust filter 73 by the biasing force of the grounding spring 75. By pressing the second coil portion 752 against the first exhaust filter 73 by the biasing force of the grounding spring 75, the grounding spring 75 can stably contact the first exhaust filter 73.

Figure 22:
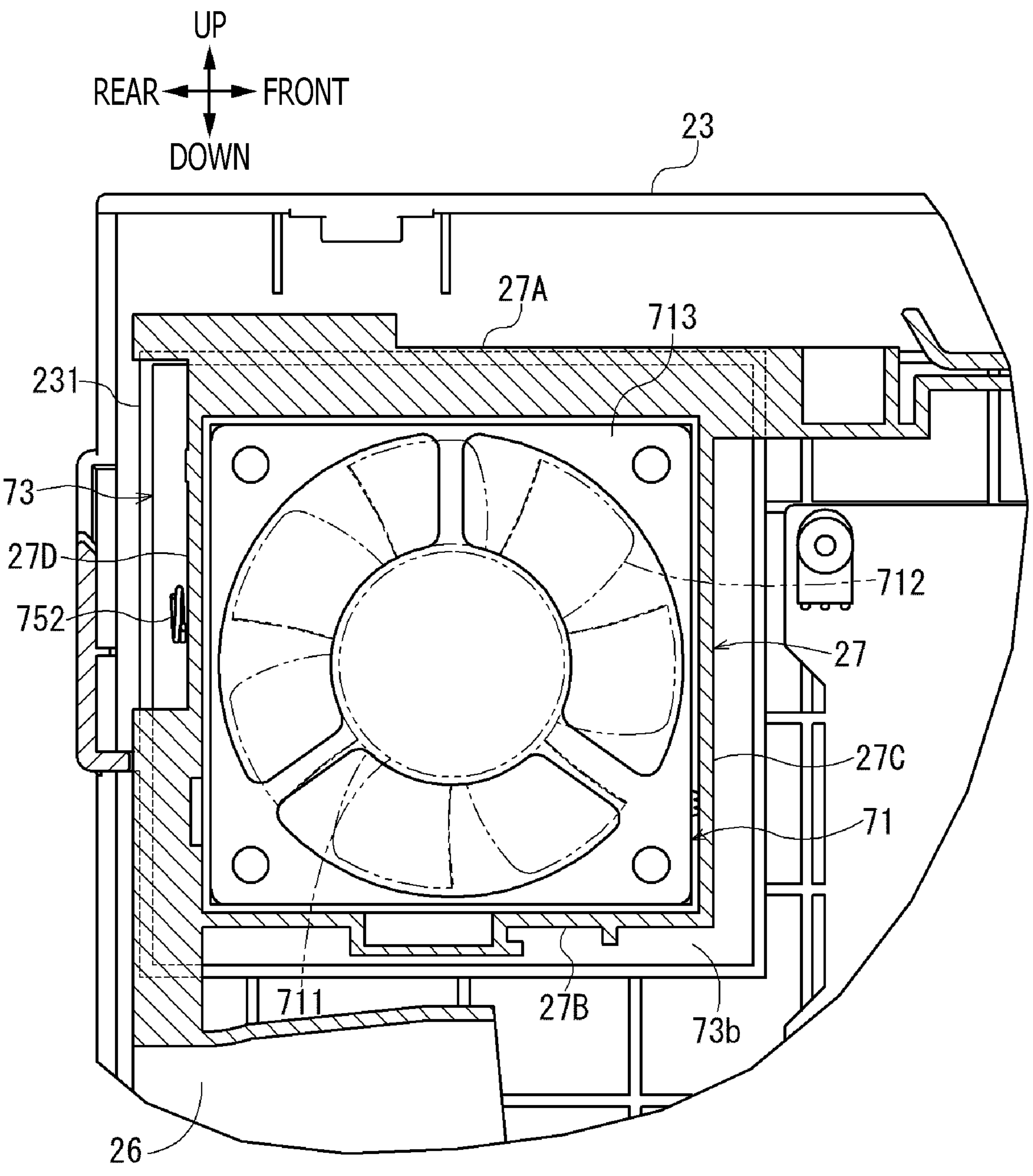
FIG. 22 is a side cross-sectional view showing a second coil portion of the grounding spring disposed outside a region surrounded by a peripheral wall of the first duct.
Figure 23:
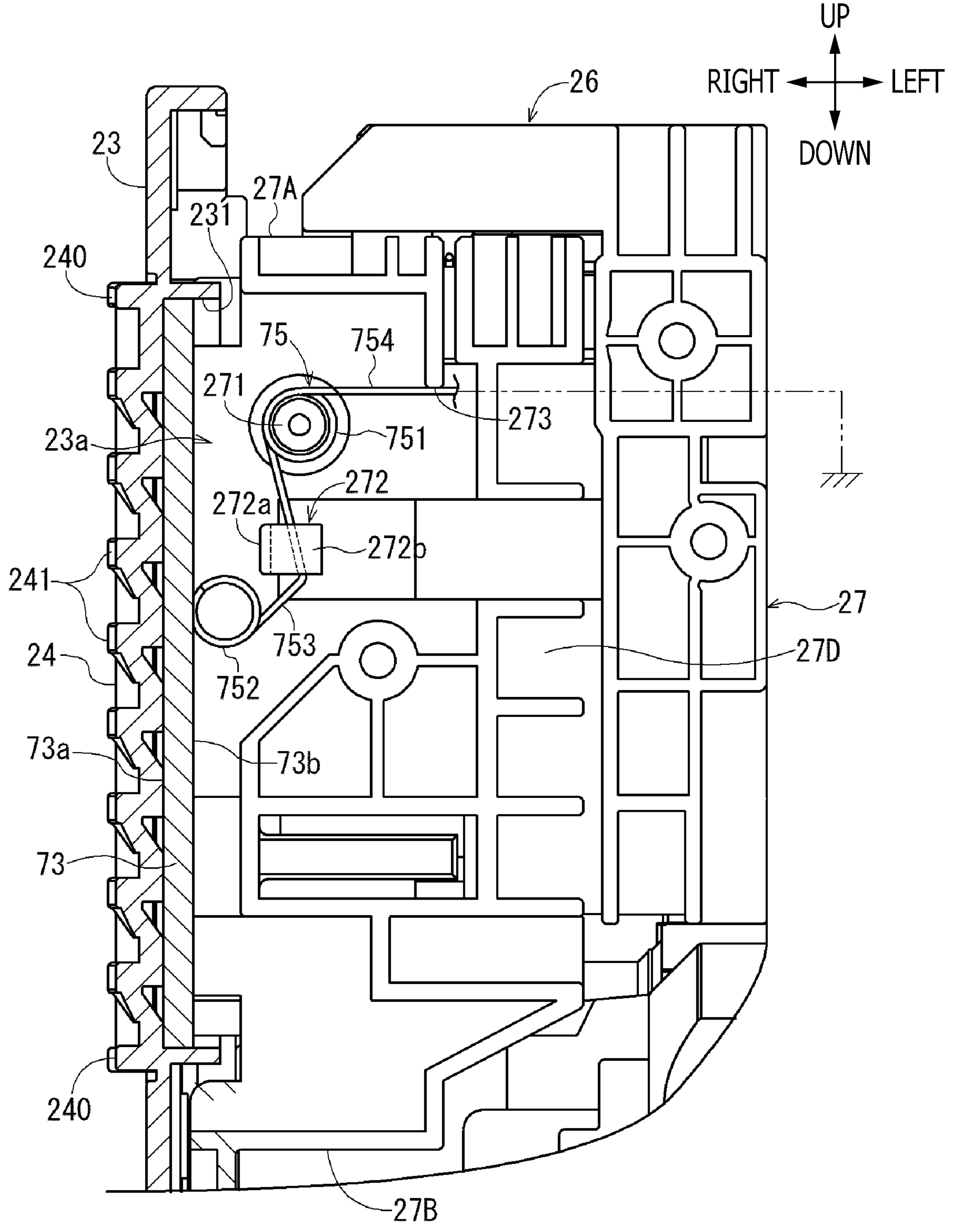
FIG. 23 is a rear cross-sectional view showing the grounding spring supported by the first duct.

The contact position of the second coil portion 752 on the first exhaust filter 73 is outside an area, on the second surface 73*b* of the first exhaust filter 73, surrounded by the peripheral wall of the first duct 27 (see FIG. 22).

In this case, even when a portion of the first exhaust filter 73 outside of the area surrounded by the peripheral wall of the first duct 27 is deformed by the grounding spring 75 contacting the first exhaust filter 73, a portion of the first exhaust filter 73 within the area surrounded by the peripheral wall of the first duct 27 is not deformed. Therefore, it is possible to suppress the air exhausted by the first fan 71 from leaking to the outside of the first duct 27 through a gap between the first duct 27 and the first exhaust filter 73 and being exhausted without passing through the first exhaust filter 73.

When viewed in the left-right direction, the second coil portion 752, which is a portion of the grounding spring 75 contacting the first exhaust filter 73, overlaps with the frame 240 of the first louver 24 (see FIGS. 9 and 24).

Thus, the portion of the first exhaust filter 73 where the grounding spring 75 contacts can be supported by the frame 240 of the first louver 24, and excessive deformation of the portion of the first exhaust filter 73 where the grounding spring 75 contacts can be suppressed.

Furthermore, since the first coil portion 751 of the grounding spring 75 is supported by the boss 271 on the rear wall 27D of the first duct 27, the grounding spring 75 can be stably brought into contact with the first exhaust filter 73 disposed on a right side of the first duct 27.

The grounding spring 75 is supported by the first duct 27 of the right frame 26 disposed inside the housing 2, and the first exhaust filter 73 is supported by the right sidewall 23 of the housing 2 covering the right frame 26.

Accordingly, when the right sidewall 23 is removed from the state covering the right frame 26 in order to replace the first exhaust filter 73, the grounding spring 75 does not come off together with the right sidewall 23 but remains on the right frame 26. Therefore, compared to a case where the grounding spring 75 is supported by the right sidewall 23, replacement of the first exhaust filter 73 can be easily performed.

Since the grounding spring 75 is in contact with the second surface 73*b* which is a wide face of the first exhaust filter 73, the grounding spring 75 can be stably brought into contact with the first exhaust filter 73 as compared with a case where the grounding spring 75 is brought into contact with the outer peripheral surface of the first exhaust filter 73 which is a narrow face. Furthermore, when mounting the right sidewall 23 supporting the first exhaust filter 73 at the position covering the right frame 26, the grounding spring 75 can be easily brought into contact with the first exhaust filter 73 at an appropriate position.

In particular, since the first exhaust filter 73 has many cells partitioned by the partition walls extending in the left-right direction, when the grounding spring 75 is brought into contact with the outer peripheral surface of the first exhaust filter 73, if a contacting portion of the grounding spring 75 with respect to the first exhaust filter 73 is at a space portion of the cell, it is difficult to stably bring the grounding spring 75 into contact with the first exhaust filter 73.

On the other hand, when the grounding spring 75 is brought into contact with the second surface 73*b* of the first exhaust filter 73, the contacting portion of the grounding spring 75 with respect to the first exhaust filter 73 can be easily brought into contact with the partition wall of the first exhaust filter 73, and thus the grounding spring 75 can be stably brought into contact with the first exhaust filter 73.

The rear wall 27D of the first duct 27 includes a hook 272. The hook 272 is formed on the rear side surface of the rear wall 27D. The hook 272 is formed in an L shape with a first piece 272*a* extending rearward from the rear side surface of the rear wall 27D and a second piece 272*b* extending leftward from a rear end of the first piece 272*a*. The first arm portion 753 of the grounding spring 75 comes into contact with the first piece 272*a* from the left, and the first arm portion 753 of the grounding spring 75 comes into contact with the second piece 272*b* from the front.

The first arm portion 753 of the grounding spring 75 is disposed within an area surrounded by the hook 272 and the rear wall 27D, and the second piece 272*b* of the hook 272 restricts the first arm portion 753 from moving rearward, that is, away from the rear wall 27D.

Since the hook 272 can prevent the first arm portion 753 from moving away from the rear wall 27D, the grounding spring 75 can be stably brought into contact with the first exhaust filter 73.

The grounding spring 75 generates a biasing force that urges the second coil portion 752 rightward, but the second coil portion 752 is restricted from moving further to the right side than a position where the first arm portion 753 abuts against the first piece 272*a* of the hook 272.

Accordingly, a moving amount of the second coil portion 752 of the grounding spring 75 to the right side can be restricted. Therefore, when mounting the right sidewall 23 of the housing 2 at the position covering the right frame 26, the first exhaust filter 73 supported by the right sidewall 23 and the second coil portion 752 can be appropriately brought into contact with each other.

The rear wall 27D of the first duct 27 includes a projection 273. The projection 273 is formed on the rear side surface of the rear wall 27D. The projection 273 projects rearward from the rear side surface of the rear wall 27D. The second arm portion 754 of the grounding spring 75 engages with the projection 273 from below.

The grounding spring 75 generates the biasing force acting in the circumferential direction of the first coil portion 751 and that urges the second arm portion 754 to move upward. However, the second arm portion 754 is restricted from moving upward in the circumferential direction of the first coil portion 751 by being engaged with the projection 273.

Therefore, the grounding spring 75 can stably exert the biasing force which urges the second coil portion 752 of the grounding spring 75 rightward to come into contact with the first exhaust filter 73, and thus the second coil portion 752 can be stably brought into contact with the first exhaust filter 73.

As shown in FIG. 24, the grounding spring 75 is disposed on a rear side of the first fan 71 in the front-rear direction, and the control board 13 is disposed in front of the first fan 71 in the front-rear direction. That is, the grounding spring 75 is disposed opposite to the control board 13 across the first fan 71 in the front-rear direction.

Since the control board 13, which is a high-voltage board, is disposed at a position separated from the grounding spring 75 with the first fan 71 interposed therebetween, it is possible to suppress discharge from the control board 13 to the grounding spring 75.

In the present embodiment, the grounding spring 75 is supported by the rear wall 27D of the first duct 27. However, the grounding spring 75 may be supported by the upper wall 27A, the lower wall 27B, or the front wall 27C of the first duct 27.

In the present embodiment, the grounding spring 75 is a coil spring having the first coil portion 751, the second coil portion 752, the first arm portion 753, and the second arm portion 754. However, the grounding spring 75 may be formed in various shapes as long as the grounding spring 75 has conductivity and spring property.

Grounding Spring 77 Supported by Second Duct 28

Figure 26:
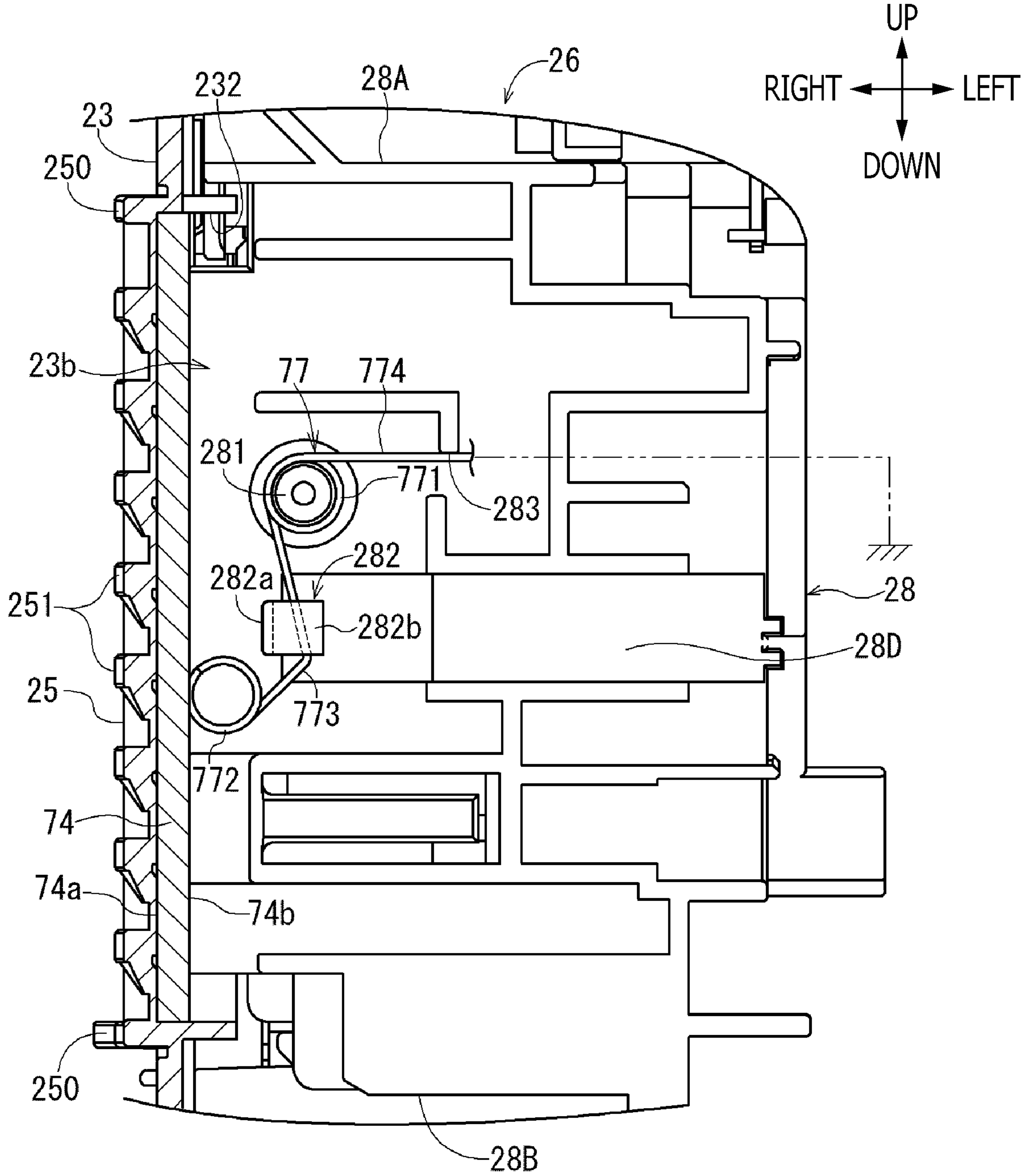
FIG. 26 is a perspective view showing a grounding spring supported by the second duct.

As shown in FIGS. 26 and 27, the image forming apparatus 1 includes a grounded grounding spring 77. The grounding spring 77 is supported by the rear wall 28D of the second duct 28. The grounding spring 77 is a coil spring formed by winding a wire rod having conductivity and spring property.

The grounding spring 77 includes a first coil portion 771 and a second coil portion 772 each formed in a cylindrical shape by winding a wire material, a first arm portion 773 extending from the first coil portion 771 and connecting the first coil portion 771 and the second coil portion 772, and a second arm portion 774 extending from the first coil portion 771 and different from the first coil portion 771. A direction in which the first arm portion 773 extends from the first coil portion 771 is different from a direction in which the second arm portion 774 extends from the first coil portion 771.

A boss 281 projects rearward from a rear side surface of the rear wall 28D of the second duct 28, and the first coil portion 771 of the grounding spring 77 is rotatably supported by the boss 281. That is, the grounding spring 77 is supported by an outer peripheral surface of the peripheral wall constituting the second duct 28.

The first arm portion 773 extends substantially downward from the first coil portion 771, then bends rightward, and extends obliquely downward to the right. The second coil portion 772 is connected to a distal end of the first arm portion 773.

The second arm portion 774 extends leftward from the first coil portion 771 and is grounded. The second arm portion 774 is grounded by being connected to, for example, a conductive metal frame of the image forming apparatus 1. The grounding spring 77 generates a biasing force acting in a circumferential direction of the first coil portion 771 and that urges the second arm portion 774 to move upward.

The second coil portion 772 is disposed below and to a right side of the first coil portion 771 and is in contact with the second surface 74*b* of the second exhaust filter 74. Since the second exhaust filter 74 is grounded through the grounding spring 77 by the second coil portion 772 being in contact with the second exhaust filter 74, accumulation of static electricity in the second exhaust filter 74 is suppressed, and discharge from the second exhaust filter 74 to other members such as the second fan 72 can be suppressed.

The second coil portion 772 of the grounding spring 77 which is a coil spring is formed in a cylindrical shape, and thus a portion of the second coil portion 772 which comes into contact with the second exhaust filter 74 is formed in an arc shape which is convex toward the second exhaust filter 74.

By making the second coil portion 772 having a portion formed in an arc shape that is convex toward the second exhaust filter 74 contact the second exhaust filter 74, it is possible to improve load stability against the second exhaust filter 74 when the grounding spring 77 comes into contact with the second exhaust filter 74.

The grounding spring 77 generates a biasing force in a direction in which the second coil portion 772 is biased rightward, and thus the second coil portion 772 is pressed against the second surface 74*b* of the second exhaust filter 74 by the biasing force of the grounding spring 77. By pressing the second coil portion 772 against the second exhaust filter 74 by the biasing force of the grounding spring 77, the grounding spring 77 can stably contact the second exhaust filter 74.

As with the contact position of the second coil portion 752 on the first exhaust filter 73, the contact position of the second coil portion 772 on the second exhaust filter 74 is outside an area, on the second surface 74*b* of the second exhaust filter 74, surrounded by the peripheral wall of the second duct 28.

In this case, even when a portion of the second exhaust filter 74 outside of the area surrounded by the peripheral wall of the second duct 28 is deformed by the grounding spring 77 contacting the second exhaust filter 74, a portion of the second exhaust filter 74 within the area surrounded by the peripheral wall of the second duct 28 is not deformed. Therefore, it is possible to suppress the air exhausted by the second fan 72 from leaking to the outside of the second duct 28 through a gap between the second duct 28 and the second exhaust filter 74 and being exhausted without passing through the second exhaust filter 74.

Similarly to the positional relationship between the second coil portion 752 and the frame 240, when viewed in the left-right direction, the second coil portion 772, which is a portion of the grounding spring 77 contacting the second exhaust filter 74, overlaps with the frame 250 of the second louver 25 (see FIG. 27).

Thus, the portion of the second exhaust filter 74 where the grounding spring 77 contacts can be supported by the frame 250 of the second louver 25, and excessive deformation of the portion of the second exhaust filter 74 where the grounding spring 77 contacts can be suppressed.

Furthermore, since the first coil portion 771 of the grounding spring 77 is supported by the boss 281 on the rear wall 28D of the second duct 28, the grounding spring 77 can be stably brought into contact with the second exhaust filter 74 disposed on a right side of the second duct 28.

The grounding spring 77 is supported by the second duct 28 of the right frame 26 disposed inside the housing 2, and the second exhaust filter 74 is supported by the right sidewall 23 of the housing 2 covering the right frame 26.

Accordingly, when the right sidewall 23 is removed from the state covering the right frame 26 in order to replace the second exhaust filter 74, the grounding spring 77 does not come off together with the right sidewall 23 but remains on the right frame 26. Therefore, compared to a case where the grounding spring 77 is supported by the right sidewall 23, replacement of the second exhaust filter 74 can be easily performed.

Since the grounding spring 77 is in contact with the second surface 74*b* which is a wide face of the second exhaust filter 74, the grounding spring 77 can be stably brought into contact with the second exhaust filter 74 as compared with a case where the grounding spring 77 is brought into contact with the outer peripheral surface of the second exhaust filter 74 which is a narrow face. Furthermore, when mounting the right sidewall 23 supporting the second exhaust filter 74 at the position covering the right frame 26, the grounding spring 77 can be easily brought into contact with the second exhaust filter 74 at an appropriate position.

In particular, since the second exhaust filter 74 has many cells partitioned by the partition walls extending in the left-right direction, when the grounding spring 77 is brought into contact with the outer peripheral surface of the second exhaust filter 74, if a contacting portion of the grounding spring 77 with respect to the second exhaust filter 74 is at a space portion of the cell, it is difficult to stably bring the grounding spring 77 into contact with the second exhaust filter 74.

On the other hand, when the grounding spring 77 is brought into contact with the second surface 74*b* of the second exhaust filter 74, the contacting portion of the grounding spring 77 with respect to the second exhaust filter 74 can be easily brought into contact with the partition wall of the second exhaust filter 74, and thus the grounding spring 77 can be stably brought into contact with the second exhaust filter 74.

The rear wall 28D of the second duct 28 includes a hook 282. The hook 282 is formed on the rear side surface of the rear wall 28D. The hook 282 is formed in an L shape with a first piece 282*a* extending rearward from the rear side surface of the rear wall 28D and a second piece 282*b* extending leftward from a rear end of the first piece 282*a*. The first arm portion 773 of the grounding spring 77 comes into contact with the first piece 282*a* from the left, and the first arm portion 773 of the grounding spring 77 comes into contact with the second piece 282*b* from the front.

The first arm portion 773 of the grounding spring 77 is disposed within an area surrounded by the hook 272 and the rear wall 28D, and the second piece 282*b* of the hook 282 restricts the first arm portion 773 from moving rearward, that is, away from the rear wall 28D.

Since the hook 282 can prevent the first arm portion 773 from moving away from the rear wall 28D, the grounding spring 77 can be stably brought into contact with the second exhaust filter 74.

The grounding spring 77 generates a biasing force that urges the second coil portion 772 rightward, but the second coil portion 772 is restricted from moving further to the right side than a position where the first arm portion 773 abuts against the first piece 282*a* of the hook 282.

Accordingly, a moving amount of the second coil portion 772 of the grounding spring 77 to the right side can be restricted. Therefore, when mounting the right sidewall 23 of the housing 2 at the position covering the right frame 26, the second exhaust filter 74 supported by the right sidewall 23 and the second coil portion 772 can be appropriately brought into contact with each other.

The rear wall 28D of the second duct 28 includes a projection 283. The projection 283 is formed on the rear side surface of the rear wall 28D. The projection 283 projects rearward from the rear side surface of the rear wall 28D. The second arm portion 774 of the grounding spring 77 engages with the projection 283 from below.

The grounding spring 77 generates the biasing force acting in the circumferential direction of the first coil portion 771 and that urges the second arm portion 774 to move upward. However, the second arm portion 774 is restricted from moving upward in the circumferential direction of the first coil portion 771 by being engaged with the projection 283.

Therefore, the grounding spring 77 can stably exert the biasing force which urges the second coil portion 772 of the grounding spring 77 rightward to come into contact with the second exhaust filter 74, and thus the second coil portion 772 can be stably brought into contact with the second exhaust filter 74.

As shown in FIG. 27, the grounding spring 77 is disposed on a rear side of the second fan 72 in the front-rear direction, and the control board 13 is disposed in front of the second fan 72 in the front-rear direction. That is, the grounding spring 77 is disposed opposite to the control board 13 across the second fan 72 in the front-rear direction.

Since the control board 13, which is a high-voltage board, is disposed at a position separated from the grounding spring 77 with the second fan 72 interposed therebetween, it is possible to suppress discharge from the control board 13 to the grounding spring 77.

In the present embodiment, the grounding spring 77 is supported by the rear wall 28D of the second duct 28. However, the grounding spring 77 may be supported by the upper wall 28A, the lower wall 28B, or the front wall 28C of the second duct 28.

In the present embodiment, the grounding spring 77 is a coil spring having the first coil portion 771, the second coil portion 772, the first arm portion 773, and the second arm portion 774. However, the grounding spring 77 may be formed in various shapes as long as the grounding spring 77 has conductivity and spring property.

Second Embodiment of Grounding Spring

Figure 28:
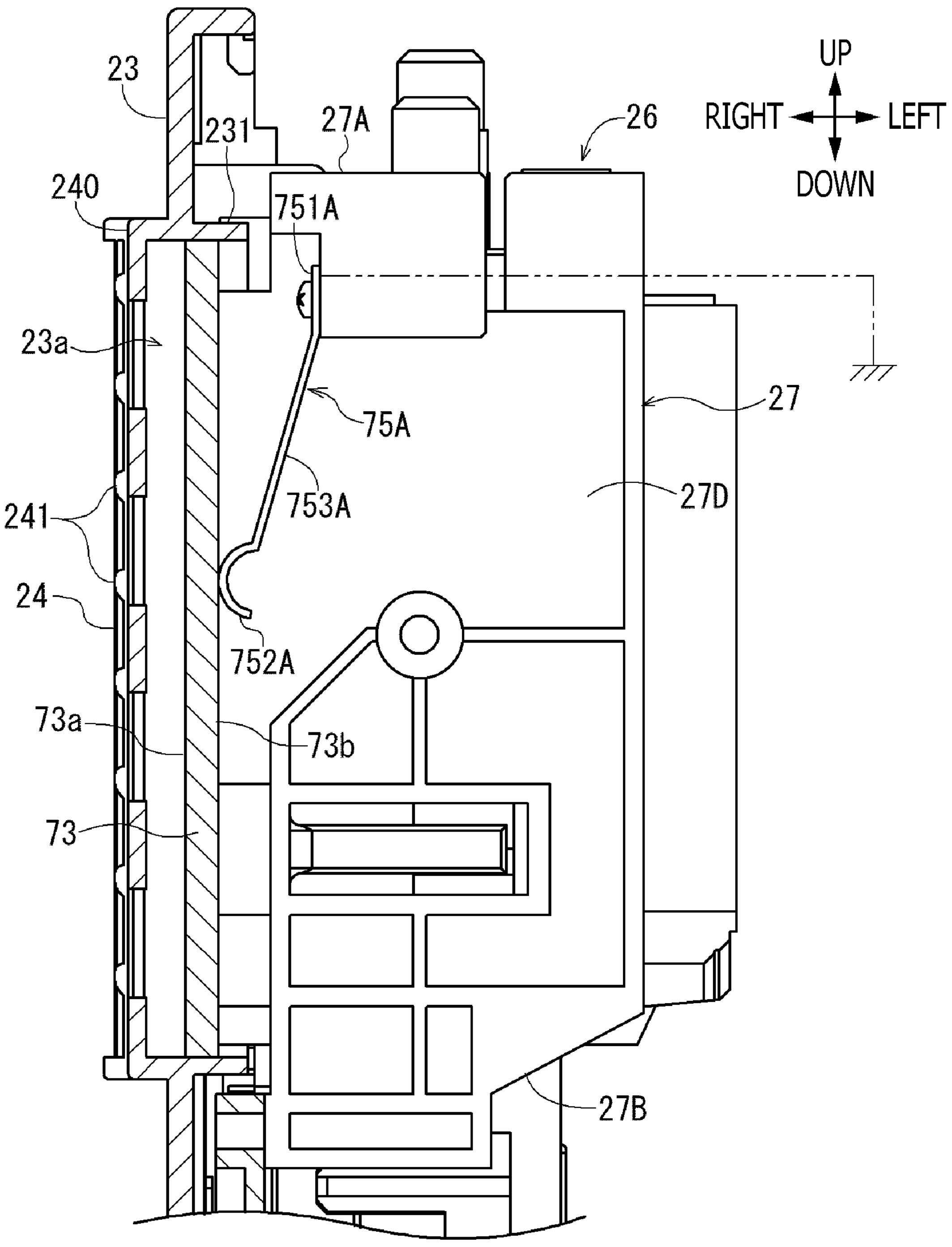
FIG. 28 is a rear cross-sectional view showing a second embodiment of the grounding spring.

The grounding spring 75 may also have a form like a grounding spring 75A shown in FIG. 28. The grounding spring 75A is a plate spring formed of a plate-shaped member having conductivity and spring property. The grounding spring 75A is grounded.

The grounding spring 75A includes a support plate 751A supported by the rear wall 27D of the first duct 27, a contact plate 752A in contact with the second surface 73*b* of the first exhaust filter 73, and a connection plate 753A connecting the support plate 751A and the contact plate 752A. The contact plate 752A, which is a portion of the grounding spring 75A in contact with the first exhaust filter 73, is formed in an arc shape that is convex toward the first exhaust filter 73.

In the grounding spring 75A that is a plate spring, since the contact plate 752A, which is a portion that comes into contact with the first exhaust filter 73, is formed in an arc shape that is convex toward the first exhaust filter 73, it is possible to increase load stability with respect to the first exhaust filter 73 when the grounding spring 75A comes into contact with the first exhaust filter 73. It should be noted that the grounding spring 77 may also have a configuration similar to the grounding spring 75A.

Other Embodiment of Support Structure of First Exhaust Filter

Figure 29:
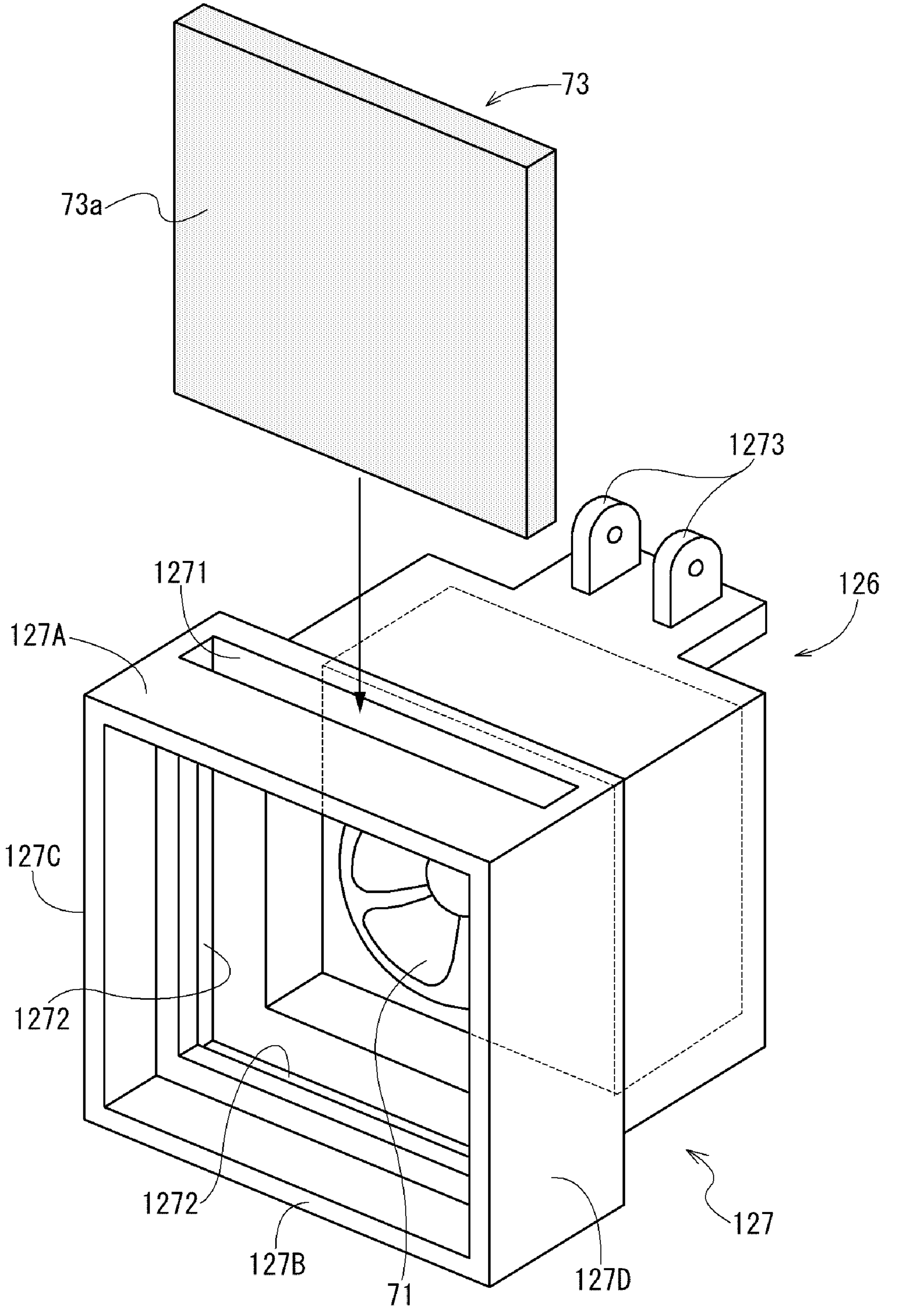
FIG. 29 is a perspective view showing another embodiment of a support structure for the first exhaust filter.
Figure 30:
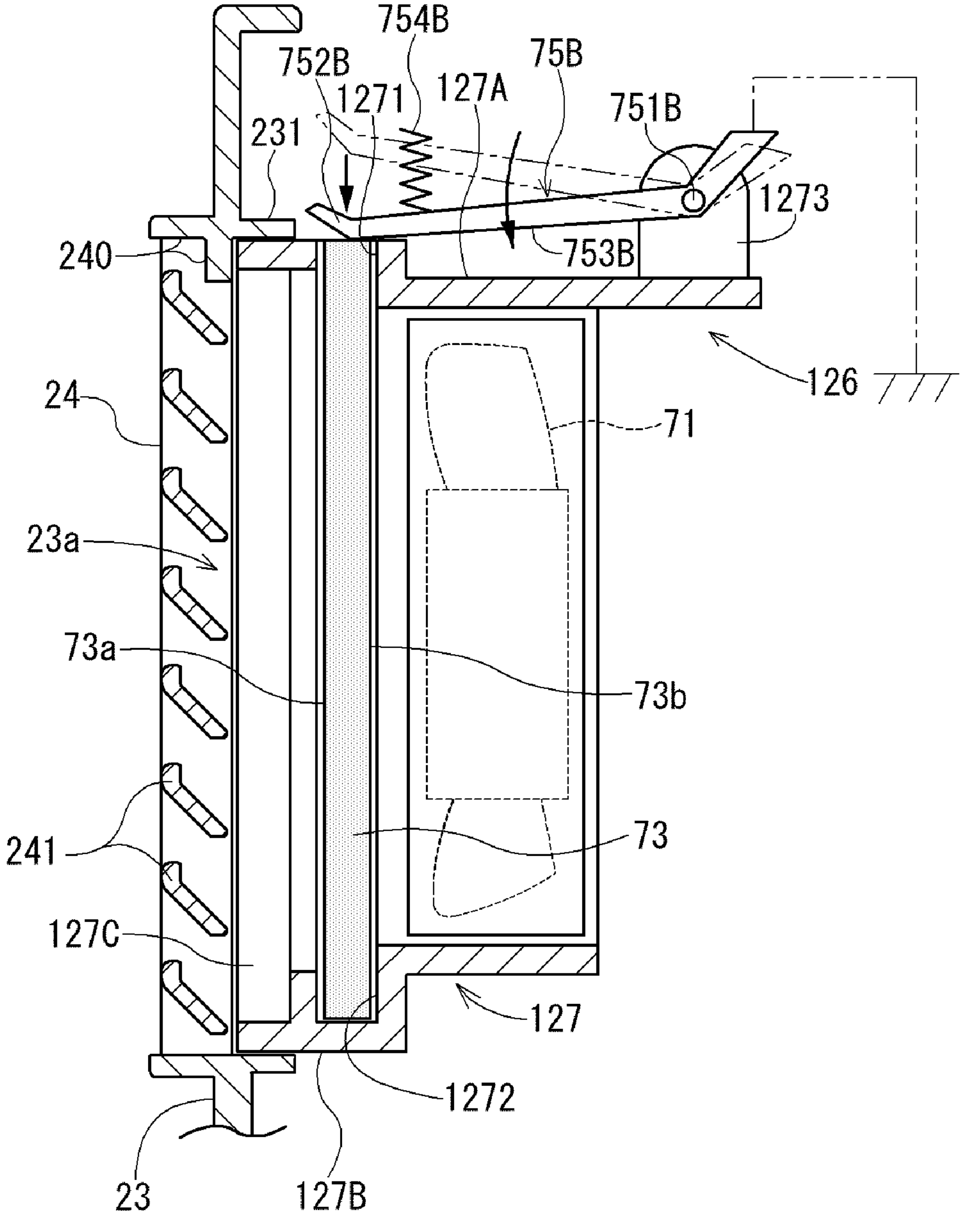
FIG. 30 is a rear cross-sectional view showing the other embodiment of the support structure for the first exhaust filter.

As shown in FIGS. 29 and 30, in the image forming apparatus 1, the first exhaust filter 73 may be supported not by the housing 2 but by a first duct 127.

The first duct 127 is provided to a right frame 126 disposed inside the housing 2 and penetrates in the left-right direction. The first duct 127 extends in the left-right direction and is configured to allow air to flow in the left-right direction. The first duct 127 accommodates the first fan 71.

The first duct 127 includes an upper wall 127A located above the first fan 71, a lower wall 127B located below the first fan 71, a front wall 127C located in front of the first fan 71, and a rear wall 127D located behind the first fan 71. The upper wall 127A, the lower wall 127B, the front wall 127C, and the rear wall 27D constitute a peripheral wall of the first duct 127.

The outer peripheral surface of the first fan 71 is surrounded by the upper wall 127A, the lower wall 127B, the front wall 127C, and the rear wall 127D constituting the peripheral wall of the first duct 127.

The upper wall 127A of the first duct 127 includes an insertion hole 1271 through which the first exhaust filter 73 can pass. The insertion hole 1271 is an elongated through-hole that is long in a circumferential direction of the first duct 127. The first exhaust filter 73 is inserted into the first duct 127 through the insertion hole 1271, and the first exhaust filter 73 inserted into the first duct 127 is supported by the first duct 127.

By inserting the first exhaust filter 73 into the first duct 127 through the insertion hole 1271 and supporting the first exhaust filter 73 with the first duct 127, it becomes not necessary to form the first exhaust filter 73 larger than necessary, and thus cost required for the first exhaust filter 73 can be reduced.

A fitting groove 1272 extending in the circumferential direction of the first duct 127 is formed on inner peripheral surfaces of the lower wall 127B, the front wall 127C, and the rear wall 127D. A peripheral edge portion of the first exhaust filter 73 inserted into the first duct 127 through the insertion hole 1271 fits into the fitting groove 1272.

By fitting the peripheral edge portion of the first exhaust filter 73 into the fitting groove 1272, the first exhaust filter 73 is restricted from moving in the left-right direction, which is the exhausting direction of the first fan 71. By fitting the peripheral edge portion of the first exhaust filter 73 into the fitting groove 1272, air flowing through the first duct 127 can be prevented from flowing without passing through the first exhaust filter 73.

In the case of the configuration in which the first exhaust filter 73 is supported by the first duct 127, for example, a grounding spring 75B can be used as the grounding spring that comes into contact with the first exhaust filter 73.

The upper wall 127A of the first duct 127 includes a stay 1273 that rotatably supports the grounding spring 75B. The grounding spring 75B is grounded.

The grounding spring 75B includes a support portion 751B, a contact portion 752B, and a connecting portion 753B. The support portion 751B is rotatably supported by the stay 1273 of the first duct 127.

The contact portion 752B is in contact with the outer peripheral surface of the first exhaust filter 73 exposed to outside of the first duct 127 through the insertion hole 1271. The outer peripheral surface of the first exhaust filter 73 is a narrow face of the first exhaust filter 733, and is facing a direction orthogonal to a direction in which the first surface 73*a* and the second surface 73*b*, which are air passing surfaces of the first exhaust filter 73, face.

The connecting portion 753B connects the support portion 751B and the contact portion 752B. The contact portion 752B, which is a portion of the grounding spring 75B that comes into contact with the first exhaust filter 73, is formed in a shape that is convex toward the first exhaust filter 73.

The grounding spring 75B is urged by a spring 754B in a direction to press the contact portion 752B against the first exhaust filter 73.

Since the grounding spring 75B is in contact with the outer peripheral surface of the first exhaust filter 73 exposed to the outside of the first duct 127 through the insertion hole 1271, it is possible to suppress the first exhaust filter 73 from coming out of the first duct 127 through the insertion hole 1271, and to maintain the state in which the first exhaust filter 73 is inserted into the first duct 127.

The second exhaust filter 74 may also be supported by a duct similar to the first duct 127. In case of the configuration in which the second exhaust filter 74 is supported by a duct similar to the first duct 127, for example, a grounding spring having a configuration similar to that of the grounding spring 75B may be used as a grounding spring that comes into contact with the second exhaust filter 74.

Summary of Grounding Spring

In an image forming apparatus, it is required to suppress exhaustion of ozone and dust to outside of a housing in accordance with the tightening of environmental regulations and the like.

Therefore, in a conventional image forming apparatus, an ozone filter is disposed near a fan for exhausting air inside a housing, and ozone and dust are removed from the exhausted air by the ozone filter.

However, the ozone filter is often formed of a material containing metal such as aluminum, and static electricity entering from the outside of the housing through openings of a louver of the housing may accumulate in the ozone filter.

When static electricity is accumulated in the ozone filter, the static electricity may be discharged from the ozone filter to other members such as a fan disposed near the ozone filter and may interfere normal operation of the image forming apparatus.

Therefore, in an image forming apparatus according to aspects of the present disclosure, grounding springs such as the grounding springs 75 and 77 are provided to suppress the discharge from the filters such as the first exhaust filter 73 and the second exhaust filter 74, configured as ozone filters configured to remove ozone contained in the air, to other members.

That is, the image forming apparatus according to aspects of the present disclosure includes a housing, a fan configured to exhaust air inside the housing to the outside of the housing, an ozone filter through which air exhausted in an exhausting direction by the fan passes and configured to collect ozone contained in the air inside the housing, and a grounding spring that is grounded and comes into contact with the ozone filter.

Since the ozone filter is grounded through the grounding spring, accumulation of static electricity in the ozone filter can be suppressed, and discharge from the ozone filter to other members such as the fan can be suppressed.

The grounding spring may be a coil spring.

With this configuration, by making a coil portion of the grounding spring contact the ozone filter, it is possible to improve load stability with respect to the ozone filter when the grounding spring comes into contact with the ozone filter.

The grounding spring may be a plate spring in which a portion which comes into contact with the ozone filter is formed in an arc shape that is convex toward the ozone filter.

With this configuration, it is possible to enhance load stability with respect to the ozone filter when the grounding spring comes into contact with the ozone filter.

The image forming apparatus may include a duct having a peripheral wall that surrounds the fan and through which air can flow in the exhausting direction. The ozone filter may include an air passing surface orthogonal to the exhausting direction and may be disposed downstream of the fan in the exhausting direction. A downstream end of the peripheral wall of the duct in the exhausting direction may be in contact with the air passing surface of the ozone filter. A contact position of the grounding spring on the ozone filter may be outside an area of the air passing surface of the ozone filter surrounded by the peripheral wall.

With this configuration, even when a portion of the ozone filter outside of the area surrounded by the peripheral wall of the duct is deformed by the grounding spring contacting the ozone filter, a portion of the ozone filter within the area surrounded by the peripheral wall of the duct is not deformed. Therefore, it is possible to suppress the air exhausted by the fan from leaking to outside of the duct through a gap between the duct and the ozone filter and being exhausted without passing through the ozone filter.

The image forming apparatus may include a louver including a plurality of crosspieces arranged at intervals in a direction orthogonal to the exhausting direction and a frame disposed around the plurality of crosspieces and in contact with the ozone filter, the louver being disposed downstream of the ozone filter in the exhausting direction. When viewed in the exhausting direction, a portion of the grounding spring in contact with the ozone filter and the frame of the louver may overlap with each other.

With this configuration, the portion of the ozone filter where the grounding spring contacts can be supported by the frame of the louver, and thus excessive deformation of the portion of the ozone filter where the grounding spring contacts can be suppressed.

The image forming apparatus may include a duct disposed inside the housing and that accommodates the fan. The ozone filter may be supported by the housing, and the grounding spring may be supported by an outer peripheral surface of a peripheral wall constituting the duct.

With this configuration, it becomes easier to replace the ozone filter than when the grounding spring is supported by the housing.

The image forming apparatus may include a high-voltage board configured to control operation of the image forming apparatus, and the grounding spring may be disposed opposite to the high-voltage board across the fan.

With this configuration, it is possible to suppress discharge from the high-voltage board to the grounding spring.

The ozone filter may have an air passing surface orthogonal to the exhausting direction, and the grounding spring may be in contact with the air passing surface.

With this configuration, the grounding spring can be stably brought into contact with the ozone filter as compared with a case where the grounding spring is brought into contact with an outer peripheral surface of the ozone filter facing a direction orthogonal to the air passing surface of the ozone filter.

The grounding spring may have a first coil portion and a second coil portion each formed by winding a wire. The first coil portion may be supported by a boss provided on the peripheral wall of the duct, and the second coil portion may be in contact with the ozone filter.

With this configuration, the grounding spring can be stably brought into contact with the ozone filter.

The grounding spring may include a first arm portion extending from the first coil portion and connecting the first coil portion and the second coil portion, and the peripheral wall of the duct may include a hook that restricts movement of the first arm portion away from the peripheral wall.

With this configuration, the hook can prevent the first arm portion from moving away from the peripheral wall of the duct, and thus the grounding spring can be stably brought into contact with the ozone filter.

The grounding spring may include a second arm portion extending from the first coil portion and different from the first arm portion, and the peripheral wall of the duct may include a projection to which the second arm portion abuts to restrict movement of the second arm portion in a circumferential direction of the first coil portion.

With this configuration, the second coil portion of the grounding spring can stably exert the biasing force which urges the second coil portion of the grounding spring in a direction to contact the ozone filter, and thus the second coil portion can be stably brought into contact with the ozone filter.

The image forming apparatus may include a duct having a peripheral wall that surrounds the fan and through which air can flow in the exhausting direction. The peripheral wall of the duct may include an insertion hole through which the ozone filter can pass. The duct may support the ozone filter inserted into the duct through the insertion hole. The grounding spring may contact an outer peripheral surface of the ozone filter exposed to the outside of the duct through the insertion hole.

With this configuration, it is not necessary to form the ozone filter larger than necessary, and thus it is possible to reduce cost required for the ozone filter. Furthermore, it is possible to suppress the ozone filter from coming out of the duct through the insertion hole, and to maintain the state in which the ozone filter is inserted inside the duct.

SECOND EMBODIMENT

Schematic Configuration of Image Forming Apparatus 1001

Figure 31:
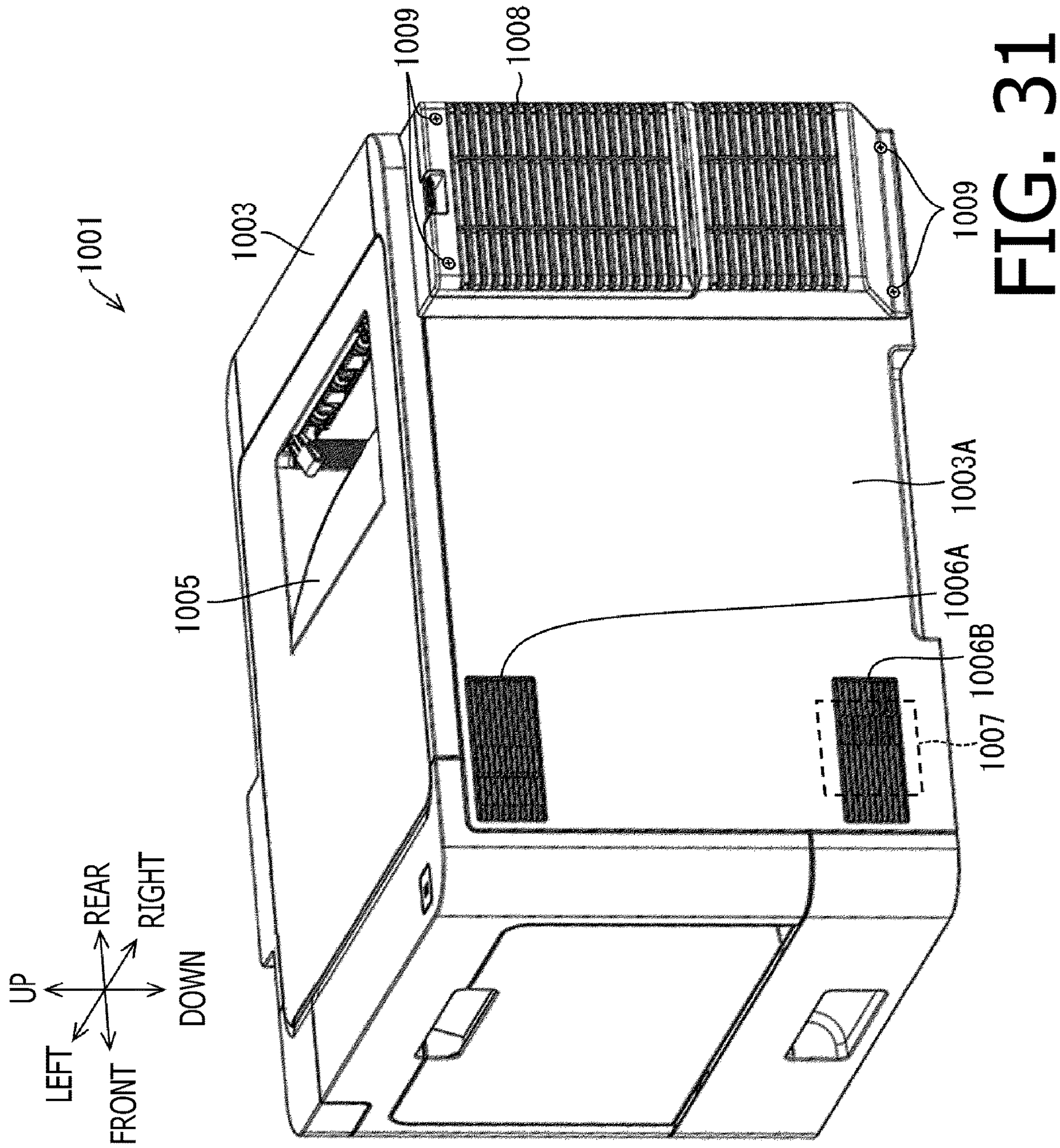
FIG. 31 is an external perspective view of another illustrative image forming apparatus.
Figure 32:
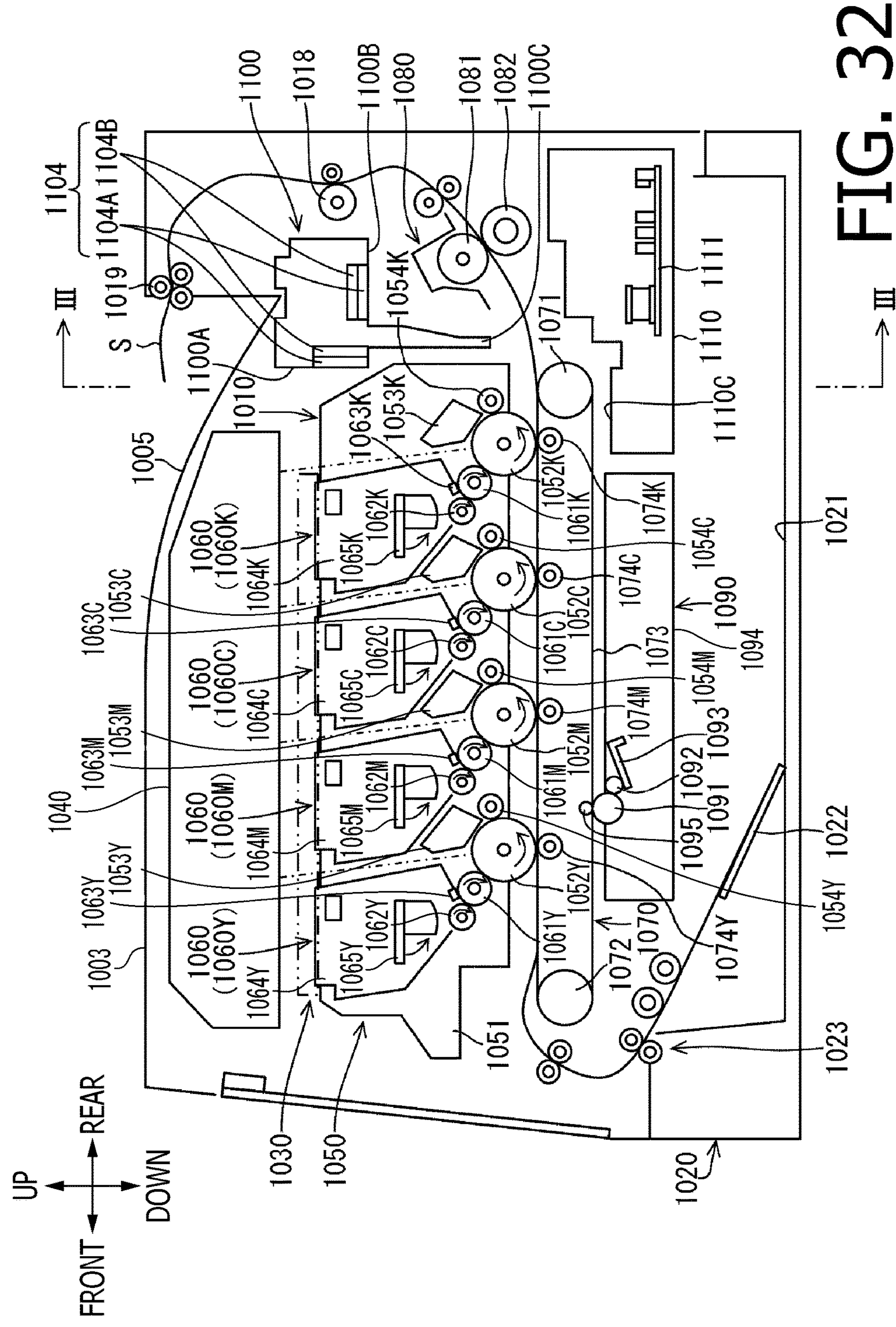
FIG. 32 is a cross-sectional view schematically showing an internal configuration of the image forming apparatus.
Figure 33:
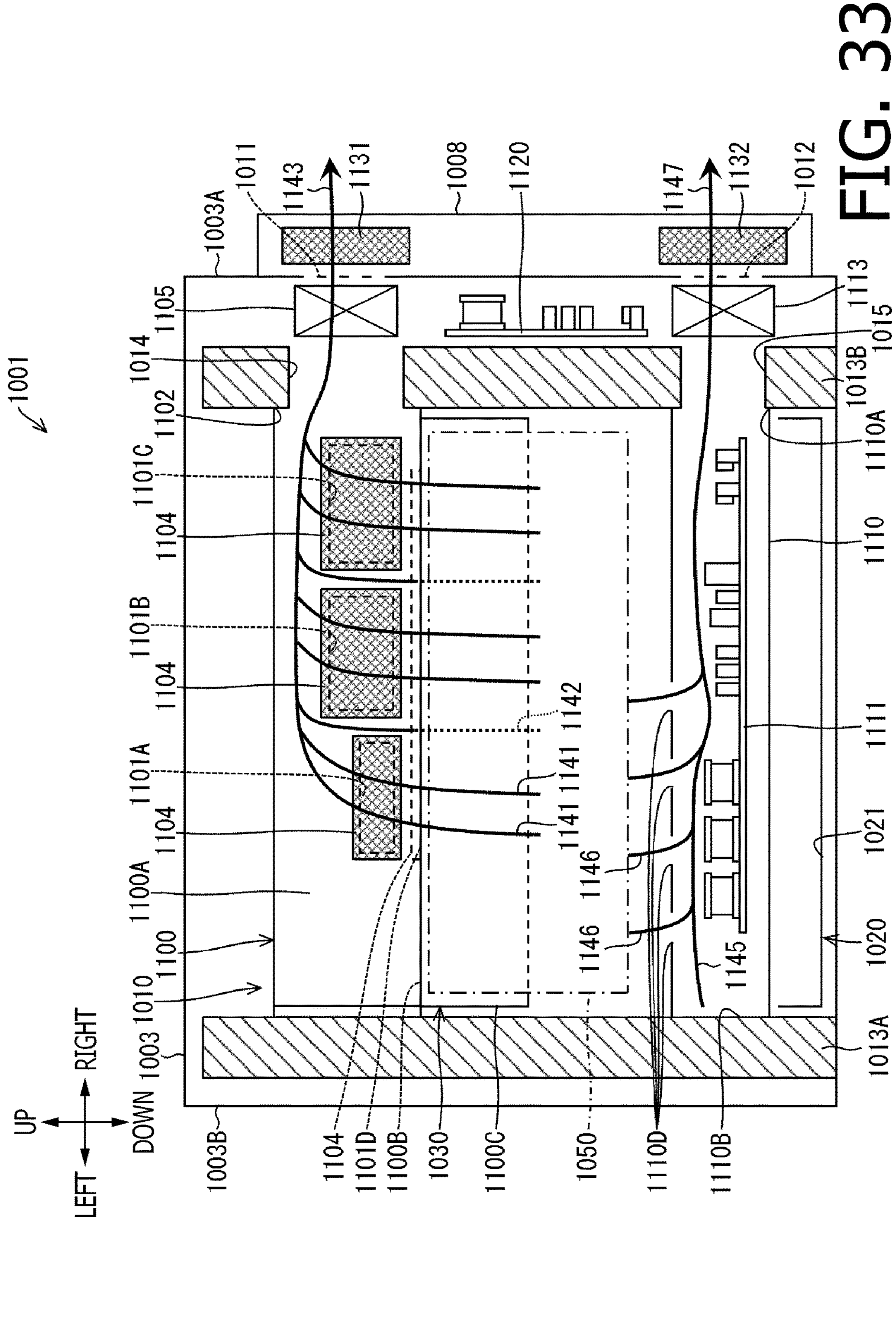
FIG. 33 is a cross-sectional view taken along a line III-III in FIG. 32.

An image forming apparatus 1001 according to the second embodiment will be described with reference to FIGS. 31 to 38. First, a schematic configuration of the image forming apparatus 1001 will be described with reference to FIGS. 31 to 33. FIG. 31 is an illustrative external perspective view of the image forming apparatus 1001 according to the second embodiment. FIG. 32 is a cross-sectional view schematically illustrating an internal configuration of the image forming apparatus 1001. FIG. 33 is a cross-sectional view taken along line III-III in FIG. 32.

The image forming apparatus 1001 is a laser printer that prints an image on a sheet such as a recording sheet or an OHP sheet by an electrophotographic system. In the following description, with a state shown in FIG. 31 in which the image forming apparatus 1001 is installed in a usable state as a reference state, an up-down direction is defined with an installation surface side as a lower side, a front-rear direction is defined with a side to which a sheet on which an image is printed is discharged on a sheet discharge tray 1005 provided on an upper surface of the image forming apparatus 1001 as front, and a left-right direction is defined with a left side of the image forming apparatus 1001 when viewed from the front as left. The left-right direction is occasionally referred to as an axial direction of a photosensitive drum.

A sheet discharge tray 1005 on which a sheet discharged from the housing 1003 after printing is to be placed is provided on an upper surface of a substantially box-shaped housing 1003 forming a main body of the image forming apparatus 1001. Intake ports 1006A and 1006B each formed in a rectangular shape that is laterally long and through which air can flow into the housing 1003 from outside of the housing 1003 are provided at upper and lower ends of a front end portion of a right sidewall 1003A of the housing 1003. Each of the intake ports 1006A and 1006B is partitioned into a grid shape narrow in the up-down direction so as to prevent a finger or the like from entering through the grid.

A third fan 1007 configured to suck air outside the housing 1003 into the housing 1003 is attached to an inner side of the lower intake port 1006B. The third fan 1007 is, for example, an axial fan through which air passes in a rotation axis direction, and generates an air flow that causes cooling air to flow from the outside to inside of the housing 1003. As a result, by driving the third fan 1007, it is possible to suppress an increase in temperature inside the housing 1003.

A filter cover 1008 is detachably attached to a rear end portion of the right sidewall 1003A of the housing 1003 with screws 1009 to cover the right sidewall 1003A over substantially the entire height. As shown in FIG. 33, the filter cover 1008 is formed in a substantially shallow box shape that is open on the left. The filter cover 1008 is attached to the right sidewall 1003A to cover a second exhaust port 1012 (see FIG. 37) formed at a lower side of the right sidewall 1003A and a first exhaust port 1011 (see FIG. 37) formed substantially directly above the second exhaust port 1012.

Therefore, the first exhaust port 1011 and the second exhaust port 1012 are formed to the right sidewall 1003A of the housing 1003 that intersects with an axial direction of a photosensitive drum 1052 which will be described later. A bottom surface of the filter cover 1008 (i.e., a wall of the filter cover 1008 on the right in the state attached to the right sidewall 1003A) is open and partitioned into a grid shape narrow in the up-down direction so as to prevent a finger or the like from entering through the grid.

Schematic Internal Configuration of Image Forming Apparatus 1001

As shown in FIGS. 32 and 33, to the image forming apparatus 1001, a left side frame 1013A and a right side frame 1013B, made of metal or plastic, are provided inside the housing 1003 to face a left sidewall 1003B and the right sidewall 1003A, respectively. A conveyer 1020, a process unit accommodating part 1010 that accommodates an electrophotographic image forming engine 1030, a cleaning unit 1090, a duct 1100, and a board accommodating part 1110 are provided between the side frames 1013A and 1013B.

As shown in FIG. 33, a high-voltage power supply board 1120 is disposed at a position facing a later-described process unit 1050, on the right sidewall 1003A side of the right side frame 1013B. The high-voltage power supply board 1120 supplies a charging bias voltage having an absolute value of several kV to each later-described charger 1053. The high-voltage power supply board 1120 supplies a developing bias voltage having an absolute value of several kV to each later-described developing roller 1061. The high-voltage power supply board 1120 supplies a transferring bias voltage having an absolute value of several kV to each later-described transfer roller 1074.

As shown in FIG. 32, the conveyer 1020 is provided in a lower portion inside the housing 1003, and includes a sheet tray 1021 configured to accommodate one or more sheets S, a pressing plate 1022, and a feeding mechanism 1023. The conveyer 1020 conveys the sheet S to the image forming engine 1030 with the feeding mechanism 1023.

The image forming engine 1030 includes an exposure unit 1040, a process unit 1050, a transfer unit 1070, and a fuser 1080.

The exposure unit 1040 is provided in an upper portion inside the housing 1003. The exposure unit 1040 includes conventionally-known laser light emitters, polygon mirrors, lenses, reflecting mirrors, and the like. The exposure unit 1040 exposes surfaces of the photosensitive drums 1052 with laser lights (one dot chain lines illustrated in FIG. 32) emitted from the exposure unit 1040 based on image data.

The process unit 1050 is disposed between the sheet tray 1021 and the exposure unit 1040. The process unit 1050 includes a drawer 1051, four photosensitive drums 1052 (1052Y, 1052M, 1052C and 1052K) arranged in the front-rear direction, and chargers 1053 (1053Y, 1053M, 1053C and 1053K), cleaning rollers 1054 (1054Y, 1054M, 1054C and 1054K), and process cartridges 1060 (1060Y, 1060M, 1060C and 1060K) provided for respective photosensitive drums 1052.

Since the image forming apparatus 1001 is a direct tandem type color laser printer, four process cartridges 1060 are arranged in series along a conveying direction of the sheet S, that is, in a rotation direction of a conveyance belt 1073 which will be described later. Specifically, the four process cartridges 1060 are a process cartridge 1060Y for yellow, a process cartridge 1060M for magenta, a process cartridge 1060C for cyan, and a process cartridge 1060K for black in this order from an upstream side in the conveying direction of the sheet S. The process cartridges 1060Y to 1060K have substantially the same structure and the like except that the colors of the developing agent stored therein are different.

The drawer 1051 is a member configured to hold the photosensitive drums 1052, the process cartridges 1060 and the like. The drawer 1051 is configured to be attachable to and detachable from the housing 1003. Therefore, members held by the drawer 1051 such as the photosensitive drums 1052 and the process cartridges 1060 can be individually replaced in a state pulled out from the housing 1003. That is, the drawer 1051, the photosensitive drums 1052, and the process cartridges 1060 are configured to be separable from each other.

Each photosensitive drum 1052 is a member in which a photosensitive layer is formed on an outer peripheral surface of a cylindrical drum body having conductivity, and is provided so as to be rotatable in a direction of an arrow illustrated in the photosensitive drum 1052 shown in FIG. 32. Each charger 1053 includes a conventionally-known charging wire, grid electrode and the like, and is configured to uniformly charge a surface of the photosensitive drum 1052. The charger 1053 is a scorotron charger that substantially uniformly charges the surface of the photosensitive drum 1052 with a positive charge.

Each cleaning roller 1054 is a member in which a metal rotary shaft is covered with a roller body made of a conductive foamed elastic body. The cleaning roller 1054 collects toner adhered to the surface of the photosensitive drum 1052 while rotating and contacting the surface of the photosensitive drum 1052.

The photosensitive drum 1052, the charger 1053, and the cleaning roller 1054 may be individually provided in the housing 1003, or may be provided as a drum unit that is attachable to and detachable from the housing 1003.

Each process cartridge 1060 includes a developing roller 1061 (1061Y, 1061M, 1061C and 1061K), a supply roller 1062 (1062Y, 1062M, 1062C and 1062K), a layer thickness regulating blade 1063 (1063Y, 1063M, 1063C and 1063K), a toner accommodating part 1064 (1064Y, 1064M, 1064C and 1062K) configured to accommodate toner, and an agitator 1065 (1065Y, 1065M, 1065C and 1062K). The developing roller 1061 is a roller configured to supply toner to the photosensitive drum 1052, and the agitator 1065 is configured to rotate to agitate the toner accommodated in the toner accommodating part 1064.

Toners of yellow, magenta, cyan, and black are stored in the toner accommodating parts 1064 of the respective process cartridges 1060 in this order from the front side toward the rear side of the housing 1003. In the present specification and the drawings, when specifying the process cartridges 1060, the photosensitive drums 1052, and the like corresponding to the colors of the toner, symbols Y, M, C, and K corresponding to yellow, magenta, cyan, and black, respectively, are added as necessary.

The toner stored in the toner accommodating part 1064 is supplied from the supply roller 1062 to the developing roller 1061, is regulated to a constant thickness between the developing roller 1061 and the layer thickness regulating blade 1063, and is carried on the surface of the developing roller 1061.

The transfer unit 1070 is disposed between the sheet tray 1021 and the process unit 1050, and includes a drive roller 1071, a driven roller 1072, a conveyance belt 1073, and transfer rollers 1074. The conveyance belt 1073 is an endless belt stretched between the drive roller 1071 and the driven roller 1072, and is disposed to face the photosensitive drums 1052. Four transfer rollers 1074 (1074Y, 1074M, 1074C and 1074K) are provided to correspond to the photosensitive drums 1052, respectively, and are disposed to nip the conveyance belt 1073 with the corresponding photosensitive drums 1052.

The fuser 1080 is disposed on the rear side of the process unit 1050 and the transfer unit 1070, and includes a heating roller 1081 and a pressure roller 1082.

In the image forming engine 1030 configured as described above, the surface of each photosensitive drum 1052 is uniformly charged by the charger 1053 and exposed by the exposure unit 1040 to form an electrostatic latent image on the surface of the photosensitive drum 1052 based on image data.

The developing roller 1061 supplies charged toner to the electrostatic latent image formed on the surface of the photosensitive drum 1052 to visualize the electrostatic latent image, thereby forming a toner image on the surface of the photosensitive drum 1052.

In the first embodiment, the toner is positively charged. On the other hand, a portion of the photosensitive drum 1052 exposed by the exposure unit 1040 has a low potential, and the other portion has a potential as charged by the charger 1053 (i.e., a potential higher than the exposed portion), thereby forming the electrostatic latent image. The positively charged toner (developing agent) is adsorbed to the low-potential portion (exposed portion) of the electrostatic latent image, and the toner image is formed on the outer surface of the photosensitive drum 1052.

Then, the sheet S conveyed onto the conveyance belt 1073 from the conveyer 1020 passes between the photosensitive drums 1052 and the corresponding transfer rollers 1074 disposed to nip the conveyance belt 1073 therebetween, whereby the toner images formed on the photosensitive drums 1052 are sequentially transferred onto the sheet S. A negative potential is applied to each transfer roller 1074. Then, the sheet S onto which the toner images have been transferred is conveyed to the fuser 1080 and is made to pass between the heating roller 1081 and the pressure roller 1082 of the fuser 1080, whereby the toner image is thermally fixed (welded) onto the sheet S. The sheet S onto which the toner image has been thermally fixed is discharged onto the sheet discharge tray 1005 by a conveyance roller 1018 and a discharge roller 1019.

The cleaning unit 1090 is disposed below the conveyance belt 1073. The cleaning unit 1090 includes a belt cleaner 1091, a collection roller 1092, a scraping blade 1093, a storage part 1094, and a backup roller 1095 that nips the conveyance belt 1073 with the belt cleaner 1091.

Configuration of Duct 1100

Figure 34:
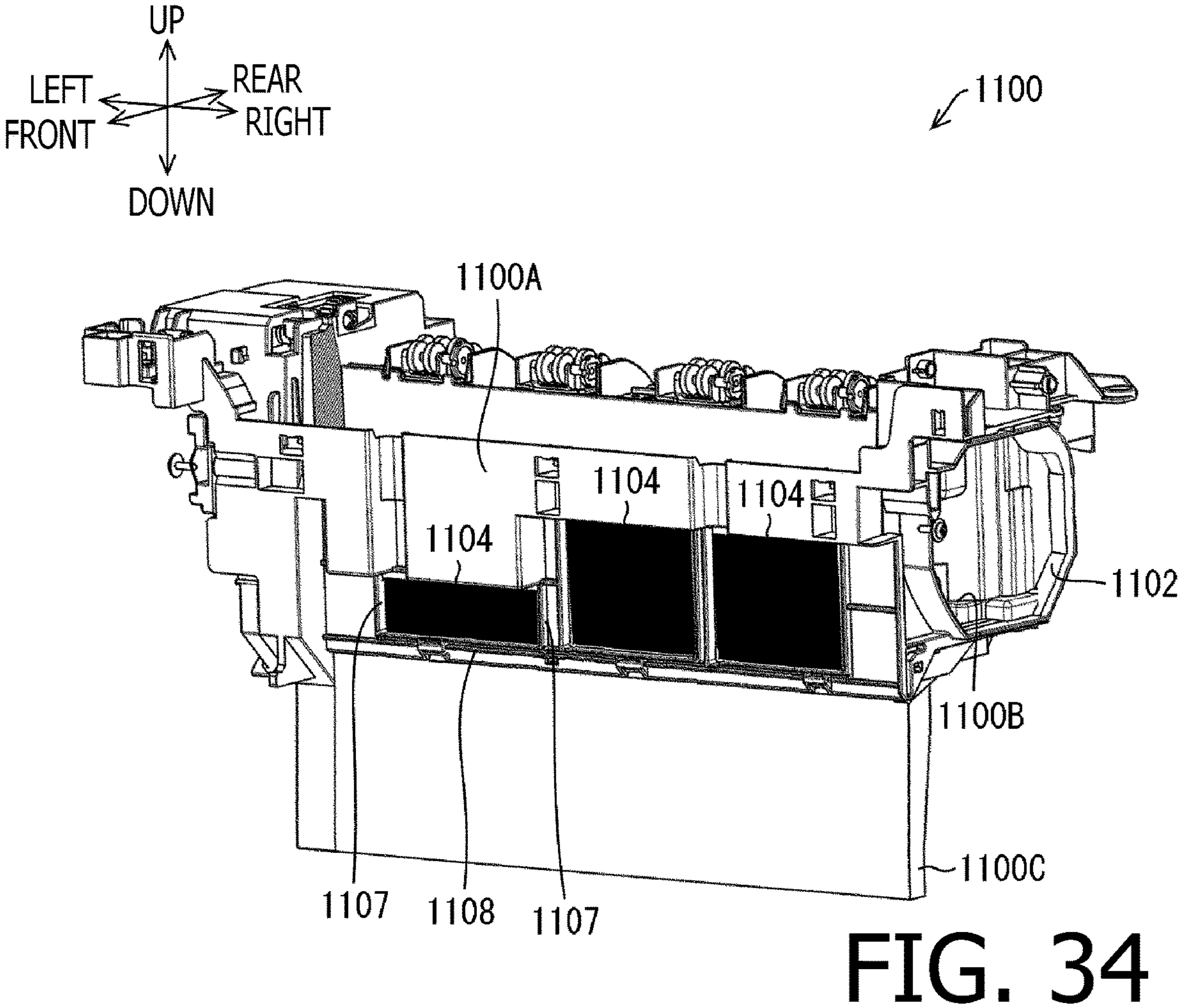
FIG. 34 is a perspective view of a duct.

Next, a schematic configuration of the duct 1100 that guides air inside the process unit accommodating part 1010 to the first exhaust port 1011 provided to the right sidewall 1003A will be described with reference to FIGS. 32 to 34. FIG. 34 is a perspective view of the duct 1100 as viewed obliquely from the right front side. As shown in FIGS. 32 and 33, the duct 1100 is disposed along the left-right direction over the entire width between the left side frame 1013A and the right side frame 1013B above the fuser 1080 and facing a rear end portion of an upper portion of the process unit 1050.

As shown in FIGS. 32 to 34, the duct 1100 is formed in a tubular shape that is long in the left-right direction and having a substantially rectangular cross-sectional shape. An end portion of the duct 1100 on the left side frame 1013A side is closed, and an end portion of the duct 1100 on the right side frame 1013B side is provided with a first opening 1102. A left end portion of the duct 1100 is attached to the left side frame 1013A.

The right end portion of the duct 1100 is attached to the right side frame 1013B to cover and communicate with a substantially rectangular through-hole 1014 formed to the right side frame 1013B at a position facing the first exhaust port 1011. The through-hole 1014 is formed in a substantially rectangular shape having substantially the same size as the first opening 1102 of the duct 1100. Therefore, the first opening 1102 of the duct 1100 is disposed to face the substantially rectangular first exhaust port 1011 formed to the right sidewall 1003A across the through-hole 1014.

As shown in FIGS. 32 and 33, three second openings 1101A, 1101B, and 1101C penetrating in a rectangular shape are formed to a front wall 1100A of the duct 1100 facing the process unit 1050. Second openings 1101D penetrating in a rectangular shape long in the left-right direction is formed to a bottom wall 1100B of the duct 1100 facing the fuser 1080. Rectangular main filters 1104 slightly larger than the second openings 1101A to 1101C, respectively, is disposed to cover the second openings 1101A to 1101C, respectively, from the front side (i.e., from outside). A rectangular main filter 1104 slightly larger than the second opening 1101D to is disposed to cover the second opening 1101D from inside.

For example, as shown in FIGS. 33 and 34, grooves 1107 having a U-shaped cross section and having widths substantially equal to a thickness of the main filters 1104 are formed on front sides of right and left side edges of each of the second openings 1101A, 1101B, and 1101C of the front wall 1100A so as to face each other. A rib 1108 projecting forward (i.e., outward) from a lower edge of each of the second openings 1101A, 1101B, and 1101C by a length substantially equal to the thickness of the main filter 1104 is formed. The main filters 1104 are inserted into the grooves 1107 of the second openings 1101A, 1101B, and 1101C, respectively, from above until the main filters come into contact with the rib 1108. As a result, the main filters 1104 are mounted to cover the second openings 1101A, 1101B, and 1101C, respectively, formed to the front wall 1100A of the duct 1100.

Similarly, a groove having a U-shaped cross section and having a width substantially equal to the thickness of the main filter 1104 is formed on an inner side of both front and rear edges of the second opening 1101D of the bottom wall 1100B, and a rib projecting upward (i.e., inward) from a left side edge of the second opening 1101D by a length substantially equal to the thickness of the main filter 1104 is formed. The main filter 1104 is inserted from the right side from the first opening 1102 into the grooves of the third opening 1100D, and is pushed in until the main filter 1104 abuts against the rib. As a result, the main filter 1104 is mounted to cover the second opening 1101D formed to the bottom wall 1100B of the duct 1100.

As shown in FIG. 32, each main filter 1104 is formed by overlaying a dust filter 1104A having a rectangular shape on an ozone filter 1104B having a rectangular shape and having the same size as the dust filter 1104A. The main filters 1104 are mounted to the second openings 1101A to 1101D, respectively, such that the ozone filter 1104B is positioned closer to an inner side of the duct 1100 than the dust filter 1104A.

As shown in FIGS. 33 and 34, the main filter 1104 disposed closer to the first opening 1102 is formed to have a larger surface area than the main filter 1104 disposed farther from the first opening 1102.

The dust filter 1104A is a filter that adsorbs and reduces dust such as toner contained in air passing through the dust filter 1104A. The ozone filter 1104B is a filter that adsorbs and decomposes ozone in air passing through the ozone filter 1104B to reduce the ozone.

As the dust filter 1104A, a HEPA filter (High Efficiency Particulate Air Filter), a nonwoven fabric filter, or the like can be used.

As the ozone filter 1104B, an active carbon filter in which active carbon that acts to adsorb and decompose ozone is attached to a carrier, a catalytic filter in which metal-based catalysts (such as manganese dioxide) that promotes decomposition of ozone are attached to a carrier, or the like can be used.

In each main filter 1104, the dust filter 1104A is disposed upstream of the ozone filter 1104B in an airflow direction. By arranging the dust filter 1104A upstream of the ozone filter 1104B in the airflow direction, it is possible to cause air in which dust is reduced by the dust filter 1104A to pass through the ozone filter 1104B, thereby making it less likely for dust to adhere to the ozone filter 1104B. As a result, it is possible to prolong the capability of the ozone filter 1104B to adsorb and decompose ozone.

As shown in FIGS. 32 to 34, at a lower edge of the front wall 1100A of the duct 1100, there is provided a partition wall 1100C that extends downward over substantially the entire width of the lower edge of the front wall 1100A in the left-right direction and partitions the process unit accommodating part 1010 into a process unit 1050 side and the fuser 1080 side. The partition wall 1100C extends to a position close to the conveyance belt 1073 to such an extent that a lower edge thereof, that is, an edge of the partition wall 1100C close to the conveyance belt 1073 of the transfer unit 1070 does not interfere with the sheet S conveyed by the conveyance belt 1073.

The sheet S onto which the toner images have been transferred is separated from the conveyance belt 1073 of the transfer unit 1070 in front of the partition wall 1100C of the process unit accommodating part 1010, and is conveyed to the fuser 1080 on a rear side of the partition wall 1100C of the process unit accommodating part 1010. Then, the sheet S onto which the toner images have been transferred passes between the heating roller 1081 and the pressure roller 1082 of the fuser 1080, and the toner images are thermally fixed onto the sheet S.

As a result, a larger amount of ozone is likely to be contained in air in the process unit 1050 side of the process unit accommodating part 1010 than in air in the fuser 1080 side of the process unit accommodating part 1010, and a larger amount of toner separated from the sheet S is likely to be contained in the air in the fuser 1080 side of the process unit accommodating part 1010 than in the air in the process unit 1050 side of the process unit accommodating part 1010.

As shown in FIG. 33, a first fan 1105 is provided between the first exhaust port 1011 provided to the right sidewall 1003A of the housing 1003 and the through-hole 1014 of the right side frame 1013B to exhaust air inside the duct 1100 to the outside of the housing 1003 through the first opening 1102 and the first exhaust port 1011. The first fan 1105 is disposed to face the first exhaust port 1011. For example, the first fan 1105 is fixed to an inner peripheral edge portion of the first exhaust port 1011 of the right sidewall 1003A with screws or the like. For example, the first fan 1105 is an axial flow fan through which air passes in a rotation axis direction, and generates an airflow in which the air inside the duct 1100 flows through the first opening 1102 and the through-hole 1014 to the outside of the housing 1003 through the first exhaust port 1011.

Configuration of Board Accommodating Part 1110

Figure 35:
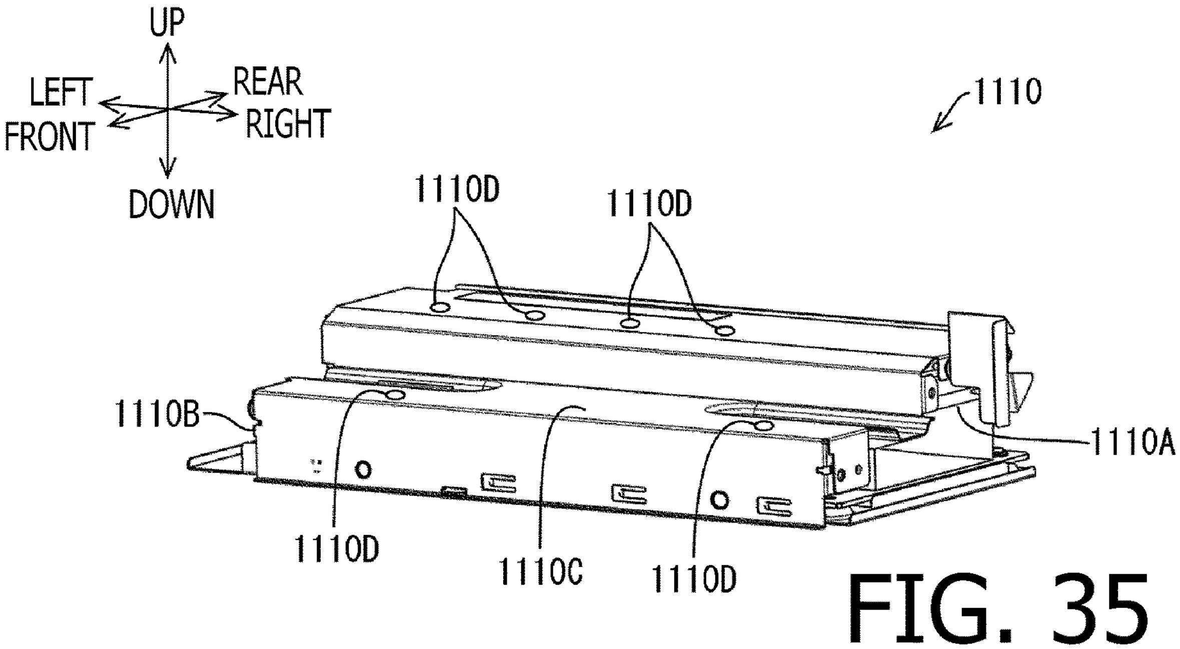
FIG. 35 is a perspective view of a board accommodating part.

Next, a schematic configuration of the board accommodating part 1110 that accommodates a low-voltage power supply board 1111 will be described with reference to FIGS. 32, 33, and 35. FIG. 35 shows a perspective view of the board accommodating part 1110.

As shown in FIGS. 32 and 33, the board accommodating part 1110 is disposed below the fuser 1080 and above the sheet tray 1021. The board accommodating part 1110 is made of sheet metal such as steel or aluminum sheet and, as shown in FIGS. 32, 33, and 35, has a tubular shape that is long in the left-right direction with a substantially rectangular cross section. The board accommodating part 1110 is open at both ends in its longitudinal direction, that is, the board accommodating part 1110 includes a third opening 1110A at a right end and a fourth opening 1110B at a left end. A plurality of small through-holes 1110D are formed on an upper surface of the board accommodating part 1110 in a press molding process.

Substantially front half of the upper surface of the board accommodating part 1110 facing the transfer unit 1070 is slightly lower than a rear portion, and forms a stepped portion 1110C positioned below the drive roller 1071 over an entire length of the board accommodating part 1110 in the left-right direction.

The board accommodating part 1110 is disposed along the left-right direction over an entire width between the left side frame 1013A and the right side frame 1013B, and both left and right ends thereof are fixed to the side frames 1013A and 1013B, respectively, by screwing, caulking, or the like. The right end of the board accommodating part 1110 is disposed to cover and communicate with a substantially rectangular through-hole 1015 formed to the right side frame 1013B at a position facing the second exhaust port 1012. The through-hole 1015 is formed in a substantially rectangular shape having substantially the same size as the third opening 1110A of the board accommodating part 1110. Therefore, the third opening 1110A of the board accommodating part 1110 is disposed to face the substantially rectangular second exhaust port 1012 formed to the right sidewall 1003A across the through-hole 1015.

The low-voltage power supply board 1111 is disposed on a bottom surface inside the board accommodating part 1110 to substantially cover a portion of the bottom surface on the rear side of the stepped portion 1110C. The low-voltage power supply board 1111 includes electric elements such as a transformer, a capacitor, and a transistor mounted thereon, and converts an AC voltage supplied from an AC power supply into a DC voltage such as 3.5V, 5V, 12V, and 24V. The low-voltage power supply board 1111 supplies electric power of such as DC voltage of 3.5V, 5V, 12V, and 24V to a conventionally-known controller that controls the image forming apparatus 1001, conventionally-known motors that rotationally drives the drive roller 1071 of the transfer unit 1070, the conveyance roller 1018, the discharge roller 1019, and the like of the transfer unit 1070, and the like.

As shown in FIG. 33, a second fan 1113 is provided between the second exhaust port 1012 provided to the right sidewall 1003A of the housing 1003 and the through-hole 1015 provided to the right side frame 1013B to exhaust air inside the board accommodating part 1110 to the outside of the housing 1003 through the third opening 1110A and the second exhaust port 1012. The second fan 1113 is disposed to face the second exhaust port 1012. For example, the second fan 1113 is fixed to an inner peripheral edge of the second exhaust port 1012 of the right sidewall 1003A with screws or the like. The second fan 1113 is, for example, an axial flow fan through which air passes in a rotation axis direction, and generates an airflow in which the air inside the board accommodating part 1110 flows through the third opening 1110A and the through-hole 1015 to the outside of the housing 1003 through the second exhaust port 1012.

The board accommodating part 1110 configured as described above functions as a beam that connects the left side frame 1013A and the right side frame 1013B and provides mechanical strength to the image forming apparatus 1001. The board accommodating part 1110 also functions as a shield case that protects the low-voltage power supply board 1111 from static electricity, external noise, and the like and suppresses noise generated by the low-voltage power supply board 1111 from leaking to outside of the board accommodating part 1110. Furthermore, when the second fan 1113 is driven, the board accommodating part 1110 functions as a duct that guides air for cooling the low-voltage power supply board 1111 from the fourth opening 1110B and the through-holes 1110D to the third opening 1110A.

Configuration of First Exhaust Port 1011 and Second Exhaust Port 1012

Figure 36:
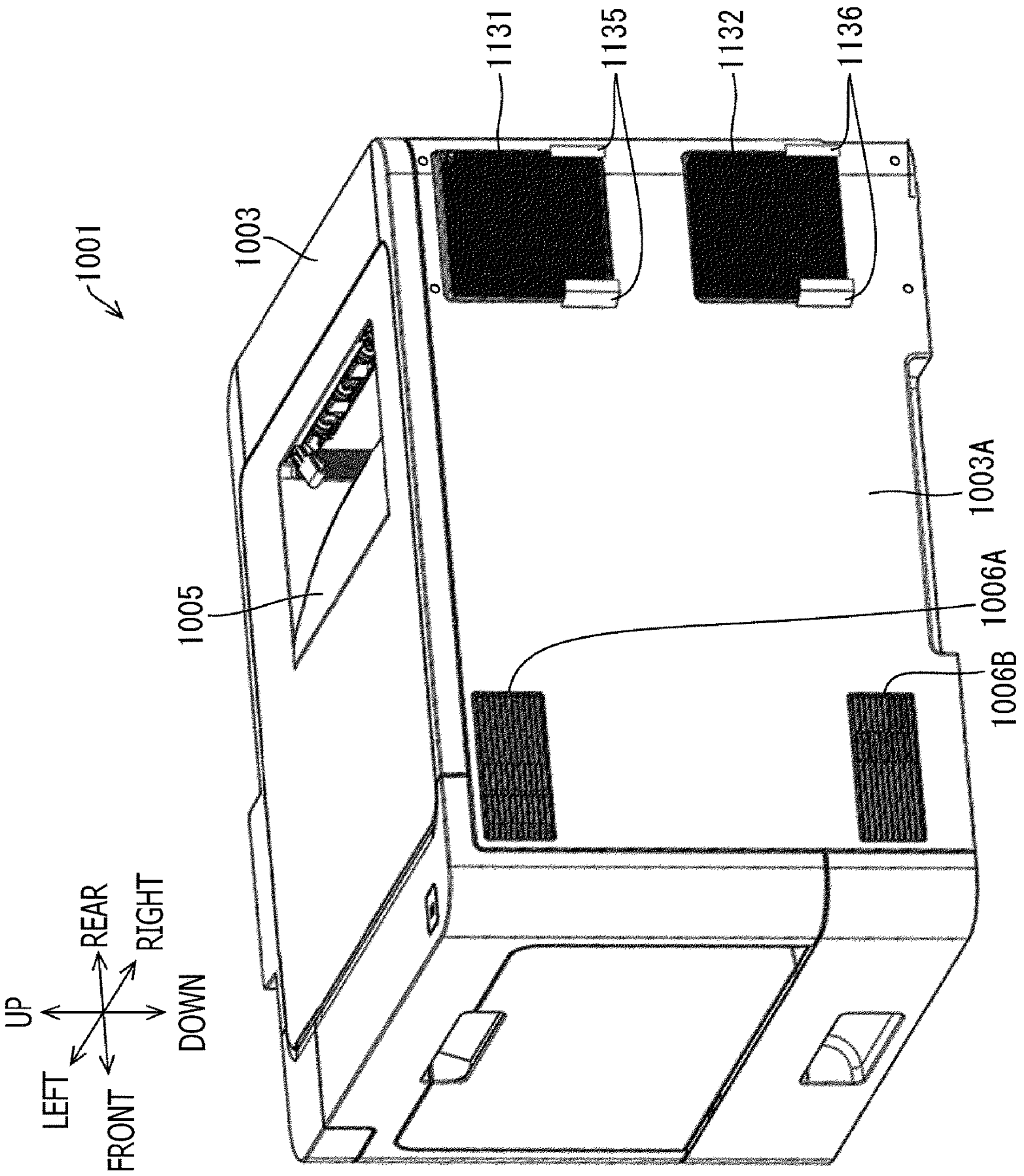
FIG. 36 is an external perspective view of the image forming apparatus in a state where a filter cover is removed.
Figure 37:
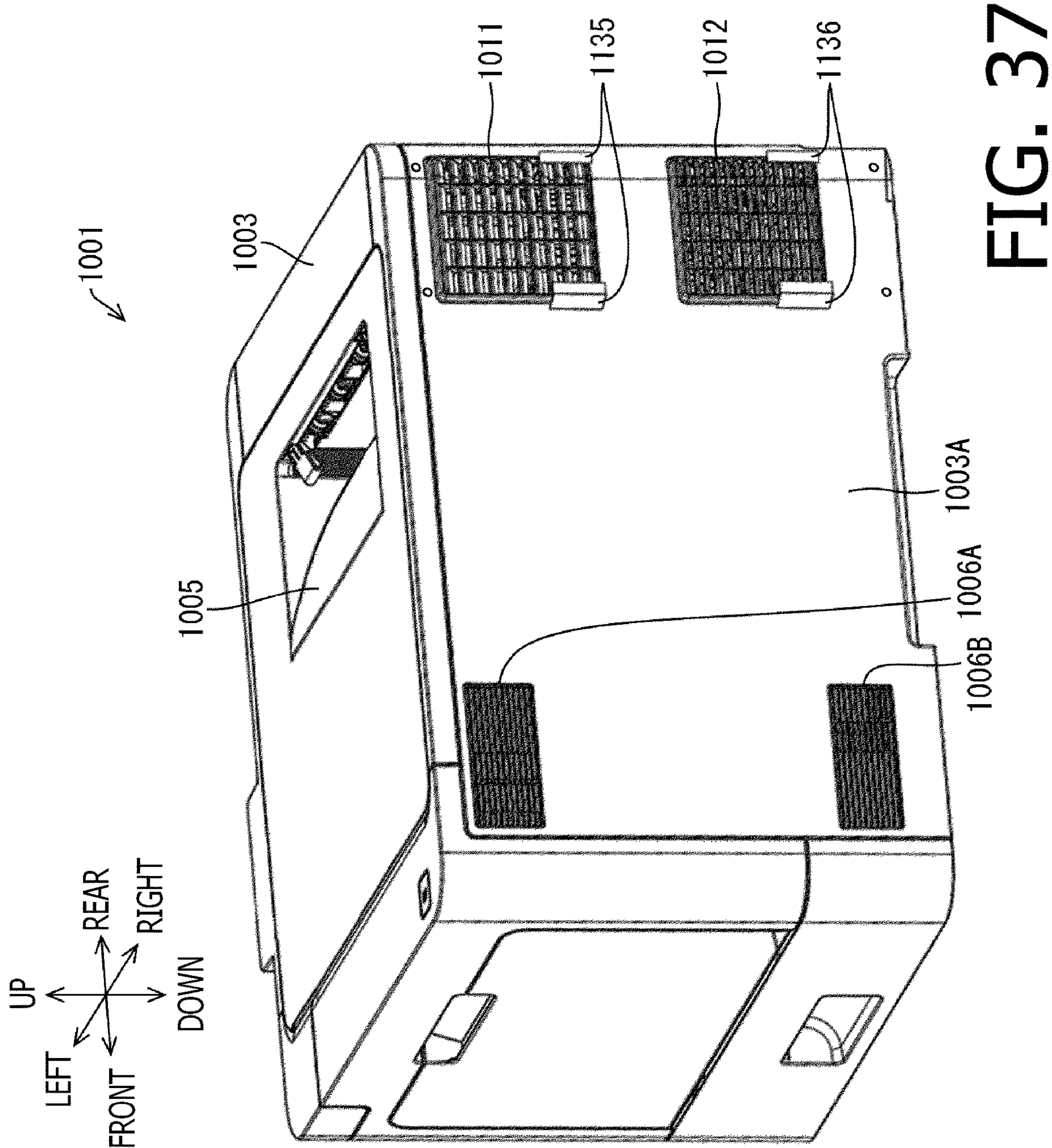
FIG. 37 is an external perspective view of the image forming apparatus in a state where a first sub-filter and a second sub-filter are removed.

Next, configurations of the first exhaust port 1011 and the second exhaust port 1012 covered by the filter cover 1008 will be described with reference to FIGS. 33, 36, and 37. FIG. 36 is an external perspective view of the image forming apparatus 1001 in a state where the filter cover 1008 is removed. FIG. 37 is an external perspective view of the image forming apparatus 1001 in a state where a first sub-filter 1131 and a second sub-filter 1132 are removed.

As shown in FIG. 37, the first exhaust port 1011 and the second exhaust port 1012, which are formed in a rectangular shape and through which air can flow from the inside to the outside of the housing 1003, are arranged in series in the up-down direction at a rear end portion of the right sidewall 1003A of the image forming apparatus 1001. The first exhaust port 1011 is formed substantially directly above the second exhaust port 1012. The first exhaust port 1011 is disposed substantially at a center between an upper end and a center in the up-down direction of the right sidewall 1003A. The second exhaust port 1012 is disposed substantially at a center between the center in the up-down direction and a lower end in the up-down direction of the right sidewall 1003A. Each of the first exhaust port 1011 and the second exhaust port 1012 is partitioned into a grid shape narrow in the up-down direction so as to prevent a finger or the like from entering through the grid.

As shown in FIGS. 33 and 36, the first sub-filter 1131 having a rectangular shape slightly larger than the first exhaust port 1011 is provided on an outer side of the first exhaust port 1011 facing the first opening 1102 of the duct 1100 to cover the first exhaust port 1011 from the right side (i.e., from outside). Specifically, as shown in FIGS. 36 and 37, grooves 1135 having a U-shaped cross section and a width substantially equal to a thickness of the first sub-filter 1131 are formed on outer sides of lower portions of both front and rear edges of the first exhaust port 1011 so as to face each other. Ribs are formed to project from bottom surfaces of lower ends of the grooves 1135 to close the lower ends of the grooves 1135, respectively.

The first sub-filter 1131 is inserted into the grooves 1135 of the first exhaust port 1011 from above and pushed in until the first sub-filter 1131 abuts the lower ends of the grooves 1135. As a result, the first sub-filter 1131 is mounted to cover the outer side of the first exhaust port 1011. Therefore, the first sub-filter 1131 is disposed downstream of the first exhaust port 1011 in an exhausting direction (i.e., in a direction of an arrow 1143 described later). Furthermore, the first sub-filter 1131 can be easily replaced by removing the filter cover 1008 from the right sidewall 1003A. The first sub-filter 1131 is a filter that reduces ozone contained in air passing through the first sub-filter 1131 by adsorbing and decomposing ozone in the air.

As the first sub-filter 1131, an active carbon filter in which active carbon that acts to adsorb and decompose ozone is attached to a carrier, a catalytic filter in which metal-based catalysts (such as manganese dioxide) that promotes decomposition of ozone are attached to a carrier, or the like can be used.

As shown in FIGS. 33 and 36, a second sub-filter 1132 having a rectangular shape slightly larger than the second exhaust port 1012 is disposed on an outer side of the second exhaust port 1012 facing the third opening 1110A of the board accommodating part 1110 to cover the second exhaust port 1012 from the right side (i.e., from outside). Specifically, as shown in FIGS. 36 and 37, grooves 1136 having a U-shaped cross section and a width substantially equal to a thickness of the second sub-filter 1132 are formed on outer sides of lower portions of both front and rear edges of the second exhaust port 1012 so as to face each other. Ribs are formed to project from bottom surfaces of lower ends of the grooves 1135 to close the lower ends of the grooves 1136, respectively.

The second sub-filter 1132 is inserted into the grooves 1136 of the second exhaust port 1012 from above and pushed in until the second sub-filter 1132 abuts the lower ends of the grooves 1136. As a result, the second sub-filter 1132 is mounted to cover the outer side of the second exhaust port 1012. Therefore, the second sub-filter 1132 is disposed downstream of the second exhaust port 1012 in an exhausting direction (i.e., in a direction of an arrow 1147 described later). Furthermore, the second sub-filter 1132 can be easily replaced by removing the filter cover 1008 from the right sidewall 1003A. The second sub-filter 1132 is a filter that reduces ozone contained in air passing through the second sub-filter 1132 by adsorbing and decomposing ozone in the air.

As the second sub-filter 1132, an active carbon filter in which active carbon that acts to adsorb and decompose ozone is attached to a carrier, a catalytic filter in which metal-based catalysts (such as manganese dioxide) that promotes decomposition of ozone are attached to a carrier, or the like can be used.

Operation and Effect of Image Forming Apparatus 1001

Figure 38:
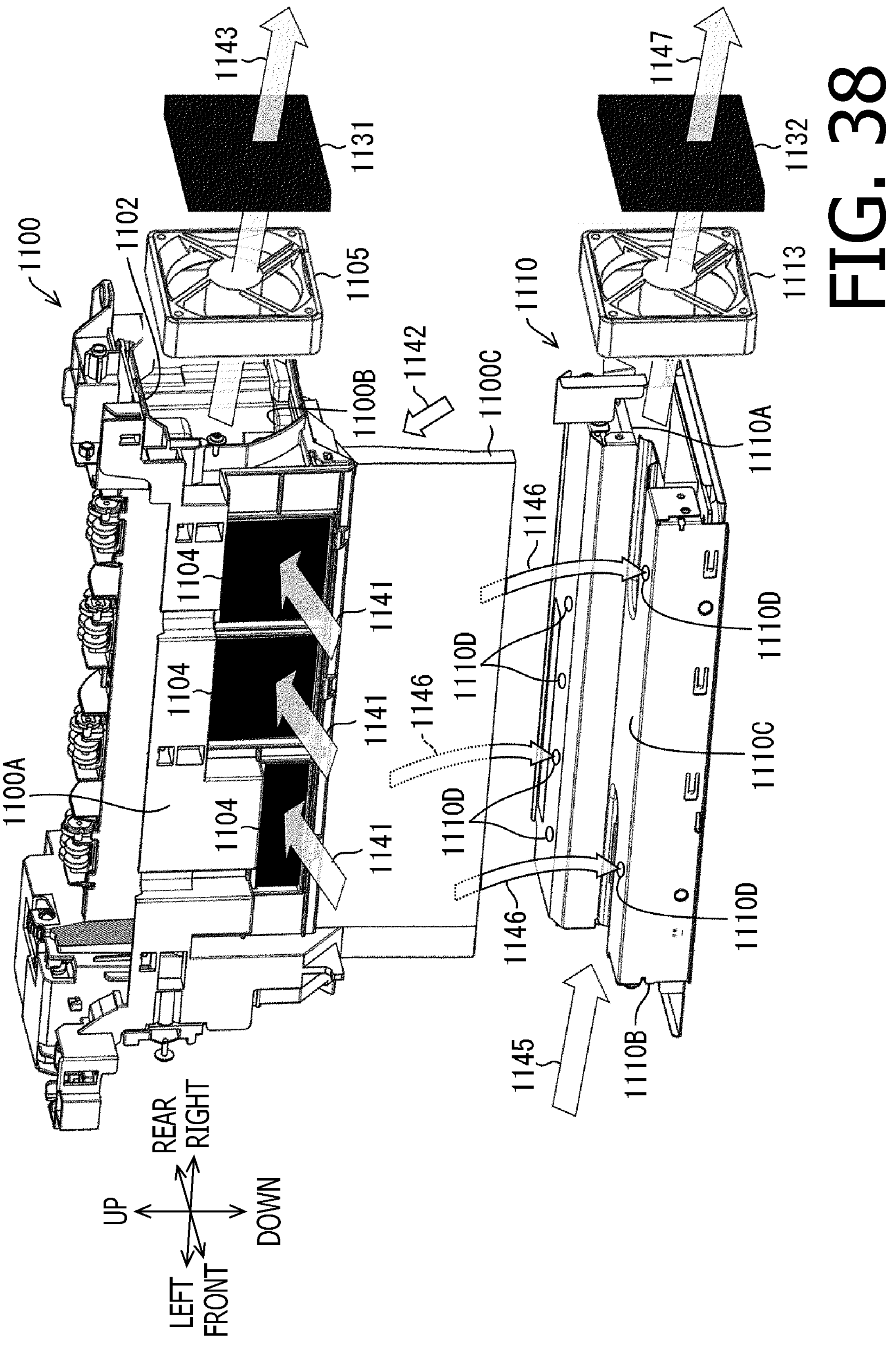
FIG. 38 illustrates flow of air when the first fan and the second fan are driven.

Next, a flow of air inside the process unit accommodating part 1010 in the image forming apparatus 1001 configured as described above by driving the first fan 1105 and the second fan 1113 will be described with reference to FIGS. 33 and 38. FIG. 38 is a diagram illustrating a flow of air when the first fan 1105 and the second fan 1113 are driven.

Exhaustion from Duct 1100

As shown in FIGS. 33 and 38, when the first fan 1105 is driven, air on the process unit 1050 side on a front side of the partition wall 1100C of the duct 1100, containing a large amount of ozone, passes through the main filters 1104 provided on the front wall 1100A of the duct 1100. For example, the air on the process unit 1050 side flows in directions of arrows 1141. As a result, the air on the process unit 1050 side passes through the main filters 1104 provided on the front wall 1100A of the duct 1100 whereby dust and ozone contained therein reduces, and then passes through the second openings 1101A to 1101C to flow into the duct 1100.

Furthermore, air on the fuser 1080 side on the rear side of the partition wall 1100C of the duct 1100, containing ozone and containing more dust such as toner than the air on the process unit 1050 side, passes through the main filter 1104 provided on the bottom wall 1100B of the duct 1100. For example, the air on the fuser 1080 side flows in a direction of an arrow 1142. As a result, the air on the fuser 1080 side passes through the main filter 1104 provided on the bottom wall 1100B of the duct 1100 whereby dust and ozone contained therein reduces, and then passes through the second opening 1101D to flow into the duct 1100.

Then, the air which dust and ozone contained therein is reduced and flowed into the duct 1100 passes through the first opening 1102, the through-holes 1014, the first fan 1105, and the first exhaust port 1011. The air that has passed through the first exhaust port 1011 passes through the first sub-filter 1131 provided downstream of the first exhaust port 1011 in the exhausting direction and is exhausted to the outside of the housing 1003. Thereafter, the air that has been exhausted to the outside of the housing 1003 passes through the grid holes provided on the bottom surface of the filter cover 1008 and is exhausted to outside of the image forming apparatus 1001. For example, the air that has flowed into the duct 1100 flows in the direction of the arrow 1143.

As a result, dust and ozone is reduced through the main filters 1104, and the air that has flown into the duct 1100 passes through the first sub-filter 1131 disposed downstream of the first exhaust port 1011 in the exhausting direction, whereby ozone contained in the air that passes through the first sub-filter 1131 is further reduced and the air is exhausted to the outside of the image forming apparatus 1001 through the filter cover 1008.

Exhaustion from Board Accommodating Part 1110

As shown in FIGS. 33 and 38, when the second fan 1113 is driven, air containing ozone generated in the image forming engine 1030 leaks downward from the process unit accommodating part 1010 and flows into the board accommodating part 1110 from the fourth opening 1110B of the board accommodating part 1110. For example, the air containing ozone flows into the board accommodating part 1110 from the left side frame 1013A along a direction of an arrow 1145. The air containing ozone also flows into the board accommodating part 1110 from the small through-holes 1110D formed on the upper surface of the board accommodating part 1110. For example, the air containing ozone flows into the board accommodating part 1110 from above along direction of arrows 1146.

Then, the air containing ozone that has flowed into the board accommodating part 1110 passes through the third opening 1110A, the through-hole 1015, the second fan 1113, and the second exhaust port 1012. The air that has passed through the second exhaust port 1012 passes through the second sub-filter 1132 disposed downstream of the second exhaust port 1012 in the exhausting direction and is exhausted to the outside of the housing 1003. Thereafter, the air that has been exhausted to the outside of the housing 1003 passes through the grid holes provided on the bottom surface of the filter cover 1008 and is exhausted to the outside of the image forming apparatus 1001. For example, the air containing ozone that has flowed into the board accommodating part 1110 flows along a direction of an arrow 1147.

As a result, the air that has flowed into the board accommodating part 1110 passes through the second sub-filter 1132 disposed downstream of the second exhaust port 1012 in the exhausting direction whereby ozone contained therein reduces, and is exhausted to the outside of the image forming apparatus 1001 of the image forming apparatus through the filter cover 1008.

Therefore, the air inside the process unit accommodating part 1010 containing ozone and dust (such as toner) passes through the main filters 1104 provided to the second openings 1101A to 1101D of the duct 1100, passes through the first sub-filter 1131 whereby ozone contained therein is further reduced, and is then discharged to the outside of the housing 1003. The air containing ozone that has flowed from the process unit accommodating part 1010 into the board accommodating part 1110 passes through the second sub-filter 1132 whereby ozone contained therein reduces, and is then discharged to the outside of the housing 1003.

Therefore, the image forming apparatus 1001 can reduce the amount of ozone and dust (such as toner) exhausted to the outside of the housing 1003 as compared with a case where the main filter 1104 is provided only to the duct 1100 as in a conventional image forming apparatus. In addition, since it becomes not necessary to increase the thickness, the number, and the surface area of the main filters 1104 provided to the duct 1100 by providing the first sub-filter 1131, it is possible to suppress an increase in ventilation resistance when air passes through each main filter 1104 to suppress a temperature rise inside the housing 1003.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification

For example, similarly to the main filter 1104, the first sub-filter 1131 may be formed by overlaying a dust filter having a rectangular shape on an ozone filter having a rectangular shape and having the same size as the dust filter. The first sub-filter 1131 may be mounted to the outer side of the first exhaust port 1011 such that the ozone filter is disposed downstream of the dust filter in the exhausting direction, that is, such that the ozone filter is disposed outside the housing 1003.

Therefore, the air that has flowed into the duct 1100 through the main filters 1104 passes through the first sub-filter 1131 disposed downstream of the first exhaust port 1011 in the exhausting direction through the first fan 1105 whereby dust and ozone contained therein is further reduced, and is exhausted to the outside of the housing 1003. Accordingly, the image forming apparatus 1001 can reduce the amount of ozone and dust (such as toner) exhausted to the outside of the housing 1003 as compared with a case where the main filter 1104 is provided only to the duct 1100 as in the conventional image forming apparatus.

Furthermore, by disposing the first sub-filter 1131 such that the dust filter is positioned upstream of the ozone filter in the airflow direction, it is possible to cause air in which dust is reduced by the dust filter to pass through the ozone filter, thereby making it less likely for dust to adhere to the ozone filter. As a result, it is possible to prolong the capability of the ozone filter to adsorb and decompose ozone.

Second Modification

For example, similarly to the main filter 1104, the second sub-filter 1132 may be formed by overlaying a dust filter having a rectangular shape on an ozone filter having a rectangular shape and having the same size as the dust filter. The second sub-filter 1132 may be mounted to the outer side of the second exhaust port 1012 such that the ozone filter is disposed downstream of the dust filter in the exhausting direction, that is, such that the ozone filter is disposed outside the housing 1003.

Therefore, the air that has flowed into the duct 1100 through the main filters 1104 passes through the second sub-filter 1132 disposed downstream of the second exhaust port 1012 in the exhausting direction through the second fan 1113 whereby dust and ozone contained therein is further reduced, and is exhausted to the outside of the housing 1003. Accordingly, the image forming apparatus 1001 can reduce the amount of ozone and dust (such as toner) exhausted to the outside of the housing 1003 as compared with a case where the main filter 1104 is provided only to the duct 1100 as in the conventional image forming apparatus.

Furthermore, by disposing the second sub-filter 1132 such that the dust filter is positioned upstream of the ozone filter in the airflow direction, it is possible to cause air in which dust is reduced by the dust filter to pass through the ozone filter, thereby making it less likely for dust to adhere to the ozone filter. As a result, it is possible to prolong the capability of the ozone filter to adsorb and decompose ozone.

Third Modification

For example, the main filters 1104 attached to the second openings 1101A to 1101C of the front wall 1100A of the duct 1100 may be configured only with the ozone filter 1104B since the amount of dust such as toner contained in the air that passes through the second openings 1101A to 1101C is small. With such configuration, ventilation resistance when air passes through each main filter 1104 attached to the second openings 1101A to 1101C can be suppressed to further suppress the temperature rise inside the housing 1003.

Fourth Modification

The image forming apparatuses 1 and 1001 of the first and second embodiments described above are laser printers. However, aspects of the present disclosure may also be applied to an MFP (Multi-Function Peripheral) having a plurality of functions such as a print function, a scan function, a copy function, and a fax function by a laser printer.

The first fan 71 and the second fan 72 are examples of a fan configured to exhaust air inside the housing according to aspects of the present disclosure. The first duct 27 and the second duct 28 are examples of a duct that accommodates the fan according to aspects of the present disclosure. The first louver 24 and the second louver 25 are examples of a louver according to aspects of the present disclosure. The first exhaust filter 73 and the second exhaust filter 74 are examples of an exhaust filter according to aspects of the present disclosure. The up-down direction is an example of a direction orthogonal to an exhausting direction according to aspects of the present disclosure. The right sidewall 1003A is an example of a sidewall according to aspects of the present disclosure. The charger 1053 is an example of a charger according to aspects of the present disclosure. The exposure unit 1040 is an example of an exposure device according to aspects of the present disclosure. The developing roller 1061, the supply roller 1062, and the layer thickness regulating blade 1063 constitute an example of a developing unit according to aspects of the present disclosure. The transfer unit 1070 is an example of a transfer unit according to aspects of the present disclosure. The duct 1100 is an example of a process duct according to aspects of the present disclosure. The main filters 1104 are examples of an intermediate filter according to aspects of the present disclosure. The low-voltage power supply board 1111 is an example of a power supply board according to aspects of the present disclosure. The first sub-filter 1131 is an example of a first exhaust filter according to aspects of the present disclosure. The second sub-filter 1132 is an example of a second exhaust filter according to aspects of the present disclosure.

What is claimed is:

1. An image forming apparatus, comprising:

a housing including a sidewall in which an exhaust port is formed;

a fan;

a duct extending in an exhaust direction and configured to house the fan, the duct including a downstream end in the exhaust direction; and an exhaust filter disposed between the downstream end of the duct and the exhaust port in the exhaust direction, the exhaust filter including a first surface facing the exhaust port and a second surface facing the downstream end of the duct, wherein dimensions of the downstream end of the duct in directions orthogonal to the exhaust direction are smaller than dimensions of the exhaust filter in the directions orthogonal to the exhaust direction, and wherein the downstream end of the duct faces the second surface of the exhaust filter in the exhaust direction, wherein the sidewall includes:

a recess that is recessed toward a downstream side in the exhaust direction; and a louver disposed downstream of the recess and the exhaust filter in the exhaust direction, wherein an outer peripheral surface of the exhaust filter directly contacts, around an entire periphery of the exhaust filter, an inner wall surface of the recess.

2. The image forming apparatus according to claim 1, wherein the exhaust filter is configured to reduce ozone from air exhausted.

3. The image forming apparatus according to claim 1, wherein the first surface of the exhaust filter is in contact with an upstream end of the louver in the exhaust direction.

4. The image forming apparatus according to claim 1, further comprising a seal, wherein the seal is disposed between an outer peripheral surface of the fan and an inner peripheral surface of the duct.

5. The image forming apparatus according to claim 1, wherein the duct includes a hook that projects toward the fan and engages with the fan to position the fan in the exhaust direction.

6. The image forming apparatus according to claim 1, wherein the duct includes a cutout extending through a peripheral wall of the duct in one of directions orthogonal to the exhaust direction and through which a harness connected to the fan passes.

7. The image forming apparatus according to claim 1, further comprising a process unit accommodated in the housing and configured to form a toner image on a sheet, wherein the fan exhausts air that has passed through the process unit.

8. The image forming apparatus according to claim 7, further comprising an intermediate filter disposed between the process unit and the duct.

9. The image forming apparatus according to claim 8, wherein the intermediate filter is a filter configured to reduce ozone from the air exhausted by the fan.

10. The image forming apparatus according to claim 1, further comprising an image forming engine configured to form an image on a sheet by an electrophotographic system, the image forming engine including:

a photosensitive drum;

a charger configured to charge the photosensitive drum;

an exposure device configured to expose the photosensitive drum to form an electrostatic latent image;

a developing device configured to develop the electrostatic latent image with toner to form a toner image; and a transfer unit configured to transfer the toner image formed on the photosensitive drum onto the sheet, a process unit accommodating part configured to accommodate the image forming engine;

a power supply board;

a board accommodating part configured to accommodate the power supply board;

a first exhaust port and a second exhaust port extending through a sidewall of the housing disposed downstream of the fan in the exhaust direction and intersecting with an axial direction of the photosensitive drum; and a process duct including a first opening that faces the first exhaust port and a second opening that is open into the process unit accommodating part, the process duct being configured to guide air inside the process unit accommodating part from the second opening to the first opening, wherein the housing accommodates the image forming engine, the process unit accommodating part, and the power supply board, wherein the board accommodating part includes a third opening that faces the second exhaust port, wherein the fan includes:

a first fan facing the first exhaust port and configured to exhaust air inside the process duct through the first opening to outside of the housing, and a second fan facing the second exhaust port and configured to exhaust air inside the board accommodating part through the second opening to the outside of the housing, and wherein the exhaust filter includes:

a first exhaust filter provided at the first exhaust port downstream of the first fan in the exhaust direction; and a second exhaust filter provided at the second exhaust port downstream of the second fan in the exhaust direction.

11. The image forming apparatus according to claim 10, wherein the first exhaust filter includes an ozone filter that reduces ozone in the air.

12. The image forming apparatus according to claim 10, wherein the second exhaust filter includes an ozone filter that reduces ozone in the air.

13. The image forming apparatus according to claim 10, wherein the sidewall includes an intake port through which air outside the housing flows into the process unit accommodating part, and the housing includes a third fan that is provided in the intake port and configured to suck the air outside the housing into the housing.

14. The image forming apparatus according to claim 10, further comprising a fuser configured to fix the toner image transferred onto the sheet to the sheet, wherein the process duct is disposed between the image forming engine and the fuser in a sheet conveyance direction in which the sheet is conveyed by a conveyer, and wherein the board accommodating part is disposed below the fuser in a vertical direction.

15. The image forming apparatus according to claim 1, further comprising an image forming engine configured to form an image on a sheet by an electrophotographic system, the image forming engine including:

a photosensitive drum;

a charger configured to charge the photosensitive drum;

an exposure device configured to expose the photosensitive drum to form an electrostatic latent image;

a developing device configured to develop the electrostatic latent image with toner to form a toner image; and a transfer unit configured to transfer the toner image formed on the photosensitive drum onto the sheet, a process unit accommodating part configured to accommodate the image forming engine;

a first exhaust port extending through a sidewall of the housing disposed downstream of the fan in the exhaust direction and intersecting with an axial direction of the photosensitive drum; and a process duct including a first opening that faces the first exhaust port and a second opening that is open into the process unit accommodating part, the process duct being configured to guide air inside the process unit accommodating part from the second opening to the first opening, wherein the housing accommodates the image forming engine and the process unit accommodating part, wherein the process duct includes an intermediate filter disposed in the second opening, wherein the fan includes a first fan facing the first exhaust port and configured to exhaust air inside the process duct through the first opening to outside of the housing, and wherein the exhaust filter includes a first exhaust filter provided at the first exhaust port downstream of the first fan in the exhaust direction.

16. The image forming apparatus according to claim 15, wherein the intermediate filter includes an ozone filter that reduces ozone in the air.

17. The image forming apparatus according to claim 1, wherein the downstream end of the duct directly contacts the second surface of the exhaust filter in the exhaust direction.

18. An image forming apparatus, comprising:

a housing in which an exhaust port is formed;

a fan;

a duct extending in an exhausting direction and configured to accommodate the fan, the duct including a downstream end in the exhausting direction;

an exhaust filter disposed between the duct and the exhaust port in the exhausting direction, the exhaust filter including a first surface facing the exhaust port and a second surface facing the duct; and a flow path extending from an opening formed on a top surface of the housing up to the downstream end of the duct, the flow path allowing liquid on the top surface of the housing to flow up to the downstream end of the duct by gravity, wherein dimensions of a perimeter of the downstream end of the duct each orthogonal to the exhaust direction are smaller than dimensions of the exhaust filter each orthogonal to the exhaust directions, and wherein the perimeter of the downstream end of the duct in the exhaust direction is in contact with the second surface of the exhaust filter such that the perimeter of the downstream end of the duct in the exhaust direction is up against the second surface of the exhaust filter.

19. The image forming apparatus according to claim 18, wherein the flow path includes:

a first flow path formed to the duct and extending in a vertical direction; and a second flow path formed to the duct continuously with a lower end of the first flow path and formed below the fan to extend between the fan and the exhaust port.

20. An image forming apparatus, comprising:

a fan;

a duct extending in an exhaust direction and configured to house the fan, the duct including a downstream end in the exhaust direction;

a sidewall disposed downstream of the fan in the exhaust direction, the sidewall including an exhaust port extending through the sidewall; and an exhaust filter disposed between the downstream end of the duct and the exhaust port, the exhaust filter including a first surface facing the exhaust port and a second surface facing the downstream end of the duct, wherein the downstream end of the duct faces the second surface of the exhaust filter in the exhaust direction, wherein the exhaust filter has an area greater than a cross-sectional area of the downstream end of the duct, and wherein the duct, the exhaust filter, and the exhaust port fluidly communicate with each other, wherein the sidewall includes:

a recess that is recessed toward a downstream side in the exhaust direction; and a louver disposed downstream of the recess and the exhaust filter in the exhaust direction, wherein an outer peripheral surface of the exhaust filter directly contacts, around an entire periphery of the exhaust filter, an inner wall surface of the recess.

* * * * *